US007076784B1

(12) United States Patent
Russell et al.

(10) Patent No.: US 7,076,784 B1
(45) Date of Patent: *Jul. 11, 2006

(54) SOFTWARE COMPONENT EXECUTION MANAGEMENT USING CONTEXT OBJECTS FOR TRACKING EXTERNALLY-DEFINED INTRINSIC PROPERTIES OF EXECUTING SOFTWARE COMPONENTS WITHIN AN EXECUTION ENVIRONMENT

(75) Inventors: Wilfred G. Russell, Redmond, WA (US); Patrick James Helland, Bellevue, WA (US); Greg Hope, Woodinville, WA (US); Rodney Limprecht, Woodinville, WA (US); Mohsen Al-Ghosein, Redmond, WA (US); Jan Stephen Gray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,102

(22) Filed: Oct. 22, 1999

Related U.S. Application Data

(63) Continuation of application No. 09/225,896, filed on Jan. 4, 1999, now Pat. No. 6,678,696, which is a continuation of application No. 08/959,141, filed on Oct. 28, 1997, now Pat. No. 5,890,161, application No. 09/425,102, which is a continuation of application No. 09/351,374, filed on Jul. 12, 1999, now Pat. No. 6,301,601, which is a continuation of application No. 08/959,142, filed on Oct. 28, 1997, now Pat. No. 5,958,004, application No. 09/425,102, which is a continuation of application No. 08/958,975, filed on Oct. 28, 1997, now Pat. No. 6,134,594, and a continuation of application No. 08/959,139, filed on Oct. 28, 1997, now Pat. No. 6,631,425, and a continuation of application No. 08/959,149, filed on Oct. 28, 1997, now Pat. No. 6,813,769, and a continuation of application No. 08/958,974, filed on Oct. 28, 1997, now Pat. No. 6,014,666.

(51) Int. Cl.
G06F 9/44 (2006.01)
(52) U.S. Cl. .................... 719/315; 719/316; 717/120; 707/103 R
(58) Field of Classification Search ............... 719/315, 719/316, 330, 310; 718/108, 101, 107, 104, 718/100; 709/203; 707/103 R, 200; 717/120
See application file for complete search history.

(56) References Cited

U.S. PATENT DOCUMENTS 4,034,353 A 7/1977 Denny et al.
(Continued)

FOREIGN PATENT DOCUMENTS

EP 0 414 624 A 2/1991
(Continued)

OTHER PUBLICATIONS

The Common Object Request Broker: Architecture and Specification, Revision 2.0, Jul. 1995, pp. 4-12 to 4-17.*
(Continued)

*Primary Examiner*—William Thomson
*Assistant Examiner*—Van H. Nguyen
(74) *Attorney, Agent, or Firm*—Klarquist Sparkman, LLP

(57) ABSTRACT

A run-time executive of an object management system for managing execution of software components in an object execution environment uses a component context object to store intrinsic context properties related to an associated component. The run-time executive maintains an implicit association of the component context object with the application component. For example, the context properties can include a client id, an activity id, and a transaction reference. The component context object also provides an interface accessible to the associated component, with member functions for use in transaction processing, in creating additional other application components inheriting component's context properties, and in access control based on abstract user classes (roles).

54 Claims, 32 Drawing Sheets

U.S. PATENT DOCUMENTS

| | | | |
|---|---|---|---|
| 4,231,106 A | 10/1980 | Heap et al. | |
| 4,752,928 A | 6/1988 | Chapman et al. | |
| 4,807,111 A | 2/1989 | Cohen et al. | |
| 4,972,437 A | 11/1990 | Citron et al. | |
| 5,016,166 A | 5/1991 | Van Loo et al. | |
| 5,047,919 A | 9/1991 | Sterling et al. | |
| 5,075,848 A | 12/1991 | Lai et al. | |
| 5,093,914 A | 3/1992 | Coplien et al. | |
| 5,125,091 A | 6/1992 | Staas, Jr. et al. | |
| 5,133,075 A | 7/1992 | Risch | |
| 5,151,987 A | 9/1992 | Abraham et al. | |
| 5,168,441 A | 12/1992 | Onarheim et al. | |
| 5,179,702 A | 1/1993 | Spix et al. | |
| 5,181,162 A | 1/1993 | Smith et al. | |
| 5,204,956 A | 4/1993 | Danuser et al. | |
| 5,210,874 A | 5/1993 | Karger | |
| 5,212,793 A | 5/1993 | Donica et al. | |
| 5,247,675 A | 9/1993 | Farrell et al. | |
| 5,301,280 A | 4/1994 | Schwartz et al. | |
| 5,307,490 A | 4/1994 | Davidson et al. | |
| 5,313,616 A | 5/1994 | Cline et al. | |
| 5,313,638 A | 5/1994 | Ogle et al. | |
| 5,315,703 A | 5/1994 | Matheny et al. | |
| 5,339,415 A | 8/1994 | Strout, II et al. | |
| 5,404,523 A * | 4/1995 | DellaFera et al. | 718/101 |
| 5,421,013 A | 5/1995 | Smith | |
| 5,434,975 A | 7/1995 | Allen | |
| 5,442,791 A | 8/1995 | Wrabetz et al. | |
| 5,455,953 A | 10/1995 | Russell | |
| 5,459,837 A | 10/1995 | Caccavale | |
| 5,463,625 A | 10/1995 | Yasrebi | |
| 5,481,715 A | 1/1996 | Hamilton et al. | |
| 5,485,574 A | 1/1996 | Bolosky et al. | |
| 5,485,617 A | 1/1996 | Stutz et al. | |
| 5,493,728 A | 2/1996 | Solton et al. | |
| 5,504,898 A | 4/1996 | Klein | |
| 5,511,197 A | 4/1996 | Hill et al. | |
| 5,517,645 A | 5/1996 | Stutz et al. | |
| 5,519,867 A | 5/1996 | Moeller et al. | |
| 5,524,238 A | 6/1996 | Miller et al. | |
| 5,528,753 A | 6/1996 | Fortin | |
| 5,539,907 A | 7/1996 | Srivastava et al. | |
| 5,548,718 A | 8/1996 | Siegel et al. | |
| 5,555,368 A | 9/1996 | Orton et al. | |
| 5,555,388 A | 9/1996 | Shaughnessy | |
| 5,560,029 A | 9/1996 | Papadopoulous et al. | |
| 5,561,797 A | 10/1996 | Gilles et al. | |
| 5,574,862 A | 11/1996 | Marianetti, II | |
| 5,574,918 A | 11/1996 | Hurley et al. | |
| 5,577,252 A | 11/1996 | Nelson et al. | |
| 5,579,520 A | 11/1996 | Bennett | |
| 5,581,686 A | 12/1996 | Koppolu et al. | |
| 5,581,760 A | 12/1996 | Atkinson et al. | |
| 5,598,562 A | 1/1997 | Cutler et al. | |
| 5,603,063 A | 2/1997 | Au | |
| 5,606,719 A | 2/1997 | Nichols et al. | |
| 5,619,710 A | 4/1997 | Travis, Jr. et al. | |
| 5,625,775 A | 4/1997 | Davis et al. | |
| 5,630,136 A | 5/1997 | Davidson et al. | |
| 5,675,796 A | 10/1997 | Hodges et al. | |
| 5,687,370 A | 11/1997 | Garst et al. | |
| 5,689,708 A | 11/1997 | Regnier et al. | |
| 5,706,429 A | 1/1998 | Lai et al. | |
| 5,717,439 A | 2/1998 | Levine et al. | |
| 5,732,273 A | 3/1998 | Srivastava et al. | |
| 5,742,822 A | 4/1998 | Motomura | |
| 5,752,038 A | 5/1998 | Blake et al. | |
| 5,758,281 A | 5/1998 | Emery et al. | |
| 5,764,747 A | 6/1998 | Yue et al. | |
| 5,764,897 A | 6/1998 | Khalidi | |
| 5,764,918 A | 6/1998 | Poulter | |
| 5,764,958 A | 6/1998 | Coskun | |
| 5,765,174 A | 6/1998 | Bishop et al. | |
| 5,768,348 A | 6/1998 | Solomon et al. | |
| 5,778,365 A | 7/1998 | Nishiyama | |
| 5,781,910 A | 7/1998 | Gostanian et al. | |
| 5,787,281 A | 7/1998 | Schreiber et al. | |
| 5,790,789 A | 8/1998 | Suarez | |
| 5,794,038 A | 8/1998 | Stutz et al. | |
| 5,802,291 A | 9/1998 | Balick et al. | |
| 5,815,665 A | 9/1998 | Teper et al. | |
| 5,822,435 A | 10/1998 | Boebert et al. | |
| 5,822,585 A | 10/1998 | Noble et al. | |
| 5,832,274 A | 11/1998 | Cutler et al. | |
| 5,838,916 A | 11/1998 | Domenikos et al. | |
| 5,857,197 A | 1/1999 | Mullins | |
| 5,857,201 A | 1/1999 | Wright, Jr. et al. | |
| 5,864,669 A | 1/1999 | Osterman et al. | |
| 5,864,683 A | 1/1999 | Boebert et al. | |
| 5,872,976 A | 2/1999 | Yee et al. | |
| 5,875,291 A | 2/1999 | Fox | |
| 5,881,225 A | 3/1999 | Worth | |
| 5,884,316 A | 3/1999 | Bernstein et al. | |
| 5,884,327 A | 3/1999 | Cotner et al. | |
| 5,887,171 A | 3/1999 | Tada et al. | |
| 5,889,942 A | 3/1999 | Orenshteyn | |
| 5,889,957 A | 3/1999 | Ratner et al. | |
| 5,890,161 A * | 3/1999 | Helland et al. | 707/103 R |
| 5,893,912 A * | 4/1999 | Freund et al. | 707/103 R |
| 5,903,758 A | 5/1999 | Walker | |
| 5,907,675 A | 5/1999 | Aahlad | |
| 5,920,863 A * | 7/1999 | McKeehan et al. | 707/10 |
| 5,933,593 A | 8/1999 | Arun et al. | |
| 5,933,640 A | 8/1999 | Dion | |
| 5,937,191 A | 8/1999 | Graham | |
| 5,941,947 A | 8/1999 | Brown et al. | |
| 5,958,004 A | 9/1999 | Helland et al. | |
| 5,958,010 A | 9/1999 | Agarwal et al. | |
| 6,026,236 A | 2/2000 | Fortin et al. | |
| 6,026,428 A * | 2/2000 | Hutchison et al. | 718/108 |
| 6,061,796 A | 5/2000 | Chen et al. | |
| 6,105,147 A | 8/2000 | Molloy | |
| 6,119,145 A * | 9/2000 | Ikeda et al. | 709/203 |
| 6,126,329 A | 10/2000 | Bennett et al. | |
| 6,138,143 A * | 10/2000 | Gigliotti et al. | 709/203 |
| 6,157,927 A * | 12/2000 | Schaefer et al. | 707/103 R |
| 6,161,147 A | 12/2000 | Snyder et al. | |
| 6,173,404 B1 | 1/2001 | Colburn et al. | |
| 6,182,108 B1 | 1/2001 | Williams et al. | |
| 6,182,158 B1 * | 1/2001 | Kougiouris et al. | 719/328 |
| 6,223,227 B1 | 4/2001 | Williamson et al. | |
| 6,263,488 B1 | 7/2001 | Fortin et al. | |
| 6,272,675 B1 * | 8/2001 | Schrab et al. | 717/100 |
| 6,301,601 B1 * | 10/2001 | Helland et al. | 718/101 |
| 6,324,589 B1 * | 11/2001 | Chessell | 719/316 |
| 6,393,569 B1 | 5/2002 | Orenshteyn | |
| 6,457,065 B1 * | 9/2002 | Rich et al. | 719/328 |
| 6,553,384 B1 * | 4/2003 | Frey et al. | 707/103 R |
| 6,631,425 B1 * | 10/2003 | Helland et al. | 719/332 |
| 6,651,109 B1 | 11/2003 | Beck et al. | |
| 6,678,696 B1 * | 1/2004 | Helland et al. | 707/103 R |
| 6,832,380 B1 | 12/2004 | Lau et al. | |

FOREIGN PATENT DOCUMENTS

| | | |
|---|---|---|
| EP | 0559100 A2 | 2/1993 |
| EP | 0623876 A2 | 3/1994 |
| EP | 0638863 A1 | 10/1994 |
| EP | 0 674 260 A | 9/1995 |
| EP | 0 738 966 A | 10/1996 |
| EP | 0 777 178 A | 6/1997 |
| WO | WO 98 02809 A | 1/1998 |

OTHER PUBLICATIONS

Object Transaction Service, Groupe Bull, et al, OMG document 94.6.1, 1994.*

IEEE 100: The Authoritative Dictionary of IEEE Standards Terms, 2000, Standards Information Network IEEE Press, 7th Edition, p. 691.

Wollrath, Ann, et al., "Simple Activation for Distributed Objects," *Sun Microsystems Laboratories, Inc.,* Nov. 1995.

R. W. Baldwin. Naming and Grouping Privileges to Simplify Security Management in Large Databases. In Proceedings of the 1990 IEEE Symposium on Security and Privacy, pp. 116-132, May 1990.

Nyanchama, M., Osborn, S. (1994) Access Rights Administration in Role-Based Security Systems. Proc. IFIP WG 11.3 Database Security, 1994. In: Database Security VIII, Status and Prospects (J. Biskup, M. Morgenstern, C. E. Landwehr, Eds). North Holland (Elsevier) (pp. 1-23).

Moffett J.D., Sloman M.S. & Twidle K.P. (1990), Specifying Discretionary Access Control Policy for Distributed Systems, Computer Communications, vol. 13 No. 9 (Nov. 1990) pp. 571-580.

U. S. National Institute of Standards andTechnology. Federal information processing standards publication 140-1:Security requirements for cryptographic modules, Jan. 1984 (pp. 1-53).

Jonathan D. Moffett. Specification of Management Policies and Discretionary Access Control. In M. S. Sloman, editor, Network and Distributed Systems Management, chapter 18, pp. 18-1 through 18-21. Addison-Wesley, 1994.

Sloman, M., and J. Moffett. "Managing Distributed Systems", Domino Project Report, Imperial College, U.K. Sep. 1989 (pp. 1-23).

G. Wiederhold: Mediators in the Architecture of Future Information Systems. IEEE Computer, 25(3), 1992 (36 pages).

M. S. Sloman, Policy Driven Management for Distributed Systems. Journal of Network and Systems Management, 2(4): 333-360, Plenum Press Publishing, 1994 (22 pages in downloaded format).

Jonathan D. Moffett, Morris S. Sloman. Policy Hierarchies for Distributed Systems Management. IEEE Journal on Selected Areas in Communications, Special Issue on Network Management, 11(9):1404-1414, Dec. 1993 (22 pages in downloaded format).

Scott A. Gile. Reporting Application Usage in a LAN Environment, New Centerings in Computing Services, pp. 147-159 (1990).

Moffett J.D. & Sloman M.S (1991b), The Representation of Policies as System Objects, Proceedings of the Conference on Organisational Computer Systems (COCS'91) Atlanta, GA, Nov. 5-8, 1991, in SIGOIS Bulletin vol. 12, Nos. 2 & 3, pp. 171-184 (16 pages in downloaded format).

Barkley, "Role Based Access Control (RBAC)," Software Diagnostics and Conformance Testing National Institute of Standards and Technology (Mar. 1998).

Gavrila and Barkley, "Formal Specification for Role Based Access Control User/Role and Role/Role Relationship Management," (Oct. 1998).

Barkley, "Application Engineering in Health Care," pp. 1-7 (May 9, 1995).

Cugini and Ferraiolo, "Role Based Access Control Slide Set—May 1995," National Institute of Standards and Technology (1995).

Smith, Sr. et al., "A Marketing Survey of Civil Federal Government Organizations to Determine the Need for a Role-Based Access Control (RBAC) Security Product," Seta Corporation (Jul. 1996).

Ferraiolo and Barkley, "Specifying and Managing Role-Based Access Control within a Corporate Intranet," (1997).

Ferraiolo et al., "Role-Based Access Control (RBAC): Features and Motivations," (1995).

Kuhn, "Mutual Exclusion of Roles as a Means of Implementing Separation of Duty in Role-Based Access Control Systems," (1997).

Barkley, "Comparing Simple Role Based Access Control Models and Access Control Lists," (1997).

Barkley et al., "Role Based Access Control for the World Wide Web," (1997).

Ferraiolo and Kuhn, "Role-Based Access Control," Reprinted from Proceedings of 15th National Computer Security Conference (1992).

Barkley, "Implementing Role Based Access Control using Object Technology," (1995).

Tucker (editor, "The Computer Science and Engineering Handbook," chapter 49, pp. 1112-1124 and chapter 91, pp. 1929-1948 (1996).

Orfali, Harkey, Edwards, "Client/Server Transaction Processing," *Client/Server Survival Guide,* pp. 241-288 (1994).

Franklin, "Concurrency Control and Recovery," *The Computer Science and Engineering Handbook,* pp. 1058-1077 (1997).

Bernstein and Newcomer, "Database System Recovery," Principles of Transaction Processing for the Systems Professional, Morgan Kaufmann Publishers, Inc., San Francisco, CA, chapter 8, pp. 241-266 (Jan. 1997).

Gray & Reuter, "Log Manager," Transaction Processing: Concepts and Techniques, Morgan Kaufmann Publishers, San Francisco, CA, chapter 9, pp. 493-525 (1993).

Gray & Reuter, The Role of a Compensating Transaction, *Transaction Processing: Concepts and Techniques,* pp. 204-205 (1993).

Tucker, Jr. (Editor), Concurrency Control and Recovery, *The Computer Science and Engineering Handbook,* pp. 1058-1077 (Dec. 1996).

Asche, "Windows NT Security in Theory and Practice," Microsoft Developer Network CD, pp. 1-12, May 1995.

"CoInitializeSecurity," Microsoft Developer Network CD, pp. 1-2, Jul. 1996.

"Security and Scalability," Microsoft Developer Network CD, p. 1, Jul. 1996.

"RPC_C_IMP_LEVEL_xxx," Microsoft Developer Network CD, p. 1, Jul. 1996.

"RPC_C_AUTHN_xxx," Microsoft Developer Network CD, p. 1, Jul. 1996.

"CoRegisterAuthenticationServices," Microsoft Developer Network CD, p. 1, Jul. 1996.

Adams et al., "Pointer and Run-time Allocation," C++ *An Introduction to Computing,* chapter 15, pp. 860-869 (1995).

Brockschmidt, "Inside OLE" (second edition), chapter 5, pp. 219-276 and chapter 22, pp. 1011-1063 (1995).

"Java Remote Method Invocation Specification," *Java Development Kit (JDK),* vol. 1, Sun Microsystems, Inc., (1996,1997).

J. Steinman. "Incremental State Saving in Speeds Using C++," IEEE, pp. 687-696.

Limprecht R. Limprecht, "Microsoft Transaction Server," IEEE, Compcon '97, pp. 14-18.

R. Limprecht, "Microsoft Transaction Server", IEEE, pp. 14-18 (Feb. 1997).

G. Eddon, "COM+: The Evolution of Component Services", IEEE on Computer, pp. 104-106 (Jul. 1999).

Object Transaction Services, OMG document 94.6.1 (Jun. 1994).

(No author given) "Transaction Context Objects in Microsoft TRansaction Server", MSDN, pp. (2) (Jun. 1997).

D. Chappell, "The Microsoft Transaction Server (MTS)—Transactions Meet Components", white paper, Microsoft.com (Jun. 1997).

"Implementing Locale As Dynamically Loaded Shared Object Files", ibm Technical Disclosure Bulletin, US, IBM Corp., New York, vol. 34, No. 12, pp. 117-118 XP000308454 ISSN: 0018-8689—the whole document.

Tripathi, A.R. et al.: Design Of A Remote Procedure Call System For Object-Oriented Distributed Programming, Software Practice & Experience, GB, John Wiley & Sons Ltd., Chichester, vol. 28, No. 1, pp. 23-47 XP000723715, ISSN: 0038-0644—the whole document.

Tucker A. (Editor), Process Synchronization and Interprocess Communication, The Computer Science and Engineering Handbook, pp. 1725-1746 (Dec. 1996).

"Active Objects in Hybrid," Proceedings of OOPSLA 1987, by O.M. Nierstrasz, pp. 243-253, Oct. 4-8 (1987).

Kiczales, "Going Beyond Objects for Better Separation of Concerns in Design and Implementation," Aspect-Oriented-Programming, 1997, 1998.

Lopes et al., "Proceedings of the Apect-Oriented Programming Workshop at ECOOP '97," 1997.

Brockschmidt, "Chapter 6 Local/Remote Transparency," Inside Ole, 2d Ed., pp. 277-338 (1995).

Orfali et al., ["COM:OLE's Object Bus"], The Essential Distributed Objects Survival Guide, Ch. 25, pp. 429-452 (© 1996).

Orfali et al., "CORBA Services: System Management and Security," The Essential Distributed Objects Survival Guide, Ch. 10, pp. 183-202 (1996).

Hamilton (Ed.), "JavaBeans™," Sun Microsystems, Version 1.01, pp. 1-114. (Jul. 24, 1997).

Grimes, Chapter 7: Security, DCOM Programming: A guide to creating practical applications with Microsoft's Distributed Component Object Model, pp. 319-389 (1997).

DCOM Architecture, by Markus Horstmann and Mary Kirtland, pp. 1-51, Jul. 23, 1997.

Hamilton (editor), "Events," Sun Microsystems JavaBeans™, chapter 6, pp. 24-39 (1996, 1997).

Black, D.L., "Scheduling Support for Concurrency and Parallelism in the Mach Operating System," Computer, pp. 35-43 (May 1990).

King, A., "Inside Windows™ 95," Microsoft Press, pp. 103-150 (1994).

Abadi et al., "A Calculus for access Control in Distributed Systems," pp. iii-viii and 1-44 (Feb. 1991).

Abadi, "Baby Modula-3 and a Theory of Objects," SRC Research Report, pp. iii-iv and 1-36 (Feb. 1993).

Birrell et al., "Synchronization Primitives for a Multiprocessor: A Formal Specification," SRC Research Report, pp. i-iii and 1-20 (Aug. 1987).

Birrell, "An Introduction to Programming with Threads," SRC Research Report, pp. 1-33 (Jan. 1989).

Broy et al., "Can Fair Choice be Added to Dijkstra's Calculus?," SRC Research Report, pp. 1-17 (Feb. 1989).

Burstall et al., "A Kernal Language for Modules and Abstract Data Types," SRC Research Report, pp. 2-51 (Sep. 1984).

Cardelli, "A Polymorphic lambda-calculus with Type:Type," SRC Research Report, pp. 1-27 (May 1986).

Cardelli et al., "Modula-3 Report (revised)," SRC Research Report, pp. 1-71 (Nov. 1989).

DeTreville, "Experience with Concurrent Garbage Collectors for Modula-2+." SRC Research Report, pp. 1-54 (Nov. 1990).

Ellis et al., "Real-time Concurrent Collection on Stock Multiprocessors," SRC Research Report, pp. 1-24 (Feb. 1988).

Horning et al., "Some Useful Modula-3 Interfaces," SRC Research Report, pp. iii-vii and 1-103 (Dec. 1993).

Lamport, "A Fast Mutual Exclusion Algorithm," SRC Research Report, pp. iii and 1-12, (Nov. 1985).

Lamport, "A Simple Approach to Specifying Concurrent Systems," SRC Research Report, pp. iii-viii and 1-39 (Dec. 1986).

Lamport, "Concurrent Reading and Writing of Clocks," SRC Research Report, pp. iii-vi and 1-7 (Apr. 1988).

Lamport, "How to Make a Correct Multiprocess Program Execute Correctly on a Multiprocessor," SRC Research Report, pp. iii-vii and 1-10 (Feb. 1993).

Lamport, "On Interprocess Communication," SRC Research Report, pp. iii-viii and 1-50 (Dec. 1985).

Lamport, "win and sin: Predicate Transformers for Currency," SRC Research Report, pp. iii-ix and 1-43 (May 1987).

McJones et al., "Evolving the UNIX System Interface to Support Multithreaded Programs," SRC Research Report, pp. 1-80 (Sep. 1987).

Nelson, " A Generalization of Dijkstra's Calculus," SRC Research Report, pp. 1-56 (Apr. 1987).

Owicki, "Experience with the Firefly Multiprocessor Workstation," SRC Research Report, pp. 1-17 (Sep. 1989).

Roberts et al., "WorkCrews: An Abstraction for Controlling Parallelism," SRC Research Report, pp. 1-17 (Apr. 1989).

Rovner et al., "On Extending Modula-2 for Building Large, Integrated Systems," SRC Research Report, pp. 1-45 (Jan. 1985).

Schroeder et al., "Performance of Firefly RPC," pp. 1-15 (Apr. 1989).

Thacker et al., "Firefly: A Multiprocessor Workstation," SRC Research Report, pp. 1-17 (Dec. 1987).

D. Bruce, "The Treatment of State in Optimistic Systems", IEEE, pp. 40-49 (Jun. 1995).

OMG, The Common Object Request Broker: Architecture and Specification, revision 2.0, chapter 2; chapter 4, pp. 12-16 (Jul. 1995).

Nance, "Balance the Load with Transaction Server," BYTE Magazine, pp. 1-8 (Jun. 1997).

Neumann, "Security and Privacy Issues in Computer and Communication Systems," Ch. 89, The Computer Science and Engineering Handbook, (Tucker, Ed.), pp. 1910-1913 (1997).

Landwehr, Protection (Security) Models and Policy, Ch. 90, The Computer Science and Engineering Handbook, (Tucker, Ed.), pp. 1914-1928 (1997).

Sandhu et al., "Authentication, Access Control, and Intrusion Detection," Ch. 91, The Computer Science and Engineering Handbook, (Tucker, Ed.), pp. 1929-1948 (1997).

Bellovin, "Network and Internet Security," Ch. 92, The Computer Science and Engineering Handbook, (Tucker, Ed.), pp. 1949-1961 (1997).

Jajodia, "Database Security and Privacy," Ch. 49, The Computer Science and Engineering Handbook, (Tucker, Ed.), pp. 1112-1124 (1997).

Davis, "Inside IBM's SystemView," Datamation 37: 4, p. 62 (Feb. 25, 1991).

Bochenski, IBM's SystemView, 1st Edition, Computer Technology Research Corporation, 1991.

Deitel and Associates, "Classes and Data Abstraction," C++ How to Program, Chapter 6, pp. 344-356, (1994).

Cornell et al., "Objects and Classes," Core Java, 2nd Edition, The Sunset Press Java Series, Ch. 4, pp. 93-139 (1997).

Brockschmidt, "Inside OLE," (second edition), Chapter 1, "An Overview of OLE," pp. 3-60, and Part I: pp. 248-251 (1995).

Orfali et al., "RPC, Messaging, and Peer-to-Peer," Essential Client/Server Survival Guide chapter 9, pp. 119-128 (1994).

Tomsen, "Virtually Crash-Proof your Web site with IIS 4.0," Microsoft Interactive Developer, 2:10, pp. 41-46 (Oct. 1997).

Hackathorn R., "Publish or Perish, Solutions to overworked networks and unruly software distribution are just part of P&S," BYTE Magazine, pp. 1-15 (Sep. 1997).

"The Component Object Model: Technical Overview," Microsoft Corporation, pp. 1-17. (1996).

U.S. Appl. No. 09/328,683, filed Jun. 8, 1999, Williams et al.

Sun Microsystems, Inc, Java Transaction API (JTA), version 1.0.1, Apr. 1999.

"Object Services RFP2 Submission. Transaction Service Specification," SunSoft, Inc., Nov. 29, 1993, 36 pages.

* cited by examiner

SOFTWARE COMPONENT EXECUTION MANAGEMENT USING CONTEXT OBJECTS FOR TRACKING EXTERNALLY-DEFINED INTRINSIC PROPERTIES OF EXECUTING SOFTWARE COMPONENTS WITHIN AN EXECUTION ENVIRONMENT

RELATED APPLICATION DATA

This application is a continuation of the following applications: (1) U.S. patent application Ser. No. 09/225,896, entitled TRANSACTIONAL PROCESSING OF DISTRIBUTED OBJECTS WITH DECLARATIVE TRANSACTIONAL PROPERTIES, filed on Jan. 4, 1999 now U.S. Pat. No. 6,678,696, which is a continuation of U.S. Pat. No. 5,890,161, entitled AUTOMATIC TRANSACTION PROCESSING OF COMPONENT-BASED SERVER APPLICATIONS, filed as application Ser. No. 08/959,141 on Oct. 28, 1997 and issued on Mar. 30, 1999; (2) U.S. patent application Ser. No. 09/351,374, entitled DISABLING AND ENABLING TRANSACTION COMMITTAL IN TRANSACTIONAL APPLICATION COMPONENTS, filed on Jul. 12, 1999 now U.S. Pat. No. 6,301,601, which is a continuation of U.S. Pat. No. 5,958,004, entitled DISABLING AND ENABLING TRANSACTION COMMITTAL IN TRANSACTIONAL APPLICATION COMPONENTS, filed as application Ser. No. 08/959,142 on Oct. 28, 1997 and issued on Sep. 28, 1999; (3) U.S. patent application Ser. No. 08/958,975, entitled MULTI-USER SERVER APPLICATION ARCHITECTURE WITH SINGLE-USER OBJECT TIER, filed on Oct. 28, 1997 now U.S. Pat. No. 5,134,594; (4) U.S. patent application No. 08/959,139, entitled JUST-IN-TIME ACTIVATION AND AS-SOON-AS-POSSIBLE DEACTIVATION OF SERVER APPLICATION COMPONENTS, filed on Oct. 28, 1997 now U.S. Pat. No. 6,631,425; (5) U.S. patent application Ser. No. 08/959,149, entitled SERVER APPLICATION COMPONENTS WITH CONTROL OVER STATE DURATION, filed on Oct. 28, 1997 now U.S. Pat. No. 6,813,769; and (6) U.S. patent application Ser. No. 08/958,974, entitled DECLARATIVE AND PROGRAMMATIC ACCESS CONTROL OF COMPONENT-BASED SERVER APPLICATIONS USING ROLES, filed on Oct. 28, 1997 now U.S. Pat. No. 6,014,666.

FIELD OF THE INVENTION

The present invention relates to a server application-programming model using software components, and more particularly relates to managing execution of such components using context objects.

BACKGROUND AND SUMMARY OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations.

A first issue in many of these server applications is the ability to handle heavy processing loads. In the above server application examples, for instance, the updates for a large number of users may be submitted to the server application within a short time period. As each update may consume significant processing time, each additional user of the server application can slow the response or time to complete updates for all other users' updates, thus reducing the quality of service for all users. Eventually, the load may exceed the processing capacity, possibly resulting in system failure, down time, and lost data. The degree to which a server application can support incremental increases in user load while preserving performance is sometimes referred to as scalability.

One factor that affects server application scalability is the server application's use of memory to store user data while performing processing for that user. The server computer's memory is a limited resource that is shared among all the users of the server application. Because server computer memory is a shared fixed resource, the duration that the server application stores one user's data affects the availability of the memory to store other users' data. By minimizing the duration that data is stored in the server computer memory for each user, the server application is able to support many more clients with a given server computer memory capacity.

One approach to enhancing scalability is for the server application to keep user data in memory only during the course of a single interaction or exchange with a client (e.g., while processing one remote procedure call or message exchange from the client). The server application keeps a current state of each user's data (also referred to as the user's "state") in secondary storage (e.g., hard disk and other large capacity storage devices), and loads the state into the server computer's main memory only as long as necessary to perform a discrete processing operation on the data responsive to the single interaction. After completing processing of the single interaction, the server application again stores the state into secondary memory. This practice effectively shares the scarce main memory resources among the users. Using this practice, the server application can accommodate more users.

Under this "surgical strike" or "get in/get out" style of programming, the server application generally consisted of a group of functions or procedures that could be called remotely by client applications at the user's workstations to perform the discrete processing operations in a single interaction between the client and server application. In general, the user's state was loaded into main memory at the start of the function, and stored away at the function's completion. Also, the function's parameter list would contain all input data from the client application that was needed for the processing operation. This would sometimes lead to server application functions with extensive parameter lists. For example, a simple function in a banking server application for a money transfer might include parameters for the amount to be transferred, the account number to debit, the account number to credit, the authorization number, the check number, the teller id, the branch id, etc.

Programming models generally known as object-oriented programming provide many benefits that have been shown to increase programmers' productivity, but are in many ways antithetical to the just discussed approach to enhancing scalability. In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

Object-oriented programming generally has advantages in ease of programming, extensibility, reuse of code, and integration of software from different vendors and (in some object-oriented programming models) across programming languages. However, object-oriented programming techniques generally are antithetical to the above-discussed approach to enhancing server application scalability by minimizing the duration of state to single client/server application interactions. In object-oriented programming, the client program accesses an object by obtaining a pointer or reference to an instance of the object in memory. The client program retains this object reference throughout the course of its interaction with the object, which allows the client program to call member functions on the object. So long as any client programs have a reference to an object's instance, data associated with the instance is maintained in memory to avoid the client issuing a call to an invalid memory reference. At the very least, even where the client program calls only a single member function, the object instance is kept in memory between the client program's initial call to request a reference to the object instance and the client program's call to release the reference (between which the client program issues one or more calls to member functions of the object using the reference). In other words, the client program has control over the object's lifetime. The object is kept in memory until the client's reference to the object is released.

Also, object-oriented programming encourages setting an object's properties using separate member functions. For example, a money transfer object may provide a set of member functions that includes a SetDebitAccount( ) function, a SetCreditAccount( ) function, a SetTransferAmount( ) function, etc. that the client program calls to set the object's properties. Finally, the client program may call a TransferMoney( ) function to cause the object to perform the money transfer operation using the accumulated object properties (also referred to as the object's state). Again, while the client program issues these separate calls, the object is maintained in memory. In a server application, this programming style can drastically reduce the server application's scalability.

A further disadvantage of object-oriented programming of server applications is that each separate operation with or use of an object often requires creating a separate instance of the object. This is because the accumulated properties that are set for one operation with an object typically differ from the settings of the properties in another operation. In the above money transfer object example, for instance, separate money transfer operations usually involve different account numbers and transfer amounts. Since the accumulated state of an object is retained, the client program either instantiates a new instance of the object for a subsequent money transfer or carefully resets each property of the previously used object instance to avoid carrying properties set in the previous money transfer over to the subsequent transfer. However, instantiating each object also is expensive in terms of processing time and thus further reduces server application scalability.

A second issue is that server applications often require coordinating activities on multiple computers, by separate processes on one computer, and even within a single process. For example, a money transfer operation in a banking application may involve updates to account information held in separate databases that reside on separate computers. Desirably, groups of activities that form parts of an operation are coordinated so as to take effect as a single indivisible unit of work, commonly referred to as a transaction. In many applications, performing sets of activities as a transaction becomes a business necessity. For example, if only one account is updated in a money transfer operation due to a system failure, the bank in effect creates or loses money for a customer.

A transaction is a collection of actions that conform to a set of properties (referred to as the "ACID" properties) which include atomicity, consistency, isolation, and durability. Atomicity means that all activities in a transaction either take effect together as a unit, or all fail. Consistency means that after a transaction executes, the system is left in a stable or correct state (i.e., if giving effect to the activities in a transaction would not result in a correct stable state, the system is returned to its initial pre-transaction state). Isolation means the transaction is not affected by any other concurrently executing transactions (accesses by transactions to shared resources are serialized, and changes to shared resources are not visible outside the transaction until the transaction completes). Durability means that the effects of a transaction are permanent and survive system failures. For additional background information on transaction processing, see, inter alia, Jim Gray and Andreas Reuter, *Transaction Processing Concepts and Techniques*, Morgan Kaufmann, 1993.

In many current systems, services or extensions of an operating system referred to as a transaction manager or transaction processing (TP) monitor implement transactions. A transaction is initiated by a client program, such as in a call to a "begin_transaction" application programming interface (API) of the transaction monitor. Thereafter, the client initiates activities of a server application or applications, which are performed under control of the TP monitor. The client ends the transaction by calling either a "commit_transaction" or "abort_transaction" API of the TP monitor. On receiving the "commit_transaction" API call, the TP monitor commits the work accomplished by the various server application activities in the transaction, such as by effecting updates to databases and other shared resources. Otherwise, a call to the "abort_transaction" API causes the TP monitor to "roll back" all work in the transaction, returning the system to its pre-transaction state.

In systems where transactions involve activities of server applications on multiple computers, a two-phase commit protocol often is used. In general, the two-phase commit protocol centralizes the decision to commit, but gives a right of veto to each participant in the transaction. In a typical implementation, a commit manager node (also known as a root node or transaction coordinator) has centralized control of the decision to commit, which may for example be the TP monitor on the client's computer. Other participants in the transaction, such as TP monitors on computers where a server application performs part of the work in a transaction, are referred to as subordinate nodes. In a first phase of commit, the commit manager node sends "prepare_to_commit" commands to all subordinate nodes. In response, the subordinate nodes perform their portion of the work in a transaction and return "ready_to_commit" messages to the commit manager node. When all subordinate nodes return ready_to_commit messages to the commit manager node, the commit manager node starts the second phase of commit. In this second phase, the commit manager node logs or records the decision to commit in durable storage, and then orders all the subordinate nodes to commit their work making the results of their work durable. On committing their individual portions of the work, the subordinate nodes send confirmation messages to the commit manager node. When all subordinate nodes confirm committing their work, the commit manager node reports to the client that the transaction was completed successfully. On the other hand, if any subordinate node returns a refusal to commit during the first phase, the commit manager node orders all other subordinate nodes to roll back their work, aborting the transaction. Also, if any subordinate node fails in the second phase, the uncommitted work is maintained in durable storage and finally committed during failure recovery.

In transaction processing, it is critical that the client does not pre-maturely commit a server application's work in a transaction (such as database updates). For example, where the activity of a server application in a transaction is to generate a sales order entry, the server application may impose a requirement that a valid sales order entry have an order header (with customer identifying information filled in) and at least one order item. The client therefore should not commit a transaction in which the server application generates a sales order before both an order header and at least one order item in the sales order has been generated. Such application-specific requirements exist for a large variety of server application activities in transactions.

Historically, pre-mature client committal of a server application's work in a transaction generally was avoided in two ways. First, the server application can be programmed such that its work in a transaction is never left in an incomplete state when returning from a client's call. For example, the server application may implement its sales order generation code in a single procedure which either generates a valid sales order complete with both an order header and at least one order item, or returns a failure code to cause the client to abort the transaction. The server application's work thus is never left in an incomplete state between calls from the client, and would not be committed prematurely if the client committed the transaction between calls to the server application.

Second, the client and server application typically were developed together by one programmer or a group of programmers in a single company. Consequently, since the programmers of the server application and client were known to each other, the server application programmers could ensure that the client was not programmed to commit a transaction between calls that might leave the server application's work in an incomplete state. For example, the client's programmers could be told by the server application programmers not to call the commit_transaction API after a call to the server application that sets up an order header and before a call to the server application that adds an order item.

These historical approaches to avoiding pre-mature committal of server application work in a transaction are less effective for, and in some ways antithetical to, component-based server applications that are programmed using object-oriented programming techniques (described above). Object-oriented programming generally has advantages in ease of programming, extensibility, reuse of code, and integration of software from different vendors and (in some object-oriented programming models) across programming languages. However, object-oriented programming techniques generally are antithetical to the above described historical approaches to avoiding pre-mature committal of server application work.

First, object-oriented programming techniques encourage accomplishing work in multiple client-to-object interactions. Specifically, object-oriented programming encourages setting an object's properties in calls to separate member functions, then carrying out the work with the set properties in a call to a final member function. For example, a money transfer object may provide a set of member functions that includes a SetDebitAccount( ) function, a SetCreditAccount( ) function, a SetTransferAmount( ) function, etc. that the client program calls to set the object's properties. Finally, the client program may call a TransferMoney( ) function to cause the object to perform the money transfer operation using the accumulated object properties (also referred to as the object's state). Between these separate client-object interactions, server application work may often be left in an incomplete state. The object-oriented programming style thus is contrary to the above described approach to avoiding pre-mature committal wherein server application work is never left incomplete on return from a client call.

Second, object-oriented programming also encourages integration of objects supplied from unrelated developers and companies. When the server application is built from object classes supplied from unrelated vendors, there is less opportunity for direct collaboration between developers of the server application and the client. Without direct collaboration, the developer of an object used in a server application generally cannot ensure that the developer of a client will not commit a transaction between calls to the server application object which leave the server application's work in an incomplete state. Thus, the second above described approach to avoiding pre-mature committal also is less effective in component-based server applications.

Additionally, in the prior transaction processing systems discussed above, transactions are initiated and completed by explicit programming in the client program, such as by calls to the begin_transaction, commit_transaction and abort_transaction APIs of the transaction monitor. This adds to complexity and increases the burden of programming the server application and client program. Specifically, the client program must be programmed to properly initiate and complete a transaction whenever it uses a server application to perform work that requires a transaction (e.g., work which involves multiple database updates that must be completed together as an atomic unit of work). The server application, on the other hand, relies on its clients to properly manage transactions, and cannot guarantee that all client programs properly initiate and complete transactions when using the server application. The server application therefore must be programmed to handle the special case where the client fails to initiate a needed transaction when using the server application.

The requirement of a client program to explicitly initiate and complete transactions can pose further difficulties in programming models in which the server application is implemented as separate software components, such as in object-oriented programming ("OOP"). Object-oriented programming generally has advantages in ease of programming, extensibility, reuse of code, and integration of software from different vendors and (in some object-oriented programming models) across programming languages. However, object-oriented programming models can increase the complexity and thus programming difficulty of the server application where transaction processing requires explicit initiation and completion by client programs. In particular, by encouraging integration of software components from different vendors, an object-oriented programming model makes it more difficult for programmers to ensure that the client program properly initiates and completes transactions involving the server application's work. Components that are integrated to form the server application and client programs may be supplied by programmers and vendors who do not directly collaborate, such that it is no longer possible to enforce proper behavior of other components by knocking on a colleague's door down the hall. In the absence of direct collaboration, the programmers often must carefully program the components to handle cases where transactions are not properly initiated and completed by the components' clients.

A third issue in a server application that is used by a large number of people, it is often useful to discriminate between what different users and groups of users are able to do with the server application. For example, in an on-line bookstore server application that provides processing services for entering book orders, order cancellations, and book returns, it may serve a useful business purpose to allow any user (e.g., sales clerk or customers) to access book order entry processing services, but only some users to access order cancellation processing services (e.g., a bookstore manager) or book return processing services (e.g., returns department staff).

Network operating systems on which server applications are typically run provide sophisticated security features, such as for controlling which users can logon to use a computer system, or have permission to access particular resources of the computer system (e.g., files, system services, devices, etc.) In the Microsoft Window NT operating system, for example, each user is assigned a user id which has an associated password. A system administrator also can assign sets of users to user groups, and designate which users and user groups are permitted access to system objects that represent computer resources, such as files, folders, and devices. During a logon procedure, the user is required to enter the user id along with its associated password to gain access to the computer system. When the user launches a program, the Windows NT operating system associates the user id with the process in which the program is run (along with the process' threads). When a thread executing on the user's behalf then accesses a system resource, the Windows NT operating system performs an authorization check to verify that the user id associated with the thread has permission to access the resource. (See, Custer, *Inside Windows NT* 22, 55–57, 74–81 and 321–326 (Microsoft Press 1993).)

A thread is the basic entity to which the operating system allocates processing time on the computer's central processing unit. A thread can execute any part of an application's code, including a part currently being executed by another thread. All threads of a process share the virtual address space, global variables, and operating-system resources of the process. (See, e.g., Tucker Jr., Allen B. (editor), *The Computer Science and Engineering Handbook* 1662–1665 (CRC Press 1997).)

The Windows NT operating system also provides a way, known as impersonation, to authenticate access from a remote user to resources of a server computer in a distributed network. When a request is received from a remote computer for processing on the server computer, a thread that services the request on the server computer can assume the user id from the thread on the remote computer that made the request. The Windows NT operating system then performs authorization checks on accesses by the servicing thread to system resources of the server computer based on the user id. (See, Siyan, *Windows NT Server* 4, *Professional Reference* 1061 (New Riders 1996).)

The use of such operating system security features to control access to particular processing services in a server application presents cumbersome distribution and deployment issues. The user ids and user groups are configured administratively per each computer station and/or network, and thus vary between computers and networks. When the particular user ids or groups that will be configured on a computer system are known at the time of developing a server application, the server application can be designed to control access to particular processing services and data based on those user ids and groups. Alternatively, specific user ids or groups that a server application uses as the basis for access control can be configured on a computer system upon deployment of the server application on the computer system. These approaches may be satisfactory in cases where development and deployment is done jointly, such as by in-house or contracted developers. However, the approaches prove more cumbersome when server application development and deployment are carried out separately, such as where an independent software vendor develops a server application targeted for general distribution and eventual installation at diverse customer sites. On the one hand, the server application developer does not know which user ids and groups will be configured on the end customers' computer systems. On the other, the server application developer must force system administrators to configure specific user ids or groups, which at a minimum could lead to an administratively unwieldy number of user configurations and at worst poses a security risk on the computer systems of the developer's customers.

According to a fourth issue, because these server applications service a large number of users, the server applications must be programmed to deal with problems of concurrent shared access by multiple users. Shared access by multiple users create a number of well-known problems in correctly synchronizing updates by the users to durable data, isolating processing of one user from that of another, etc. These shared access problems are similar to those faced by users of a joint checking account when one user fails to notify the other of changes to the account balance before a check is written, possibly resulting in an overdraft. For example, a server application for an on-line bookstore faces a shared access problem where two customers concurrently place an order for the same book, and there is only one copy of the book in inventory. If the on-line bookstore application fails to update an inventory database to reflect sale of the book to the first customer before inventory is checked for the second customer's order, then the single book in inventory might be sold to both customers.

A number of concurrency isolation mechanisms for dealing with shared access problems in computer programs are known, including locks, semaphores, condition variables, barriers, joins, and like programming constructs that regulate concurrent access to program code and data. (See, e.g., Tucker Jr., Allen B. (editor), *The Computer Science and Engineering Handbook*, pp. 1662–1665, CRC Press 1997.) However, even with use of these concurrency isolation mechanisms, the task of programming a server application to deal with shared access problems is complex and difficult. Developers of server applications estimate that 30–40% of the development effort is spent on providing infrastructure, including for dealing with shared access problems, as opposed to implementing the business logic of the processing services that the server application is meant to provide. Further, concurrency isolation mechanisms are among the more sophisticated aspects of programming, and typically require the efforts of highly skilled programmers.

By contrast, applications on a single user computing platform are relatively much easier to program. The programmer need not account for shared access problems, and need not implement complex infrastructure to regulate access to code and data by multiple users. Programmers of single user applications thus can concentrate on implementing the "business logic" or data processing services of the application itself. As a result, programmers of single user applications can realize higher productivity, and do not require the added time and expense to acquire the skills necessary to work with sophisticated concurrency isolation mechanisms.

A programming model that is now commonly used in single user computing platforms is object-oriented programming (OOP). Object-oriented programming generally has advantages in ease of programming, extensibility, reuse of code, and integration of software from different vendors and (in some object-oriented programming models) across programming languages. However, object-oriented programming in itself does not solve shared access problems in a multiple user computing system. Thus, when object-oriented programming techniques are used to program server applications, concurrency isolation mechanisms are still needed to regulate shared access of multiple users.

For example, a user of an object typically accomplishes processing work over multiple interactions with the object. First, the user calls member functions through interfaces of the object that set various data properties of the object (also referred to herein as the "data state" of the object). Then, the user calls one or more member functions to initiate processing based on the previously set data properties. If a second user accesses the object between a first user's interactions with the object, the second user can potentially alter the object's data state causing unintended consequences when the first user initiates processing based on the data state.

The present invention provides for management of software components in an object execution environment, such as for transaction processing, access control, concurrency control, and other externally managed operations, using implicitly associated context objects to store intrinsic context properties of the software components. When the server application component is run in the execution environment of an embodiment of the invention illustrated herein, an object management system maintains a component context object associated with the application component. The component context object provides context for the execution of the application component in the execution environment. The component context object has a lifetime that is coextensive with that of the application component. The object management system creates the component context object when the application component is initially created, and destroys the component context object after the application component is destroyed (i.e., after the last reference to the application component is released).

The component context object contains intrinsic properties of the application component that are determined at the component's creation. These properties include a client id, an activity id, and a transaction reference. The client id refers to the client program that initiated creation of the application component. The activity id refers to an activity that includes the application component. An activity is a set of components executing on behalf of a base client, within which only a single logical thread of execution is allowed. The transaction reference indicates a transaction property object that represents a transaction (i.e., an atomic unit of work that is either done in its entirety or not at all) in which the application component participates. The component context object is implemented as a COM Object that runs under control of the object management system. The component context object provides an "IObjectContext" interface described in more detail below, that has member functions called by the application component for use in transaction processing, in creating additional other application components inheriting component's context properties, and in access control based on abstract user classes (roles).

In the illustrated execution environment, the object management system maintains an implicit association of the component context object to the application component. In other words, the object management system does not pass a reference of the component context object to the client program which uses the application component. Rather, the object management system maintains the component's association with the context object, and accesses the component context object when needed during the client program's access to the application component. Thus, the client program is freed from explicitly referencing the component context object while creating and using the application component.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

In one embodiment of the invention illustrated herein, the invention is incorporated into an application server execution environment or platform, entitled "Microsoft Transaction Server," marketed by Microsoft Corporation of Redmond, Wash. Briefly described, this software provides a run-time environment and services to support component-based server applications in a distributed network.

Exemplary Operating Environment

Figure 1:
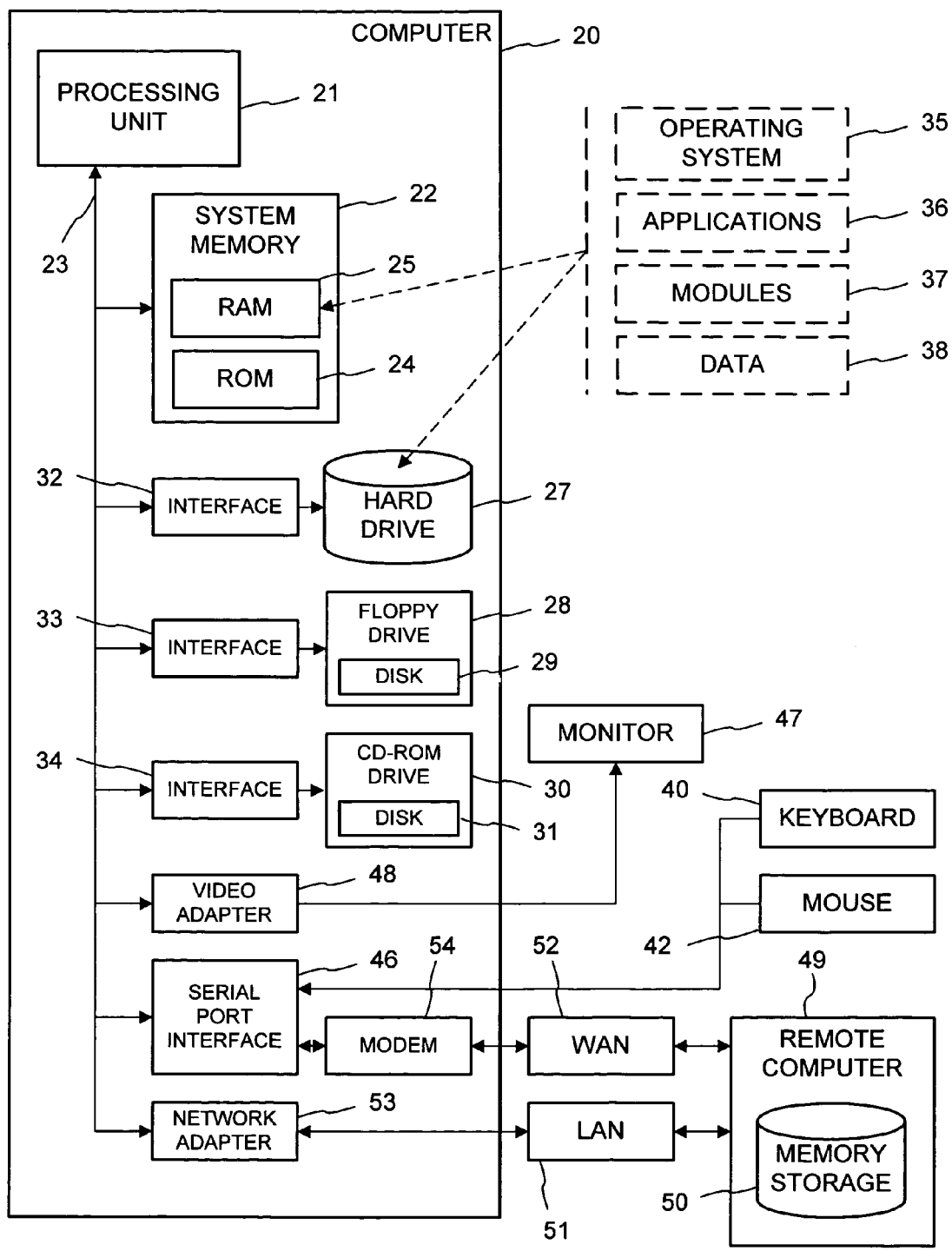
FIG. 1 is a block diagram of a distributed computer system that may be used to implement a method and apparatus embodying the invention.

FIG. 1 and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional server computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the server computer 20, such as during start-up, is stored in ROM 24.

The server computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the server computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated server computer is the Microsoft Windows NT Server operating system, together with the before mentioned Microsoft Transaction Server.

A user may enter commands and information into the server computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, server computers typically include other peripheral output devices (not shown), such as speakers and printers.

The server computer 20 may operate in a networked environment using logical connections to one or more remote computers, such as a remote client computer 49. The remote computer 49 may be a workstation, a server computer, a router, a peer device or other common network node, and typically includes many or all of the elements described relative to the server computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the server computer 20 is connected to the local network 51 through a network interface or adapter 53. When used in a WAN networking environment, the server computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the server computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the server computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Multi-Tier Server Application Architecture

Figure 2:
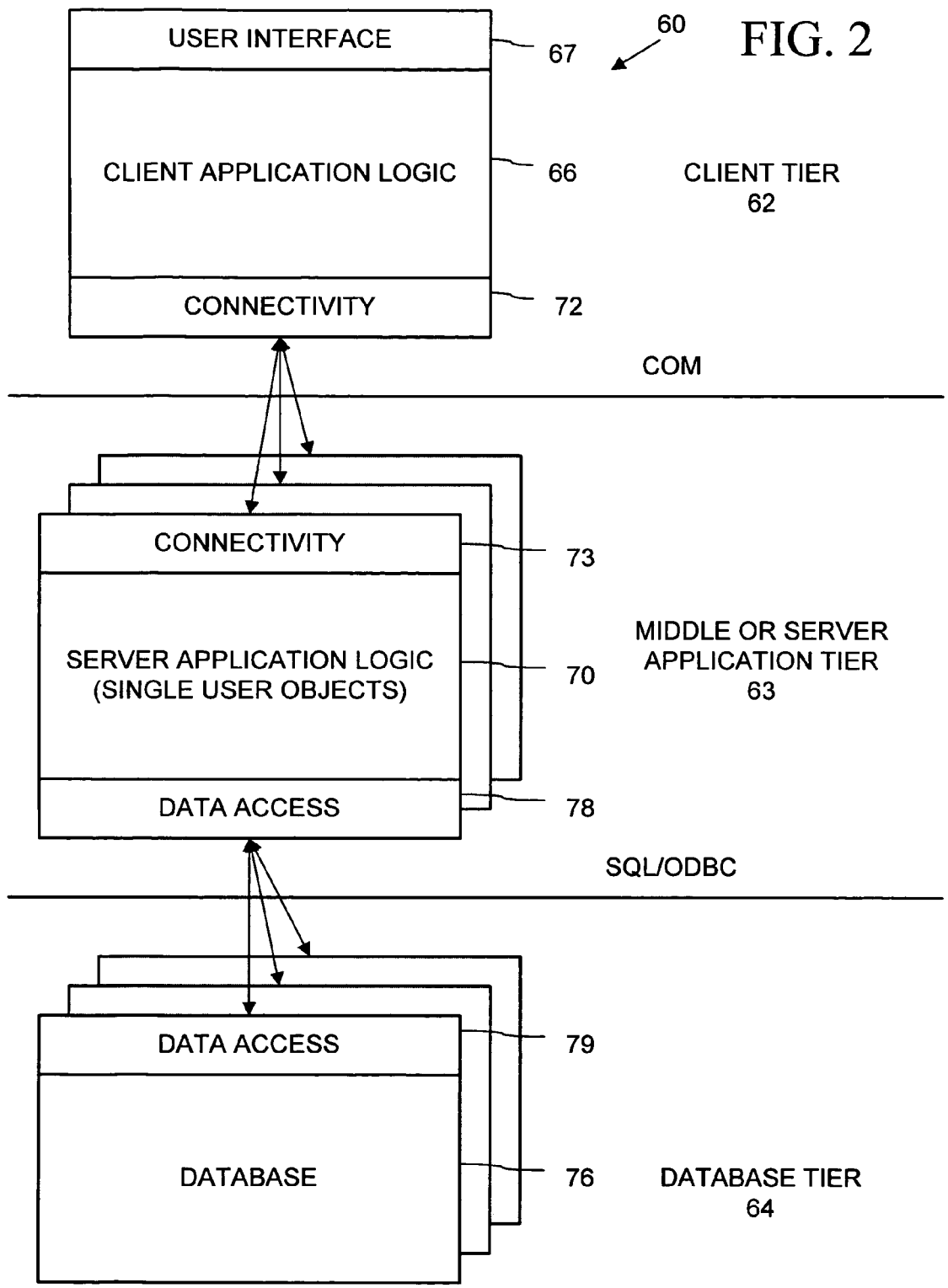
FIG. 2 is a block diagram of a multi-tier server application architecture having a single-user object-oriented application code on a middle tier in accordance with the invention.

With reference to FIG. 2, a multi-tier server application architecture 60 according to an illustrated embodiment of the invention segregates program code of the server application into three tiers, herein termed the client tier 62, the middle or server application tier 63, and the database tier 64. The client tier 62 comprises program code 66 that implements client application (the "client application logic"). Typically, the client application 66 runs on a user's workstation that connects to the server computer 20 (FIG. 1) on a distributed network. The client application 66 also typically implements a user interface 67 which responds to user inputs to initiate processing at the server computer 20.

The server application tier 63 comprises program code 70 that implements the business logic of the server application (hereafter the "server application logic" 70). Typically, the server application runs on the server computer 20 (FIG. 1). The client application 66 communicates with the server application logic 70 using connectivity code 72–73 to initiate processing by the server application for the user. In the illustrated multi-tier architecture 60, the connectivity code 72–73 is the Component Object Model ("COM") protocol of Microsoft Corporation's OLE and ActiveX specifications. In alternative embodiments of the invention, the connectivity code 72–73 can be implemented using other protocols for remotely invoking processing functions of the server application, such as remote procedure calls, message passing, etc.

In accordance with the invention, the server application logic 70 on the server application tier is composed of object-oriented code where access to individual object instances is limited to a single user. More particularly, the server application logic 70 in the illustrated multi-tier architecture 60 is implemented as a set of COM Objects that run in a system provided process under control of a run-time service which limits the objects to single user access. These COM Objects which implement the server application logic 70 are herein referred to as server application components.

Because the server application components on the middle tier 70 are limited to single user access, the programmer need not implement complex programming constructs in the server application components to control shared access by multiple users. The programmer thus can concentrate on implementation of the business logic of the server application in the server application components, rather than the shared access control infrastructure. As a result, the programmer can realize increased productivity by saving the programming effort that otherwise would be expended on providing such infrastructure.

The database tier 64 of the illustrated architecture 60 comprises code and data to which multiple users share access. Typically, this shared access code and data takes the form of a database 76, such as the Microsoft SQL Server relational database management system. The server application components 70 use data access services 78–79 to access data from the database 76. In the illustrated architecture 60, the data access services 78–79 take the form of SQL queries, or database connections conforming to the Microsoft Open Database Connectivity ("ODBC") call level interface. When writing code in the server application architecture for the database tier 64, the programmer must include constructs to account for shared access. However, with the separate middle tier 63 limited to single user access, the programmer can implement all business logic for the server application in single-user object-oriented code that runs in the middle tier 63. In most applications, the server application programmer can configure an existing database for use in the database tier 64, and will not need to implement shared access code for the server application.

Server Application Execution Environment

Figure 3:
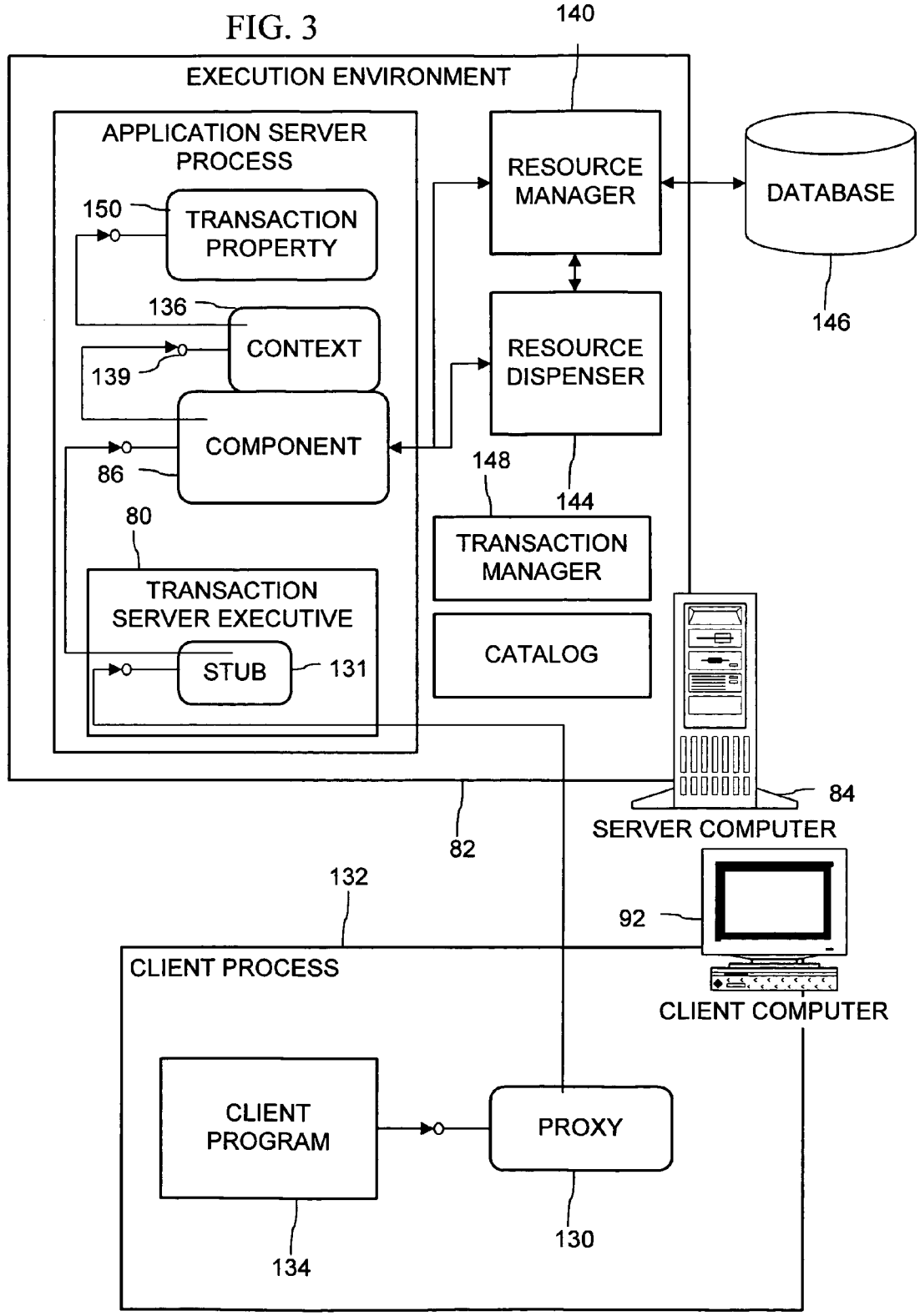
FIG. 3 is a block diagram of a server application component execution environment provided by a server executive on a server computer in the distributed computer system of FIG. 1.

With reference now to FIG. 3, a transaction server executive 80 provides run-time or system services to create a run-time execution environment 80 on a server computer 84 for the server application components (e.g., server application component 86) that form the server application logic 70 of the middle tier 63 of the multi-tier architecture 60 (FIG. 2). The transaction server executive also provides services for thread and context management to the server application components 86. Included in the services are a set of API functions, including a GetObjectContext and a SafeRef API functions described below. Additionally, the transaction server executive 80 provides system-defined objects (including a component context object 136) that support component integration interfaces.

The illustrated transaction server executive 80 is implemented as a dynamic link library ("DLL"). (A DLL is a well-known executable file format which allows dynamic or run-time linking of executable code into an application program's process.) The transaction server executive 80 is loaded directly into application server processes (e.g., "ASP" 90) that host server application components, and runs transparently in the background of these processes.

The illustrated ASP 90 is a system process that hosts execution of server application components. Each ASP 90 can host multiple server application components that are grouped into a collection called a "package." Also, multiple ASPs 90 can execute on the server computer under a multi-threaded, multi-tasking operating system (e.g., Microsoft Windows NT in the illustrated embodiment). Each ASP 90 provides a separate trust boundary and fault isolation domain for the server application components. In other words, when run in separate ASPs, a fault by one server application component which causes its ASP to terminate generally does not affect the server application components in another ASP.

Figure 15:
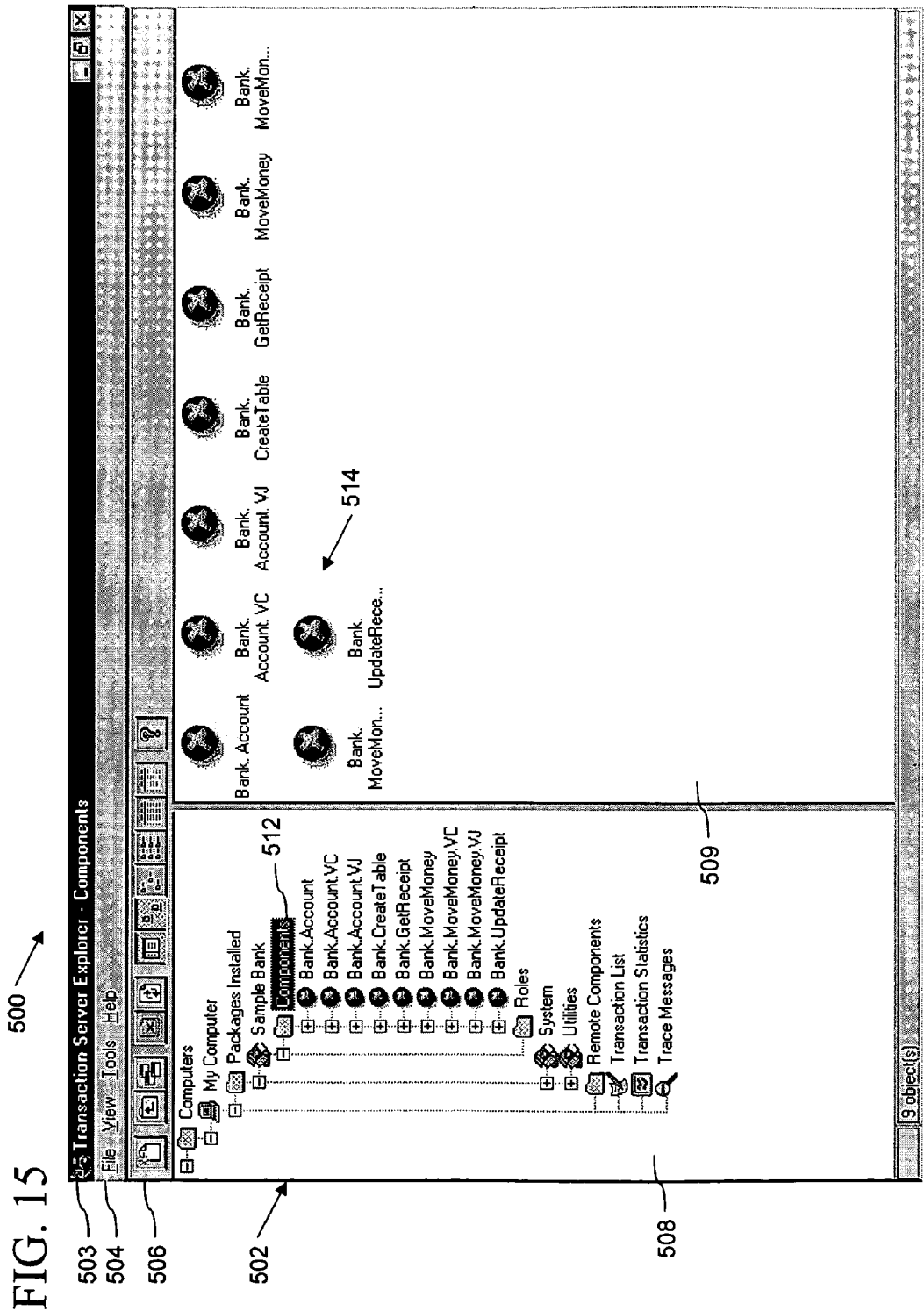
FIG. 15 is a view of a graphical user interface of an administration utility called the Transaction Server Explorer, for grouping server application components into packages and declaring roles.

With reference to FIG. 15, server application components in the illustrated embodiment are grouped as a package to be run together in one ASP 90 using an administration utility called "the Transaction Server Explorer." This utility provides a graphical user interface (shown in FIGS. 15–26) for managing attributes associated with server application components, including grouping the components into packages and defining roles as discussed below.

In a typical installation shown in FIG. 3, the execution environment 80 is on the server computer 84 (which may be an example of the computer 20 described above) that is connected in a distributed computer network comprising a large number of client computers 92 which access the server application components in the execution environment. Alternatively, the execution environment 80 may reside on a single computer and host server application components accessed by client processes also resident on that computer.

Server Application Components

The server application components 86 that are hosted in the execution environment 80 of the ASP 90 implement the business logic of a server application, such as the code to manage class registrations in a university's registration application or orders in an on-line sales application. Typically, each server application comprises multiple components, each of which contains program code for a portion of the application's work. For example, a banking application may comprise a transfer component, a debit account component, and a credit account component which perform parts of the work of a money transfer operation in the application. The debit account component in this banking application example implements program code to debit a specified account in a banking database by a specified amount. The credit account component implements program code to credit a specified account in the database by a specified amount. The transfer component implements program code that uses the debit account component and credit account component to effect a money transfer between two accounts.

Figure 4:
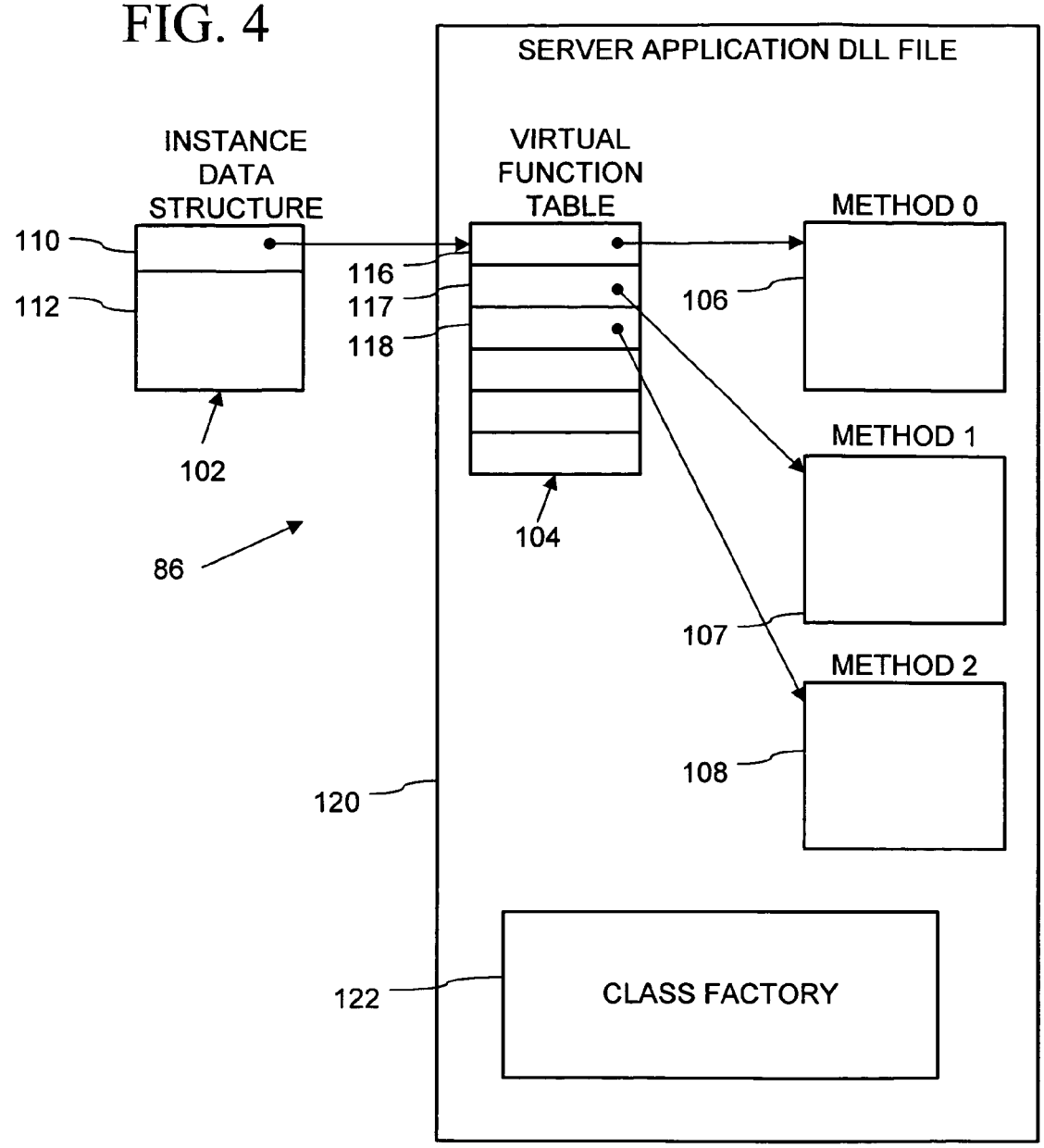
FIG. 4 is a block diagram of the structure of a server application component in the execution environment of FIG. 3.

With reference now to FIG. 4, the server application component 86 (FIG. 2) in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. For a detailed discussion of OLE, see Kraig Brockschmidt, *Inside OLE, Second Edition*, Microsoft Press, Redmond, Wash., 1995.

In accordance with COM, the server application component 86 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the component). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the server application component 86. By convention, the interfaces of a COM object are illustrated graphically as a plug-in jack as shown for the server application component 100 in FIG. 3. Also, Interfaces conventionally are given names beginning with a capital "I." In accordance with COM, the server application component 86 can include multiple interfaces which are implemented with one or more virtual function tables. The member function of an interface is denoted as "IInterfaceName::FunctionName."

The virtual function table 104 and member functions 106–108 of the server application component 86 are provided by a server application program 120 (hereafter "server application DLL") which is stored in the server computer 84 (FIG. 2) as a dynamic link library file (denoted with a ".dll" file name extension). In accordance with COM, the server application DLL 120 includes code for the virtual function table 104 (FIG. 3) and member functions 106–108 (FIG. 3) of the classes that it supports, and also includes a class factory 122 that generates the instance data structure 102 (FIG. 3) for a component of the class.

Like any COM object, the sever application component can maintain internal state (i.e., its instance data structure 102 including data members 112) across multiple interactions with a client (i.e., multiple client program calls to member functions of the component). The server application component that has this behavior is said to be "stateful." The server application component can also be "stateless," which means the component does not hold any intermediate state while waiting for the next call from a client.

In the execution environment 80 of FIG. 3, the server application component 86 is executed under control of the transaction server executive 80 in the ASP 90. The transaction server executive 80 is responsible for loading the server application DLL 300 into the ASP 90 and instantiating the server application component 86 using the class factory 122 during activation of the component as described in more detail below. The transaction server executive 80 further manages calls to the server application component 86 from client programs (whether resident on the same computer or over a network connection).

The illustrated execution environment 80 imposes certain additional requirements on the server application component 86 beyond conforming with COM requirements. First, the server application component is implemented in a DLL file (i.e., the server application DLL 120 of FIG. 4). (COM objects otherwise alternatively can be implemented in an executable (".exe") file.) Second, the component's DLL file 120 has a standard class factory 122 (i.e., the DLL implements and exports the DllGetClassObject function, and supports the IClassFactory interface). Third, the server application component exports only interfaces that can be standard marshaled, meaning the component's interfaces are either described by a type library or have a proxy-stub DLL. The proxy-stub DLL provides a proxy component 130 in a client process 132 on the client computer 92, and a stub component 131 in the ASP 90 on the server computer 84. The proxy component 130 and stub component 131 marshal calls from a client program 134 across to the server computer 84. The proxy-stub DLL in the illustrated system is built using the MIDL version 3.00.44 provided with the Microsoft Win32 SDK for Microsoft Windows NT 4.0 with the Oicf compiler switch, and linked with the transaction server executive 80. These additional requirements conform to well known practices.

The client program 134 of the server application component 86 is a program that uses the server application component. The client program can be program code (e.g., an application program, COM Object, etc.) that runs outside the execution environment 80 (out of the control of the transaction server executive 80). Such client programs are referred to as "base clients," and generally form the client application logic 66 in the client tier 62 of the multi-tier server application architecture 60 (FIG. 2). Alternatively, the client program 134 can be another server application component that also runs under control of the transaction server executive (either in the same or a separate ASP 90) in the middle tier 63 (FIG. 2). The client program 134 can reside on the server computer 84 or on a separate client computer 92 as shown in FIG. 3 (in which case the client computer interacts with the server application component 86 remotely through the proxy object 130 and stub object 131).

Figure 28:
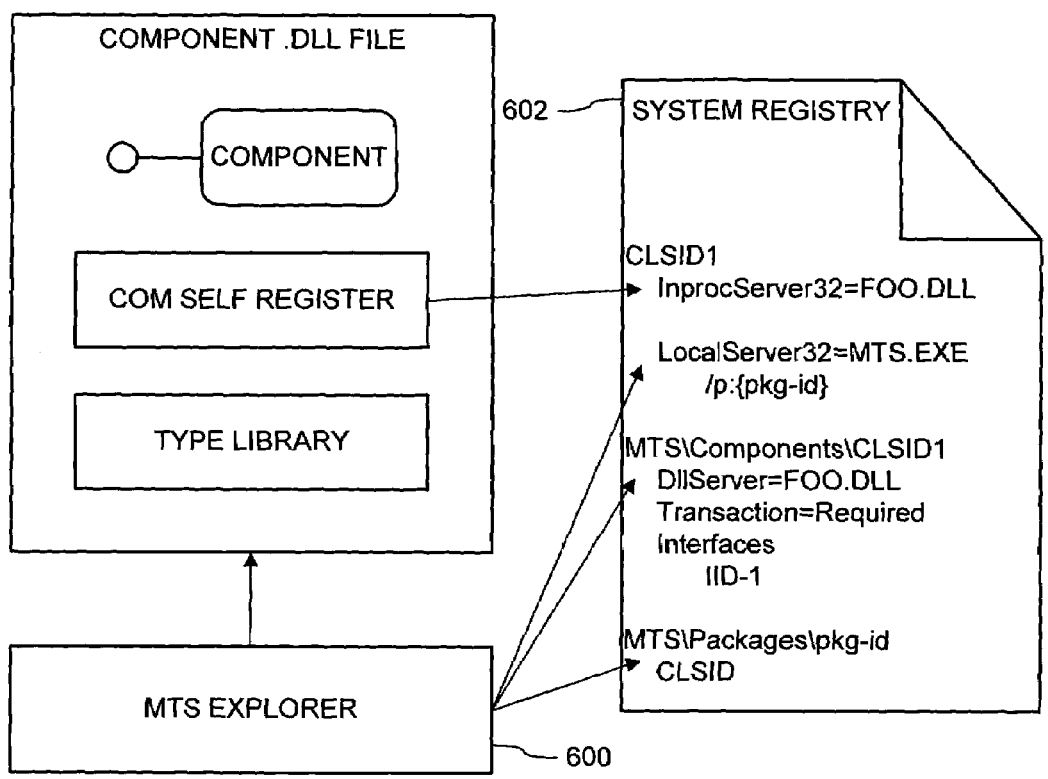
FIG. 28 is a block diagram showing registration of attributes for running a server application component grouped in the package of FIG. 27 in the execution environment of FIG. 3 at installation on the server computer of FIG. 1.

Before the server application component 86 can execute in the illustrated execution environment 80, the server application component 86 is first installed on the server computer 84. As with any COM object, the server application component 86 is installed by storing the server application DLL file 120 that provides the server application component 86 in data storage accessible by the server computer (typically the hard drive 27, shown in FIG. 1, of the server computer), and registering COM attributes (e.g., class identifier, path and name of the server application DLL file 120, etc. as described below) of the server application component in the system registry. The system registry is a configuration database. Preferably, the server application component is packaged to self register its COM attributes as shown in FIG. 28 and discussed below. In addition to the server application component's COM attributes, the server application is registered in the system registry with a "transaction server execution" attribute indicating that the server application component is run under control of the transaction server executive in the illustrated execution environment 80. In the illustrated embodiment, this attribute has the form shown in the following example registry entry.

HKEY_CLASSES_ROOT\CLSID\{AB077646-E902-11D0-B5BE-00C04FB957D8}\LocalServer32= C:\WINNT\System32\mtx.exe/p:{DA16F24B-2E23-11D1-8116-00C04FC2F9C1}

When the server application component 86 is run in the execution environment 80, the transaction server executive 80 maintains a component context object 138 associated with the server application component 86, including while the server application component 86 is deactivated. The component context object 138 provides context for the execution of the server application component 86 in the execution environment 80. The component context object 138 has a lifetime that is coextensive with that of the server application component. The transaction server executive 80 creates the component context object 138 when the server application component 86 is initially created, and destroys the component context object 138 after the application server component 86 is destroyed (i.e., after the last reference to the application server component is released).

The component context object 138 contains intrinsic properties of the server application component that are determined at the component's creation. These properties include a client id, an activity id, and a transaction reference. The client id refers to the client program 134 that initiated creation of the server application component. The activity id refers to an activity that includes the server application component. An activity is a set of components executing on behalf of a base client, within which only a single logical thread of execution is allowed. The transaction reference indicates a transaction property object 150 that represents a transaction (i.e., an atomic unit of work that is either done in its entirety or not at all) in which the server application component participates. The component context object 138 is implemented as a COM Object that runs under control of the transaction server executive. The component context object 138 provides an "IObjectContext" interface described in more detail below, that has member functions called by the server application component 86.

In the illustrated execution environment, the transaction server executive 80 maintains an implicit association of the component context object 138 to the server application component 86. In other words, the transaction server executive 80 does not pass a reference of the component context object 138 to the client program 134 which uses the server application component 86. Rather, the transaction server executive 80 maintains the component's association with the context object, and accesses the component context object when needed during the client program's access to the server application component 86. Thus, the client program 134 is freed from explicitly referencing the component context object 138 while creating and using the server application component 86.

With reference again to FIG. 3, the server computer 84 also runs a resource manager 140 and a resource dispenser 144. The resource manager 140 is a system service that manages durable data (e.g., data in a database 146). The server application component 86 can use the resource manager to maintain the durable state of the server application (such as, the record of inventory on hand, pending orders, and accounts receivable in an on-line sales server application). Examples of resource managers in the illustrated embodiment include the Microsoft SQL Server, durable message queues, and transactional file systems. Preferably, the resource manager 140 supports performing changes or updates by the server application component 86 to the server application's durable state on a transactional basis (i.e., in transactions conforming to the well-known ACID properties).

The resource dispenser 144 is a service that manages non-durable shared state (i.e., without the guarantee of durability) on behalf of the server application components within the ASP 90. Examples of the resource dispenser 144 in the illustrated embodiment include an ODBC resource dispenser that maintains a pool of database connections conforming to the Microsoft Open Database Connectivity ("ODBC") call level interface. The ODBC resource dispenser allocates database connections to the server application component for accessing data from a database 146 (generally, through its resource manager 140). Also, the ODBC resource dispenser reclaims database connections when released by the server application components for later reuse.

The illustrated execution environment 82 further includes a transaction manager 148. The transaction manger 148 is a system service that coordinates transactions that span multiple resource managers, including where the resource managers reside on more than one server computer in a distributed network. The transaction manager 148 ensures that updates across all resources managers involved in a transaction occur in conformance with the ACID properties using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5.

Transaction Processing with Server Application Components

The illustrated execution environment 80 also provides support for transaction processing conforming to the ACID properties and using the well known two phase commit protocol. In addition, the illustrated execution environment 80 supports automatically providing transactions for server application components according to the components' transactional expectations without client control.

Transaction Initiation

In the illustrated execution environment 80, one or more server application components that participate in a transaction (i.e., an atomic unit of work that is either done in its entirety or not at all) will each have a transaction property object 150 associated with their component context object 136 to represent the transaction. The transaction server executive 80 creates the transaction property object 150 when the transaction is initiated, and associates the transaction property object with the component context object of each server application component in the transaction.

While the server application component 86 is associated with the transaction property object 150, the transaction server executive automatically associates the transaction property object 150 with any other server application object that is created by the server application component 86 or resource that is obtained by the server application component 86. For example, a money transfer operation in an on-line banking server application can be implemented in a "transfer" server application component that creates two "account" server application components to debit and credit the transferred amount to the affected accounts. Thus, when the transfer component creates the account components, the transaction server executive automatically associates the account components with the transfer component's transaction property object so that work of the individual account component in the money transfer is performed as a single atomic action. Also, any resources obtained by the server application component 86 from the resource manager 140 or resource dispenser 144 are associated with the component's transaction property object 150 so that services performed by the resource manager or dispenser on the component's behalf also are encompassed within the transaction. For example, when the server application component 86 allocates a database connection using the ODBC Resource Dispenser while associated in a transaction, the connection is automatically enlisted on the transaction. All database updates using the connection become part of the transaction, and are either atomically committed or aborted.

The server application component 86 can affect the outcome of a transaction using "SetComplete" and "SetAbort" member functions of its component context object's IObjectContext interface. When the server application component 86 has done its portion of the work in a transaction, the component calls either the SetComplete or SetAbort member functions. By calling the SetComplete member function, the server application component 86 indicates its work in the transaction is done satisfactorily. On the other hand, the server application component 86 calls the SetAbort member function to indicate that its processing in the transaction is done, but the work could not be completed successfully and must be aborted. For example, a debit account component in a server application which updates an account from which money is transferred in a money transfer transaction may call SetComplete when the update leaves a positive balance in the account, but calls SetAbort when the update would leave a negative account balance.

The transaction server executive 80 causes the transaction to complete (i.e., the transaction commits or aborts) when the server application component for which the transaction was initiated (termed the "root" of the transaction) indicates work in the transaction is complete (i.e., with the SetComplete or SetAbort function call). The transaction commits unless any of the components and resources enlisted in the transaction indicates the transaction is not to be committed, such as by calling the SetAbort function. Otherwise, the transaction is aborted.

Transaction Attribute

In addition to registering COM attributes and the transaction server execution attribute in the system registry, the server application component 86 also is registered in a transaction server catalog 136. The transaction server catalog 136 is a configuration database that stores the attributes of the server application component 86 related to execution of the component in the illustrated execution environment 80. In an alternative embodiment, these attributes can be stored as "meta data" in the component itself (i.e., in the DLL that implements the component) so that the component is self-describing. These attributes include a transaction attribute that represents the server application component's transactional expectations, and controls participation of the server application component in transaction processing under the illustrated execution environment 80. In the illustrated embodiment, the server application component's attributes can be modified by a system administrator or like user using the transaction server explorer utility which provides a component property sheet (a graphical user interface dialog) with user interface controls for setting the attributes.

The component's transaction attribute can be declared as one of the values, "not supported," "supported," "required," or "requires new." The not supported value of the transaction attribute indicates the component should not be run in the scope of a transaction. This value is a default setting, and is primarily intended for use with COM objects that are not specifically designed to execute in the illustrated execution environment (such as those that predate the invention).

The supported value indicates the component can execute in the scope of their client's transaction. The supported value typically is assigned to a server application component when the work of the component alone need not be in a transaction, such as where the component itself performs only a single database update. But, the component's work also can form part of a transaction, such as where the component's database update is made in combination with those of other components. In the above mentioned example of a banking application that provides a debit account component, a credit account component and transfer component, the debit account component and credit account component are examples of components that each implement only a single database update (i.e., a credit or debit to an account balance in a database record). The debit and credit account components can be used in operations where a transaction is not required, such as a deposit or withdrawal operation involving only the component's single database update. As mentioned above, the transfer component also uses the debit and credit account components in a money transfer operation between two accounts which involves multiple database updates (i.e., the debit by the debit account component and credit by the credit account component). In such case, the debit and credit account components should both execute within the transfer component's transaction so that the updates occur as an atomic unit of work. The debit and credit account components thus have the transactional expectation that they execute in the scope of their client's transaction, if any, which is represented by assigning the "supported value" to their transaction attribute.

The required value, on the other hand, indicates the component must execute within the scope of a transaction (either their client's transaction or a new transaction if their client has no transaction). The required value typically is assigned to components that perform multiple database updates, and require a transaction to ensure the updates are effected atomically. In the above mentioned banking application example, the transfer component implements a money transfer operation involving multiple database updates (i.e., the debit and credit performed by the debit and credit account components) which must be effected atomically. The transfer component thus has the transactional expectation that its work must be in a transaction, which is represented by assigning the required value as its transaction attribute.

In the illustrated execution environment 82, both the supported and required values allow the server application component to be run in the client's transaction. In other words, if the client program 134 that requested creation of the server application component has a transaction, the server application component is run in the client's transaction. The difference between the values occurs when the component's client has no transaction. When the transaction attribute is supported and the component's client has no transaction, the server application component also executes without a transaction. When the transaction attribute is required and the component's client has no transaction, the transaction server executive initiates and executes the component in a new transaction.

The requires new value of the transaction attribute indicates the component must execute in a new transaction even if the component's client has a transaction. This causes the transaction server executive 80 to always create an independent transaction for the component. The requires new transaction attribute value can be used, for example, with an auditing component that records work done on behalf of another transaction regardless of whether the original transaction commits or aborts.

Automatic Transactions

Figure 5:
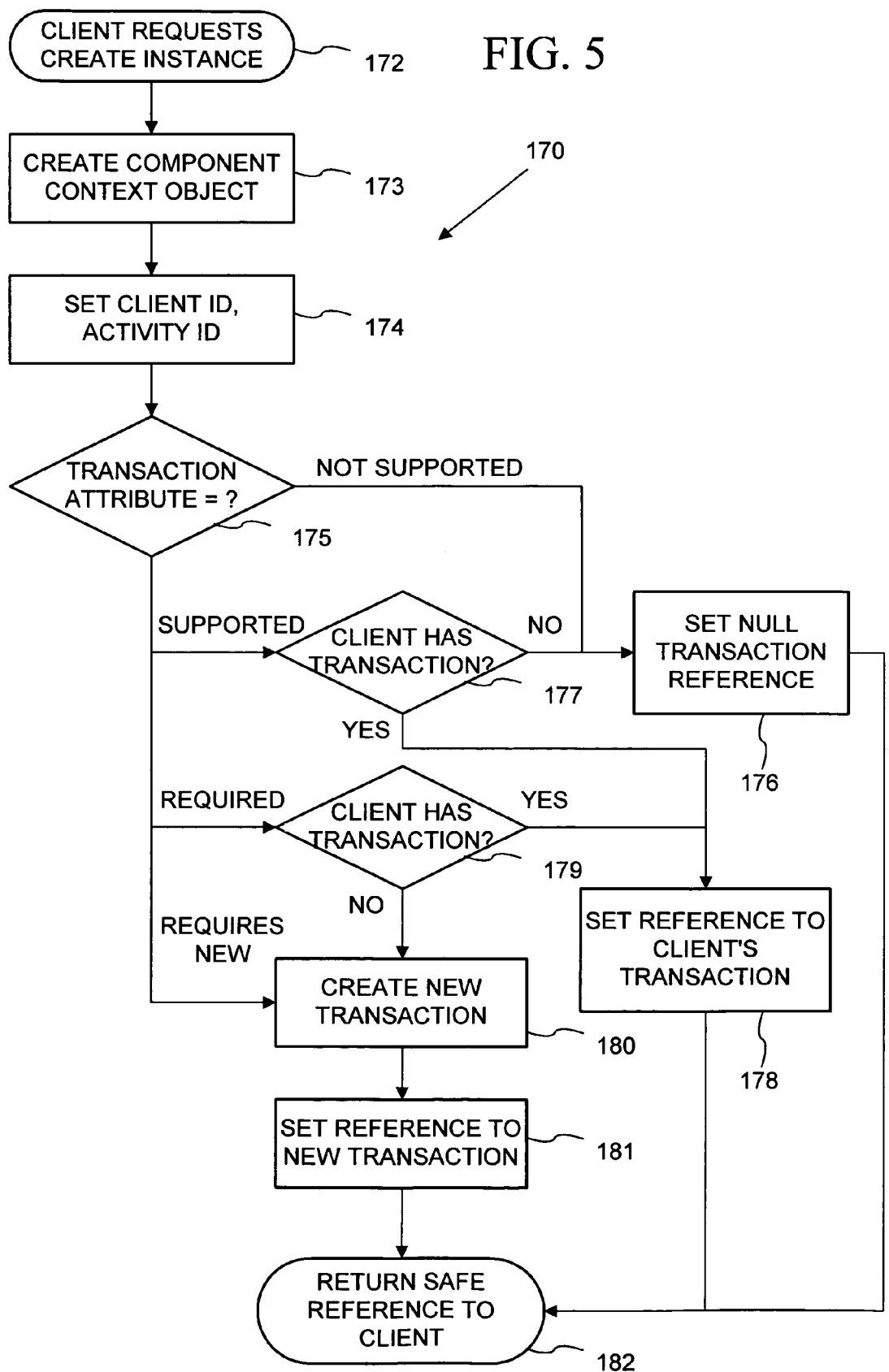
FIG. 5 is a flow chart of a method performed by the server executive in the execution environment of FIG. 3 to automatically control transaction processing of server application components' work.

With reference to FIG. 5, the transaction server executive 80 automatically provides a transaction for the server application component 86 in a method 170 according to the component's transactional expectations (i.e., transaction attribute) without client control. As indicated at step 172, the method 170 commences when the client program 134 initially requests creation of an instance of the server application component. (There are various ways for the client program 134 to make this request as discussed more fully in a following section, entitled "Creating The Server Application Component." However, the transaction server executive 80 follows the method 170 in each case.)

Upon receiving the client program's request to instantiate the server application component, the transaction server executive 80 creates the component context object 138 for the server application component 86 at a step 173. At a step 174, the transaction server executive 80 sets the client id and activity id data properties of the component context object 138 to indicate the client program 134 and activity associated with the client program, respectively. The transaction server executive 80 next sets the component context object's transaction data property in steps 175–181.

At step 175, the transaction server executive 80 checks the transaction attribute registered for the server application component 138 in the catalog 136. As discussed above, the transaction attribute represents the transactional expectations of the server application component 86. If the transaction attribute is set to not supported, the transaction server executive 80 sets the transaction data property of the component context object 138 to a null transaction reference at step 176, which means the server application component is not part of a transaction.

However, if the transaction attribute check at step 175 shows that the transaction attribute is registered as supported, the transaction server executive 80 further checks at step 177 whether the client program 134 has a transaction. If so, the transaction server executive 80 at step 178 sets the transaction data property of the component context object 134 to reference the client program's transaction (more specifically, to reference the transaction context object that represents the client program's transaction). As discussed above, this results in the server application component running under control of the transaction, such that the server application component's work (i.e., database updates) is committed or aborted with the transaction. However, if the check at step 177 indicates the client program 134 does not have a transaction, the transaction server executive 80 sets the transaction data property of the component context object 138 to a null transaction reference at step 176, which results in the server application component running outside the scope of a transaction and the component's work succeeds or fails on an individual basis.

On the other hand, if the transaction attribute check at step 175 shows the transaction attribute is registered as required, the transaction server executive 80 at a step 179 further checks whether the client has a transaction. This time, if the client has a transaction, the transaction server executive 80 also proceeds to set the component context object's transaction data property to reference the client program's transaction at step 178. However, if the client program 134 does not have a transaction, the transaction server executive 80 instead creates a new transaction context object to represent a new transaction at a step 180 and sets the transaction data property to reference the new transaction at a step 181.

Otherwise, when the transaction attribute check at step 175 shows the server application component's transaction attribute is registered as requires new, the transaction server executive 80 directly proceeds to create the new transaction and set the transaction data property to reference the new transaction in steps 180–181.

The transaction server executive 80 finally returns a safe reference to the client program at a step 182 with which the client program can invoke member functions of the server application component 86 as discussed below in the section entitled "Safe References".

Thus, according to the method 170, the transaction server executive 80 automatically provides a transaction encompassing the server application component's work when the component's transaction attribute indicates a transaction is required and the client program has not initiated a transaction (as shown in steps 175, 179–181). Also, the transaction server executive 80 automatically provides a transaction independent of the client program where the component's transaction attribute (i.e., "requires new") indicates a separate transaction is expected (as shown in steps 175, 180–181). However, where the component's transactional expectations allow the component to execute in a transaction under control of the client program (e.g., the "supported" and "required" transaction attribute) and the client program has initiated a transaction, the transaction server executive 80 runs the server application component in the client-controlled transaction.

Controlling Transaction Outcome

In the illustrated execution environment 82 (FIG. 3), the transaction manager 148 decides the outcome of a transaction based on success or failure of the work done by the transaction's participants, and completes the transaction accordingly (either aborting or committing) so as to conform to the ACID principles. Participants in the transaction can affect the transaction outcome in various ways.

Client Control of Transaction Outcome

A base client (i.e., where the client program 134 of the server application component 86 executes outside the execution environment 82 as illustrated in FIG. 3) can control transaction outcome in the illustrated execution environment using a transaction context object (not shown). The transaction context object provides an ITransactionContext interface (described below) through which the client program 134 controls the transaction. The client program 134 calls member functions of this interface to create server application components that participate in a transaction (the "CreateInstance" member function), and to commit or abort the transaction (the "Commit" and "Abort" member functions). The transaction context object has its transaction attribute set to required, or alternatively requires new, such that the transaction server executive automatically initiates a transaction for the object when created. The implementation of the commit and abort member functions in the transaction context object call the IObjectContext::SetComplete and IObjectContext::SetAbort functions, respectively, to cause an attempt to commit or abort the transaction as described below under the Completion of Automatic Transactions section.

Server Application Component Control of Transaction Outcome

The server application component 86, on the other hand, can affect the outcome of a transaction using "SetComplete," "SetAbort," "EnableCommit and DisableCommit" member functions (described in more detail below) of its component context object's IObjectContext interface. When the server application component 86 has done its portion of the work in a transaction, the component calls either the SetComplete or SetAbort member functions. By calling the SetComplete member function, the server application component 86 indicates its work in the transaction is done satisfactorily.

On the other hand, the server application component 86 calls the SetAbort member function to indicate that its processing in the transaction is done, but the work could not be completed successfully and must be aborted. For example, a debit account component in a server application which updates an account from which money is transferred in a money transfer transaction may call SetComplete when the update leaves a positive balance in the account, but calls SetAbort when the update would leave a negative account balance. The call to SetAbort in this case also causes other work in the transaction to be "rolled back," such work by a credit account component to add the transfer amount to the transferee account.

Enabling and Disabling Committal of a Transaction

In accordance with the invention, the server application component 86 additionally can affect the outcome of a transaction by calling the DisableCommit function of its component context object 136. The DisableCommit function call prevents the client from committing the transaction (referred to as "disabling commit"). This allows a server application component that is stateful to prevent premature committal of incomplete work when returning from a call from the client to the server application component. If the client 134 attempts to commit the transaction in which a server application component has disabled commit, the transaction server executive 80 causes the transaction to abort.

For example, where a valid update to an orders database is required to include both an order header and at least one order item, a server application component (hereafter the "order component") that generates updates to the database may have an AddHeader function and an AddItem function that the client calls to set header information and order items, respectively, for an update. When returning from a call to the AddHeader function where no order item has yet been added, the order component can call the DisableCommit function of its component context object 136 to disable commit in a transaction that encompasses the update. Likewise, when returning from a call to the AddItem function where no order header has yet been added, the order component can call the DisableCommit function to disable commit in the transaction. This prevents the client from committing the transaction while the order component's update is not yet valid.

Later, the server application component 86 can call the EnableCommit function of its component context object 136 to again allow the client to commit the transaction involving the server application component. The EnableCommit call indicates the server application component's work is in a valid state that may be committed, and not that the component's work in the transaction is necessarily done. Thus, in the forgoing order component example, the order component can call the EnableCommit function upon return from a call to either the AddHeader or AddItem function where the update has both an order header and at least one order item. The order component's work in the transaction isn't necessarily done at that point since the client may again call the AddItem function to add additional order items to the update.

In the illustrated execution environment 82, the component context object 136 maintains a "work state" value which indicates a state of work of its associated server application component 86 in the transaction. Initially, the work state value indicates an enable commit state. The component context object 136 sets the work state value to indicate a disable commit state in response to the component's call to the DisableCommit function. In response to the EnableCommit or SetComplete functions, the component context object 136 resets the work state value to indicate the enable commit state.

Example of Enabling and Disabling Commit in Transaction Processing

Figure 6:
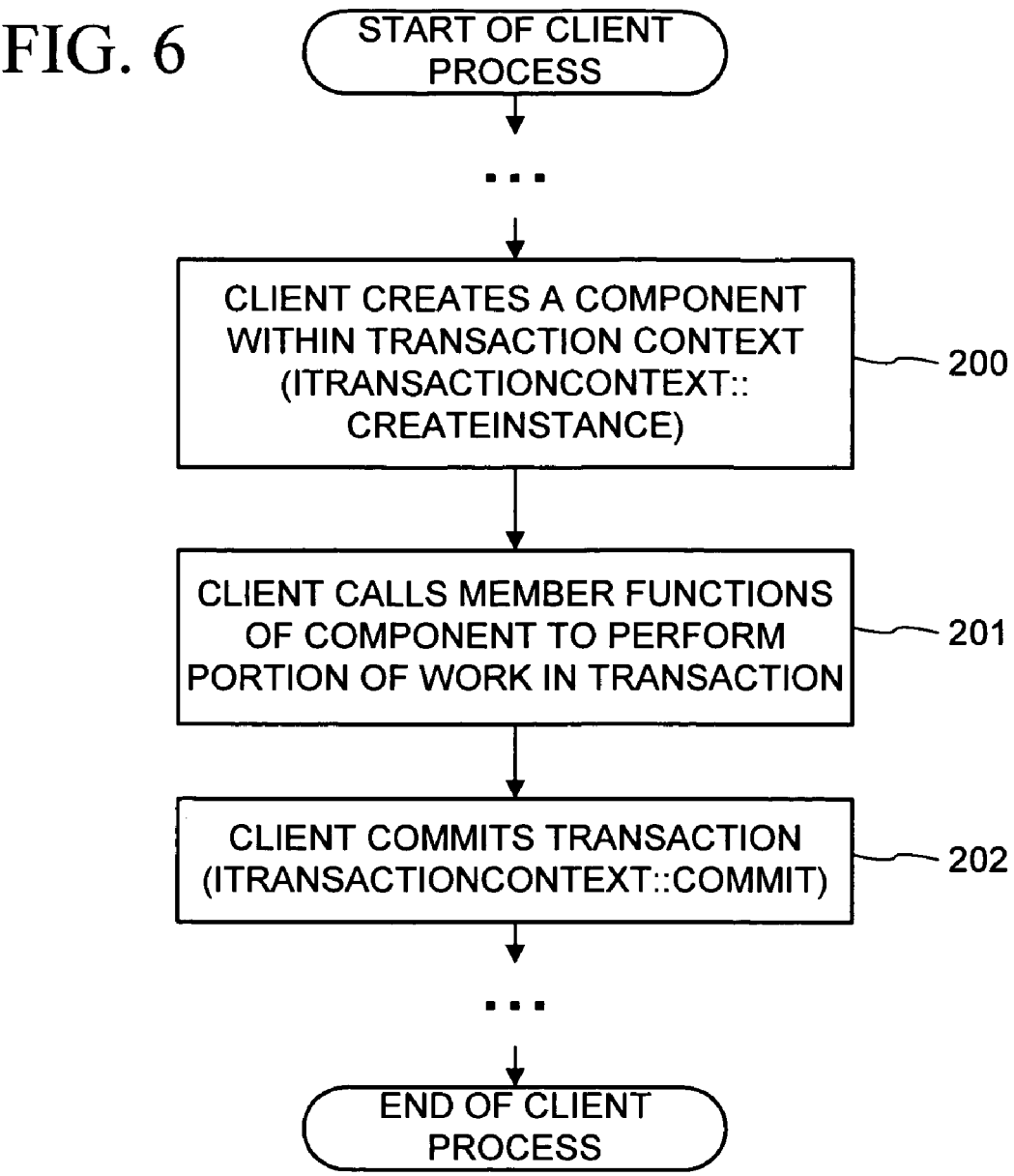
FIGS. 6, 7, and 8 are flow charts illustrating use of disable commit and enable commit during transaction processing in a client process, server application component, and transaction manager within the execution environment of FIG. 3.
Figure 7:
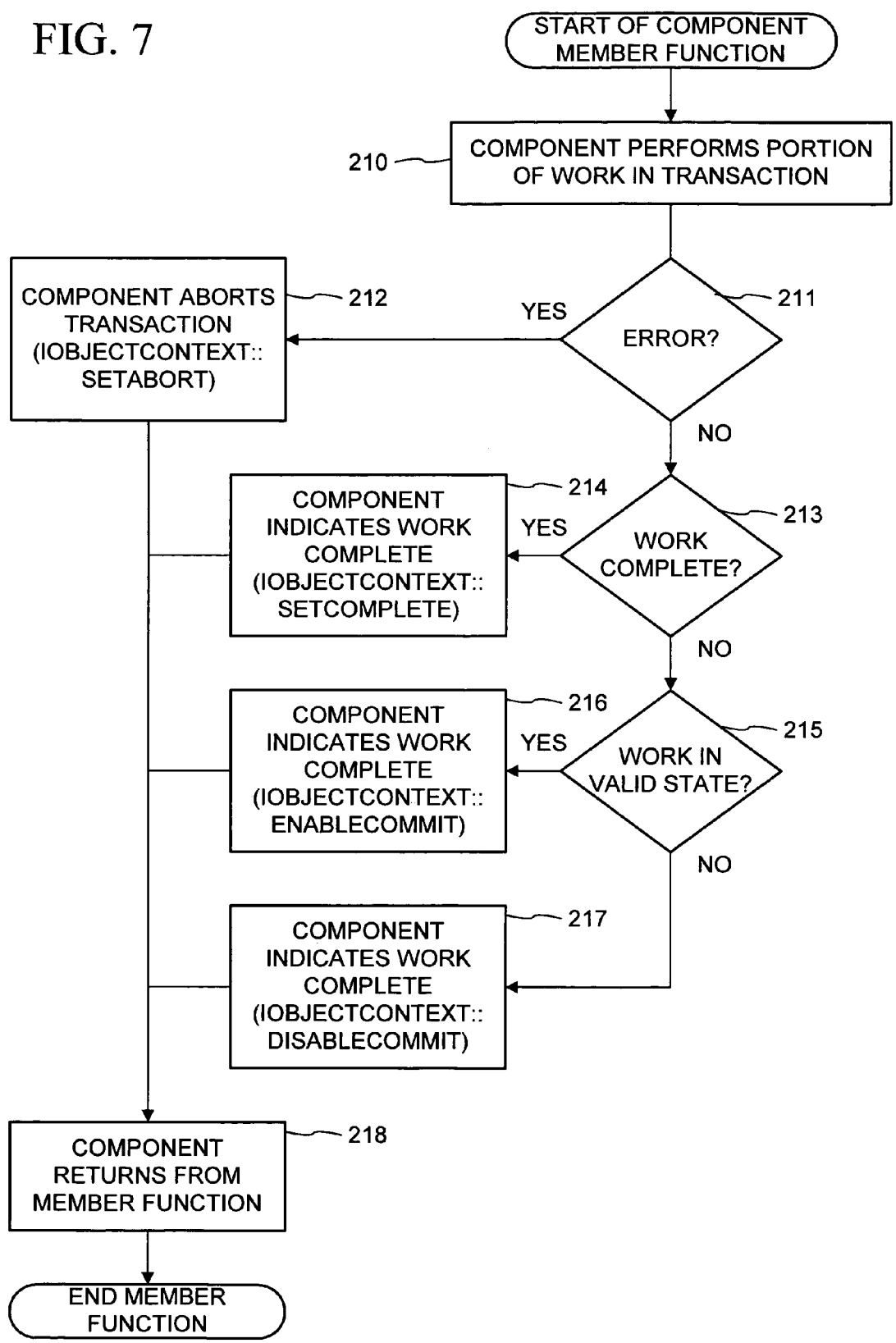
Figure 8:
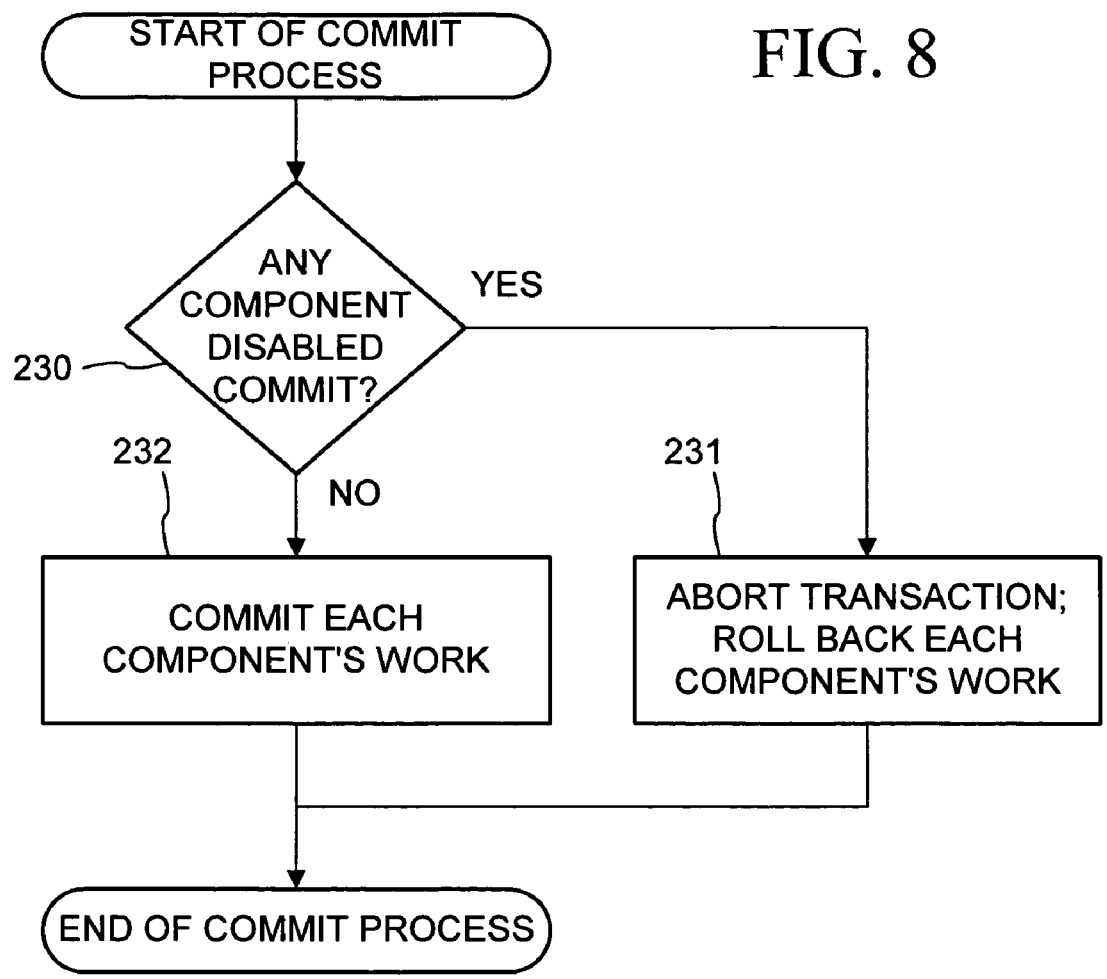

FIGS. 6–8 show an example of method steps performed in a client process (FIG. 6), server application component (FIG. 7), and transaction manager (FIG. 8) in the illustrated execution environment 82 (FIG. 3), which make use of the IObjectContext::EnableCommit and IObjectContext::DisableCommit functions to avoid premature committal of the server application component's work in accordance with the invention. In the illustrated example, the client program 134 (FIG. 3) creates the server application component 86 (FIG. 3) to perform a portion of the work in a transaction. The transaction manager 148 (FIG. 3) manages the outcome of the transaction.

With reference to FIG. 6, the client program 134 executes steps 200–202 during processing of a transaction. At step 200, the client program 134 creates the server application component 86 within the context of the transaction, such as by calling the ITransactionContext::CreateInstance function described above. This causes the server application component to be automatically associated with the transaction, such that any work done by the component (e.g., updates to the database 146 managed by the resource manager 140) is either committed or aborted by the transaction manager 148 with the transaction.

At step 201, the client program 134 invokes member functions of the server application component 86 to have the server application component perform a portion of the work in the transaction. Depending on the particular server application component and work to be performed, the client program 134 may call one or more of the server application component's member functions in step 201. In the foregoing order component example, for instance, the client program 134 may call an AddHeader function to set header information for the order, an AddItem function to add an individual order item to the order, and a SubmitOrder function when the order is complete. In response to the client's calls, the server application component 86 performs the requested work, and preferably also utilizes the EnableCommit and DisableCommit functions to avoid premature committal as shown in FIG. 7 and described below.

At a later step 202, the client program 134 commits the transaction, such as by calling the ITransactionContext::Commit function. This causes the transaction manager 148 to commit the work of the server application component (and of any other components in the transaction) unless any components in the transaction have disabled commit or aborted as shown in FIG. 8 and described below.

With reference to FIG. 7, the server application component 86 responds to calls from the client program 134 in step 201 of FIG. 6 by executing the steps 210–218. At step 210, the server application component 86 performs the portion of the work requested by the client program's call. In the above order component example, for instance, the order component at step 210 responds to an AddHeader call by generating an order header, or generates an order item in response to an AddItem call.

When returning from the call after performing the requested work, the server application component 86 may call one of the SetAbort, SetComplete, EnableCommit or DisableCommit functions on the IObjectContext interface of its component context object 136 (FIG. 3). As indicated at steps 211–212, the server application component 86 calls the SetAbort function in the event of a failure in the requested work. The conditions for failure depend on the business function implemented in the server application component 86. In the above money transfer example, for instance, the account component calls the SetAbort function if the requested money transfer would have resulted in a negative account balance. For another example, the account component also calls the SetAbort function if the account is closed. This causes the transaction manager 148 to abort the transaction, and roll back all work already performed in the transaction.

Otherwise, if the server application component 86 successfully completes its work in the transaction, the component calls the SetComplete function as indicated in steps 213–214. Again, the conditions on which the component successfully completes work depend upon the business function implemented in the component. In the above order component example, for instance, the order component calls the SetComplete function on return from the client's call to the order component's SubmitOrder function.

Still otherwise, if the server application component 86 returns from a client call without yet a failure or successful completion of work in the transaction, the server application component 86 calls either the EnableCommit or DisableCommit functions as indicated at steps 215–217. The server application component 86 calls the EnableCommit function if the component's work is in a valid state, where the work although not necessarily complete can be validly committed. Again, the conditions on which the component's work is valid depend upon the business function implemented in the component. In the order component example, for instance, the order component calls the EnableCommit function on return from the component's AddHeader or AddItem function if both a header and order item have been added. In that case, the order component's work is not necessarily complete because the client could again call the AddItem function to add additional order items. However, the component's work has already produced a valid order since the order contains both a header and at least one order item.

On the other hand, the server application component calls the DisableCommit function at step 217 if its work is not yet in a valid state, but has not failed. This prevents the client program 134 from committing the component's not yet valid work on return from the client's call. In the order component example, for instance, the order component calls the DisableCommit function on return from the component's AddHeader or AddItem function if there is not yet both an order header and at least one order item. The order component's work has not failed since the client program in a future call could add the missing header or first order item.

Finally, at step 218, the server application component 86 returns from the client's call (step 201 of FIG. 6). The client program 134 can then make additional calls to the server application component at step 201, or commit the transaction at step 202 (FIG. 6).

With reference now to FIG. 8, the transaction manager 148 controls committal of the transaction when initiated by the client program's call to the ITransactionContext::Commit function. During processing of the client program's commit request, the transaction manager 148 checks at step 230 whether any component participating in the transaction currently disables commit (i.e., the component called the DisableCommit function at step 217 of FIG. 7 and did not subsequently call the EnableCommit function). If commit is disabled by any component in the transaction, the transaction manager 148 aborts the transaction and rolls back each component's work at step 231. Otherwise, if commit is enabled by all components in the transaction, the transaction manager 148 commits each component's work in the transaction at step 232.

Completion of Automatic Transactions

In the illustrated execution environment 82 (FIG. 3), the transaction server executive 80 completes processing of a transaction that was initiated automatically by the transaction server executive to meet the server application component's transactional expectations (herein referred to as an "automatic transaction") when the server application component for which the automatic transaction was initiated completes its work. More specifically, the illustrated execution environment 82 provides an object integration interface (the IObjectContext interface supported on the component context object 138) with which the server application component 86 indicates to the transaction server executive 80 that its work is complete. The server application component 86 calls a SetComplete member function of this interface to indicate its work was successfully completed, and calls a SetAbort member function to indicate its work was completed but must be aborted. When next returning from the server application component after the component has called either of these functions, the transaction server executive 80 causes the transaction manager 148 to complete the transaction. If the SetComplete function was called, the transaction server executive 80 causes the transaction to be committed (as long as no other component or resource involved in the transaction has indicated to abort the transaction). If the SetAbort function was called, the transaction server executive 80 causes the transaction to be aborted.

In the above discussed banking application for example, the transaction server executive 80 initiates an automatic transaction for the transaction component (whose transaction attribute is set to required because it performs two separate database updates using the credit and debit account components) if the transaction component's client program created the transaction component without initiating a transaction. The transaction component, in turn, creates the debit and credit account components to perform the withdrawal and deposit to the affected transferor and transferee accounts which form parts of the money transfer transaction. When created by the transaction server executive 80, the debit and credit account components (whose transaction attribute is set to supported because they perform only a single database update each) each automatically inherit the transaction from the transaction component.

After each component completes its part of the work (which may occur over the course of several interactions or calls from the client program 134 to transaction component, and transaction component to debit and credit account components), the components call either the SetComplete or SetAbort function of their component context objects. Upon the transaction component returning from a client program call during which the transaction component indicated completion of its work using the SetComplete or SetAbort functions, the transaction server executive 80 completes the transaction. If the transaction component called the SetComplete function and no other transaction participant indicated the transaction was to be aborted (such as the credit account component calling the SetAbort function), the transaction server executive 80 causes the transaction manager to commit the transaction. Otherwise, the transaction server executive 80 completes the transaction by causing the transaction manager to abort the transaction.

Overview of COM Object Instantiation in OLE

As with other COM objects, the client program 134 (FIG. 3) must first request creation of an instance of the server application component 86 (FIG. 3) and obtain a reference to the server application component before the client program can access the functionality implemented by the server application component (i.e., before the client program can call member functions supported on an interface of the server application component).

In Microsoft's OLE, a client program instantiates a COM object using services provided by OLE and a set of standard component interfaces defined by COM based on class and interface identifiers assigned to the component's class and interfaces. More specifically, the services are available to client programs as application programming interface (API) functions provided in the COM library, which is part of a component of the Microsoft Windows operating system in a file named "OLE32.DLL." Also in OLE, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUID") that the programmer creates with an OLE service named "CoCreateG-UID" (or any of several other APIs and utilities that are used to create universally unique identifiers) and assigns to the respective classes. The interfaces of a component additionally are associated with interface identifiers ("IIDs").

In particular, the COM library provides an API function, "CoCreateInstance," that the client program can call to request creation of a component using its assigned CLSID and an IID of a desired interface. In response, the CoCreateInstance API looks up the registry entry of the requested CLSID in the registry to identify the executable file for the class. The CoCreateInstance API function then loads the class' executable file, and uses the class factory in the executable file to create an instance of the COM object. Finally, the CoCreateInstance API function returns a pointer of the requested interface to the client program. The CoCreateInstance API function can load the executable file either in the client program's process, or into a server process which can be either local or remote (i.e., on the same computer or a remote computer in a distributed computer network) depending on the attributes registered for the COM object in the system registry.

Once the client program has obtained this first interface pointer of the COM object, the client can obtain pointers of other desired interfaces of the component using the interface identifier associated with the desired interface. COM defines several standard interfaces generally supported by COM objects including the IUnknown interface. This interface includes a member function named "QueryInterface." The QueryInterface function can be called with an interface identifier as an argument, and returns a pointer to the interface associated with that interface identifier. The IUnknown interface of each COM object also includes member functions, AddRef and Release, for maintaining a count of client programs holding a reference (such as, an interface pointer) to the COM object. By convention, the IUnknown interface's member functions are included as part of each interface on a COM object. Thus, any interface pointer that the client obtains to an interface of the COM object can be used to call the QueryInterface function.

Creating the Server Application Component

With reference still to FIG. 3, the client program 134 can create the server application component 86 in the illustrated execution environment 80 in any of several ways. First, the client program 134 can create the server application component 86 using the CoCreateInstance API function or an equivalent method based on the CoGetClassObject API function and IClassFactory::CreateInstance function (which are a conventional COM API function and standard COM interface). The CoGetClassObject API function on the server computer 84 returns a reference to a class factory provided in the transaction server executive 80 when the system registry entry for the requested class includes the transaction server execution attribute described above. This allows the transaction server executive to participate in a subsequent call to the IClassFactory::CreateInstance function (such as by the CoCreateInstance API function) since the call is then made to the class factory in the transaction server executive. In response to this call, the implementation of the IClassFactory::CreateInstance function in the transaction server executive's class factory creates the component context object 138 of the server application component 86. The transaction server executive 80 later calls the IClassFactory::CreateInstance function of the class factory 122 in the server application DLL file 120 to create the server application component 86. While this first approach may suffice for many client programs, there are some significant limitations for the client program, including the inability of the client program to control the server application component in a transaction. Under the first approach, the transaction server executive 80 does not place the created server application component 86 in any transaction initiated or controlled by the client. Even though the client has not initiated a transaction for the server application component, the transaction server executive 80 still may automatically provide a transaction to meet the server application component's transactional expectations. Specifically, if the transaction attribute of the server application component 86 is set to either of the not supported or supported values, the transaction server executive 80 does not place the server application component in a transaction (the transaction data property of the server application component's component context object 138 does not contain a transaction reference). Otherwise, if the server application component's transaction attribute is set to either the required or requires new values, the transaction server executive 80 automatically initiates and places the server application component in a transaction (such as by creating the transaction context object 150 for a new transaction, and including a reference to the new transaction context object 150 in the server application component's component context object 138).

When created with this first approach, the properties in the component context object 136 associated with the new server application component 86 are not inherited from the client program that requested its creation. More particularly, the transaction server executive 80 initiates a new activity (described below) and sets the activity id in the new server application component's context to indicate the new activity. The transaction server executive 80 sets the client id in the new component's context to indicate the client program 134 that requested the component's creation. The transaction server executive 80 also initiates a transaction for the new component is one is required. Because of this limitation, the first approach typically is used only for base clients in the client tier 62 to create a server application component on the middle tier 63.

Second, the server application component 86 can be created using the component context object of another component. The component context object provides an IObjectContext::CreateInstance member function which can be called to create other server application components that inherit context from the component context object (i.e., the component context objects created for the new components have the same context properties, including client id, activity id and transaction, as the original component context object). Except, in the special cases that the transaction attribute of the created server application component is "not supported" or "requires new," the transaction property is not inherited. For example, where a "transfer" component and two "account" components implement a money transfer operation in an on-line banking server application, the transfer component may create the two account components for the money transfer operation using its component object context. The account components automatically inherit properties from the transfer component's context and are included in the same transaction as the transfer component. The client program 134 which created the initial transfer component thus has control over the work of all three components under the same transaction property object (i.e., the client program 134 can commit or abort the work as an atomic transaction).

In this second approach, the server application component accesses its component context object using a service of the transaction server executive, called the GetObjectContext API function (described below).

Safe References

When the server application component 86 is created using any of the three above described approaches, the server application component executes in the illustrated execution environment 80 under control of the transaction server executive 80. More specifically, the client program's call to the CoCreateInstance or IObjectContext::CreateInstance functions to initiate creating the server application component returns a reference to the server application component referred to as a "safe reference." References obtained through a call to the server application component's QueryInterface member function (described above) also are returned by the transaction server executive 80 as safe references. Thus, through use of the QueryInterface function, the client program 134 can obtain multiple safe references to various interfaces supported on the server application component. Also, the client program 134 can pass safe references to other client programs and server application components to allow such other clients to also use the server application component 86.

Instead of being a direct pointer to the server application component's instance data structure 102 (FIG. 4) as are object references in COM, safe references refer indirectly to the server application component through the transaction server executive 80. Thus, calls made to the server application component's member functions using a safe reference always pass through the transaction server executive 80. This allows the transaction server executive to manage context switches, and allows the server application component to have a lifetime that is independent of the client program's reference to the component. The transaction server executive 80 tracks usage of all safe references to the server application component 86 through activation and deactivation, such that all safe references consistently refer to the current instance of the server application component when activated. When deactivated, a call using any safe reference to the server application component causes the transaction server executive to activate the server application component.

So as to ensure that all calls are made to the server application component using a safe reference (i.e., so that the calls pass through the transaction server executive 80), the server application component 86 preferably is programmed to not pass to a client or other object any direct reference to itself outside of a QueryInterface call. Instead, the server application component can obtain a safe reference to itself to provide to clients using a SafeRef API function (described below) of the transaction server executive 80.

Activities

As already mentioned, each server application component has, as an intrinsic property stored in its component context object, an association (i.e., activity identifier) to an activity. An activity is a set of server application components executing on behalf of a base client (i.e., a client program that executes outside the execution environment 82, such as in the client tier 62 of the multi-tier architecture 60 of FIG. 2). An activity includes the server application component 86 directly instantiated by the base client (i.e., through a CoCreateInstance, as well as any other server application components that the first instantiated server application component or its descendents may instantiate.

Figure 9:
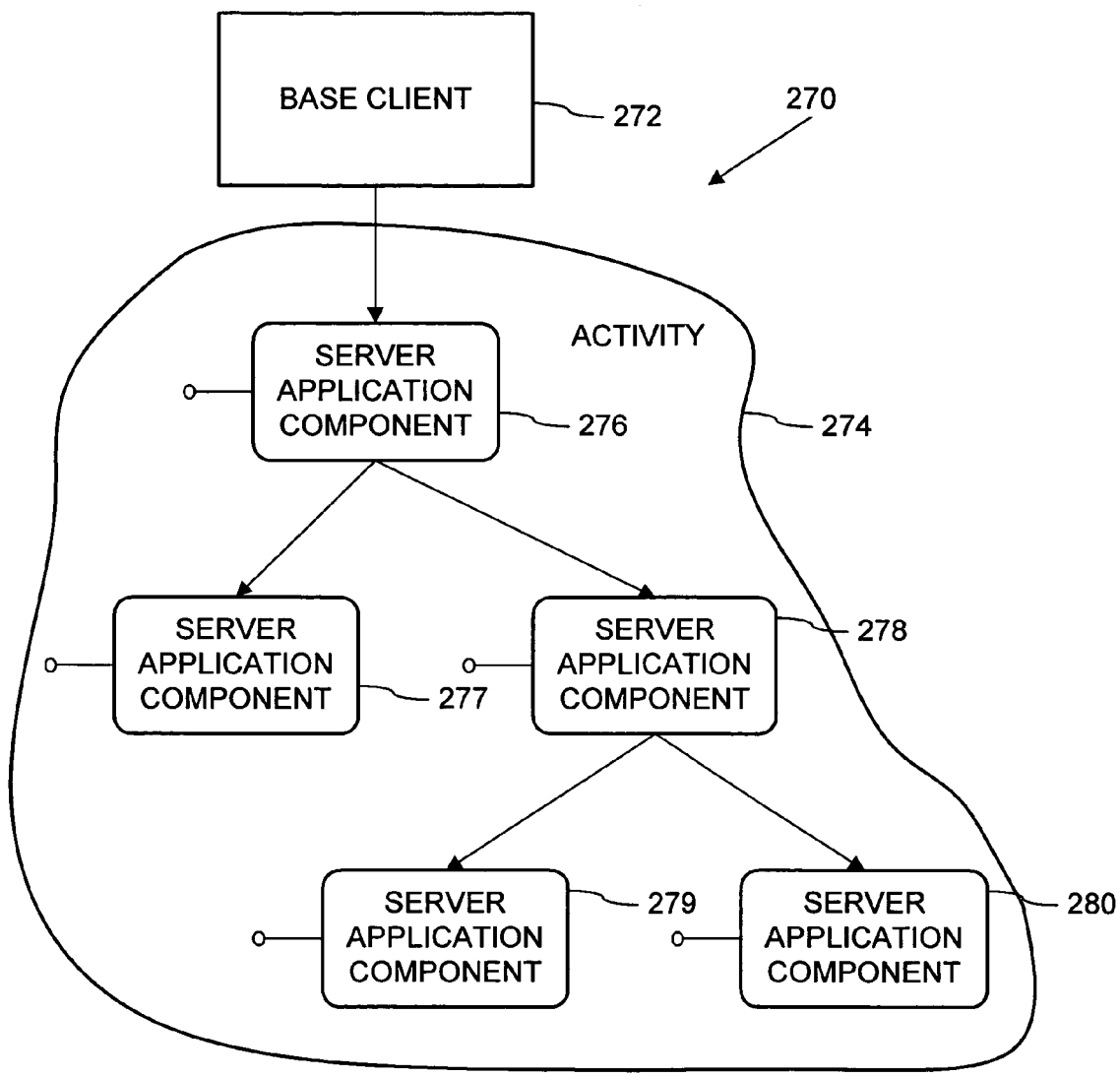
FIG. 9 is a block diagram of an activity involving a plurality of server application components in the execution environment of FIG. 3.

In an exemplary server application 270 shown in FIG. 9 for example, a base client 272 directly instantiates a server application component 276, which for convenience we label the "original ancestor." Upon instantiation, the execution environment 82 associates the original ancestor server application component 276 in an activity 274. The original ancestor server application component 276, in turn, instantiates two other server application components 277–278, labeled "descendents" for convenience, to perform related processing. The descendent server application component 278 also instantiates two additional server application components 279–280. The execution environment 82 also associates the server application components 277–280 in the activity 276. The result is a collection of server application components 276–280 that are directly or indirectly under the control of the base client 272, and all associated in a same activity. Thus, the exemplary server application 270 may be an on-line banking application, in which the original ancestor server application component 276 implements a money transfer and instantiates the descendent server application components 277–278 to process debit and credit updates to the affected accounts. As a further example, the server application 270 may be an on-line bookstore application in which the original ancestor server application component 276 orchestrates a sale of a collection of books. The original ancestor component 276 may use several other descendent components 277–278, such as one to record the order and another to initiate customer billing.

After instantiation, the association of each server application component 276–280 to the activity 274 as an intrinsic property of the server application component maintained in its component context object (e.g., component context object 136 of FIG. 3) cannot be changed. The illustrated execution environment 82 thus maintains an association (called the activity) of a collection of server application components 276–280 engaged in data processing to a particular base client 272 that initiated the processing. In the multi-tier architecture 60 (FIG. 2), the base client 272 is the client application logic 66 of the client tier 62 (FIG. 2). As shown in FIG. 3, the base client 272 runs on a client computer 92 operated by an individual user to provide the user interface through which processing activities by the server application are initiated by user input. Thus, the association of a collection of server application components 276–280 to the base client 272 also is an association to a particular user of the server application.

Upon initiating the activity during creation of the original ancestor server application component 276, the transaction server executive 80 stores the identity of the base client 272 that originated the activity (i.e., by creating the original ancestor server application component) in association with the activity 274.

Restricting Execution in the Activity

Through the mechanism of the safe references described above, the transaction server executive 80 (FIG. 3) is able to track the flow of program execution to each server application component 86, and through each activity 274 (FIG. 9). A safe reference refers to the server application component 86 only indirectly through the transaction server executive 80, which maintains the association of the safe reference to an interface of the server application component 86. Each call made to the server application component 86 using the safe reference thus is passed through the transaction server executive 80.

The transaction server executive 80 (FIG. 3) restricts the flow of execution through the activity 274 (FIG. 9) to allow only a single logical thread to execute in the activity at any one time. A thread is the basic entity to which the operating system allocates processing time on the processing unit 21 (FIG. 1) of the computer. A thread can execute any part of an application's code, including a part currently being executed by another thread. All threads of a process share the virtual address space, global variables, and operating-system resources of the process. (See, e.g., Tucker Jr., Allen B. (editor), The Computer Science and Engineering Handbook, pp. 1662–1665, CRC Press 1997.)

When the base client 272 (FIG. 9) calls into the activity (e.g., to an interface of the original ancestor server application component 276 using a safe reference), the transaction server executive 80 (FIG. 3) allocates a thread to process the call in the activity if no other thread is presently executing in the activity. The transaction server executive 80, however, blocks all subsequent calls into the activity (such as from a separate thread of the base client) until this current thread returns from the base client's initial call. While in the activity, the transaction server executive allows the thread to execute calls between the other server application components 277–280 in the activity. The transaction server executive 80 determines that a call is being made between components in the activity by checking whether a thread making a call to a server application component in the activity has a same thread identifier as the thread currently executing in the activity. If so, the call is being made between the components 276–280 in the activity 274 and is allowed to proceed.

This restriction to a single logical thread protects the server application components 276–280 in the activity from inadvertent parallelism that could corrupt the application state (e.g., the data being processed by the activity). The result is a single, logical thread of execution in a collection of related server application components, that potentially may be distributed on separate server computers. The collection of server application components thus behave as a monolithic application that uses the components on a single thread in the application's process. Such application code is significantly easier to program than code subject to multiple threads of execution.

In some embodiments of the invention, the restriction to a single logical thread within an activity can be limited to those server application components running on a same computer. Where the activity includes server application components on different computers, the transaction server executive on each computer only restricts the server application components of the activity on the respective computer to a single thread. However, simultaneous client calls into the activity to server application components on different computers can result in parallel execution on the different computers. This alternative implementation provides saves some communications bandwidth and processing time of providing full protection against parallelism in a distributed activity.

Although the transaction server executive prevents multiple threads of execution within the activity, reentrancy is possible via a callback. More particularly, a first server application component can pass a self reference when calling a second server application, allowing the second component to call back into the first component. The first server application component must be programmed to receive the callback while waiting for its call to the second component to complete. As the callback is made, the transaction server executive 80 checks the thread identifier associated with the thread making the callback and allows the callback to proceed if the thread identifier matches that of the thread currently executing in the activity.

In addition to restricting the activity to a single thread, the transaction server executive 80 also limits access into the activity to just the base client 272 that originated the activity 274 (i.e., by creating the original ancestor server application component 276). When a call is made into the activity 274, the transaction server executive 80 checks that the identity of the client making the call matches the stored identity of the base client 272 that originated the activity. The call is only allowed to proceed (e.g., by either issuing a thread to process the call in the activity or blocking the call until a currently executing thread returns out of the activity) if the client's identity matches the originating base client 272. By limiting access into the activity to the originating base client, the transaction server executive 80 effectively limits access to each server application component 86 to a single user of the server application. The illustrated execution environment 82 thus prevents interference from other users with the data processing being performed by the server application components for a particular user. This safeguard simplifies the programming of the server application logic 70 in the middle tier of the multi-tier server application architecture 60 (FIG. 2).

Process for Restricting Execution in the Activity

Figure 10:
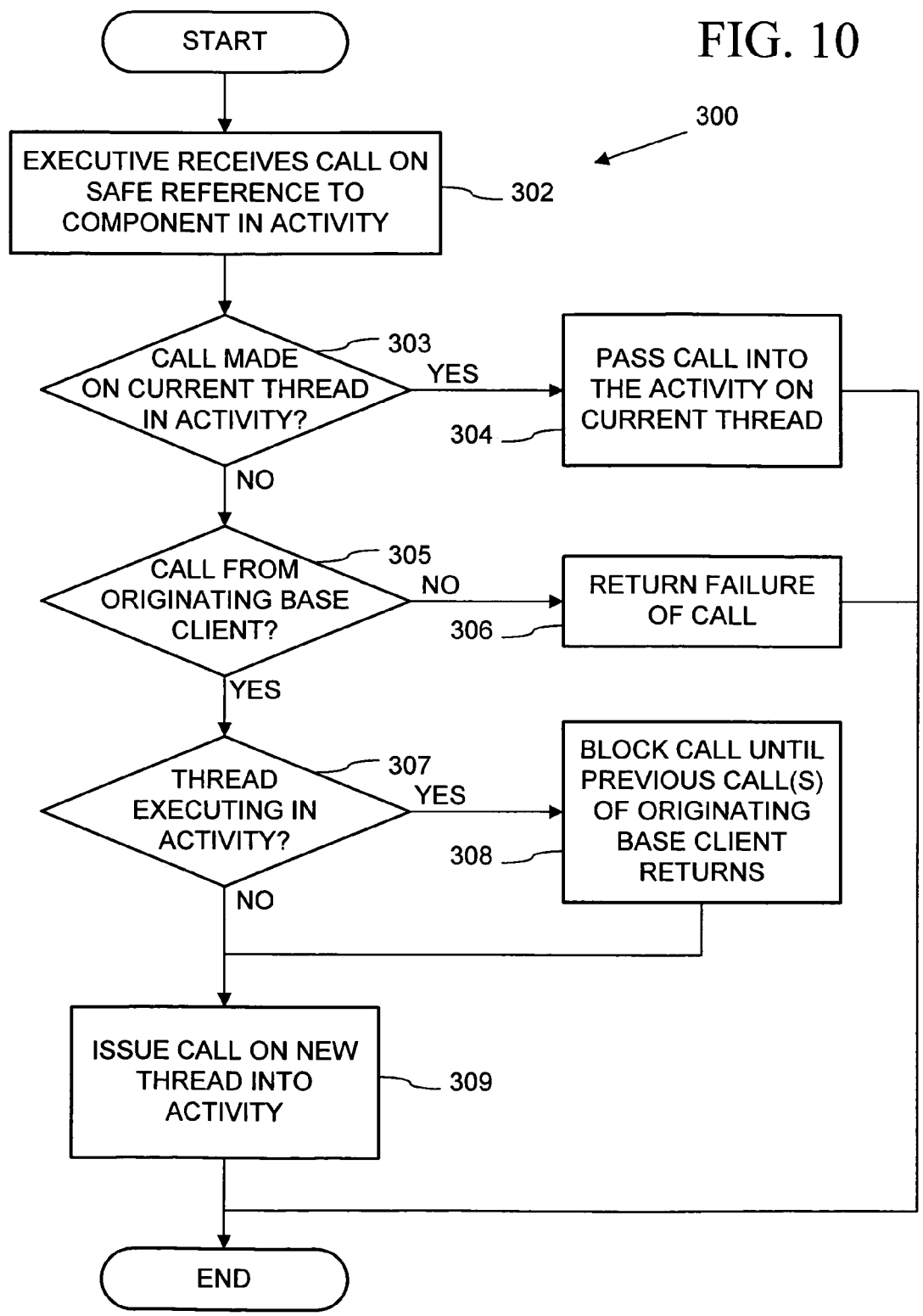
FIG. 10 is a flow chart of a process performed in the execution environment of FIG. 3 to limit access to object-oriented server application code on a middle tier of the multi-tier server application architecture of FIG. 2 to single user access.

With reference to FIG. 10, the transaction server executive 80 (FIG. 2) performs a process 300 to restrict execution in the activity to a single logical thread and to restrict access to server application components in the activity to a single user. As indicated at a step 302, the transaction server executive 80 commences the process 300 upon receiving a call using a safe reference to any of the server application components 276–280 in the activity 274 (FIG. 9).

As indicated at steps 303–304, the transaction server executive 80 (FIG. 3) checks whether the call is made on a thread already executing in the activity 274 (FIG. 9). The transaction server executive 80 compares a logical thread identifier of the thread making the call to that of the thread currently executing in the activity (the "current thread"), if any. If the logical thread identifiers match, the transaction server executive determines that the call is between server application components in the activity. The transaction server executive then passes the call into the activity on the current thread.

Otherwise, if there is no thread currently executing in the activity or thread making the call is not the current thread, the transaction server executive 80 checks at a step 305 whether the call is from the base client 272 (FIG. 9) that originated the activity 274. The transaction serve executive 80 compares the stored identity of the originating base client associated with the activity to the identity of the caller. If the call is not from the originating base client 272, the transaction server executive returns a failure of the call at a step 306.

If the call was from the originating base client 272 of the activity 274, the transaction server executive 80 checks whether there currently is a thread executing in the activity 274 at a step 307. If a thread is already executing in the activity 274, the transaction server executive 80 at a step 308 blocks the call until all previous calls from the originating base client 272 return from the activity 274. If no threads are executing in the activity at step 307 or after all previous calls return, the transaction server executive 80 at a step 309 issues the call into the activity 274 on a new thread (which becomes the "current thread" executing in the activity).

Server Application Component Control Over State Duration

In the illustrated execution environment 80 (FIG. 3), the duration of the internal state of the server application component 86 (e.g., the instance data structure 102 and any resources held by the instance) is separate from the component's lifetime. Similar to a COM Object, the component's lifetime commences upon creation of the component by the client program, and ends when all references to the component held by a client program are released. However, unlike COM Objects, the component's lifetime may extend over multiple initiations and destructions of the component's state. In the following discussion, the component is said to be "activated" when the component's state is in existence, and "deactivated" when the component's state is destroyed. The illustrated execution environment 80 effects the separation of the component's lifetime from the duration of its state, in part, by the indirect association of the references held by client programs to the component through the transaction server executive 80 (which allows the executive to effectively decouple the client programs' references to the component from the instance data structure 121 that embodies the component's state).

Further, in accordance with the invention, the component 86 itself can control the duration of state (e.g., the component controls when its state can be destroyed), independent of any client program retaining a reference to the component. In the illustrated execution environment, the server application component controls state duration ends by calling the IObjectContext::SetComplete or IObjectContext::SetAbort functions (described below). The call to either of these functions indicates the component has completed processing work requested by the client program, and the component does not need to maintain its state after returning from the call.

In the illustrated execution environment 82, the destruction of the component's state is effected by the transaction server executive 80 releasing its direct reference to the instance of the component 86. This results in the portion of the server computer's memory 22 containing the instance to be freed for other use, along with release of all resources held by the instance (e.g., references to other components, ODBC connections, etc.). Alternatively, the component's state is destroyed in the illustrated execution environment 82 by the transaction server executive 80 causing the instance to be reset for reuse in another activation of the component. In either case, the component's state at destruction is not persistently stored.

Just-In-Time Component Activation

Figure 11:
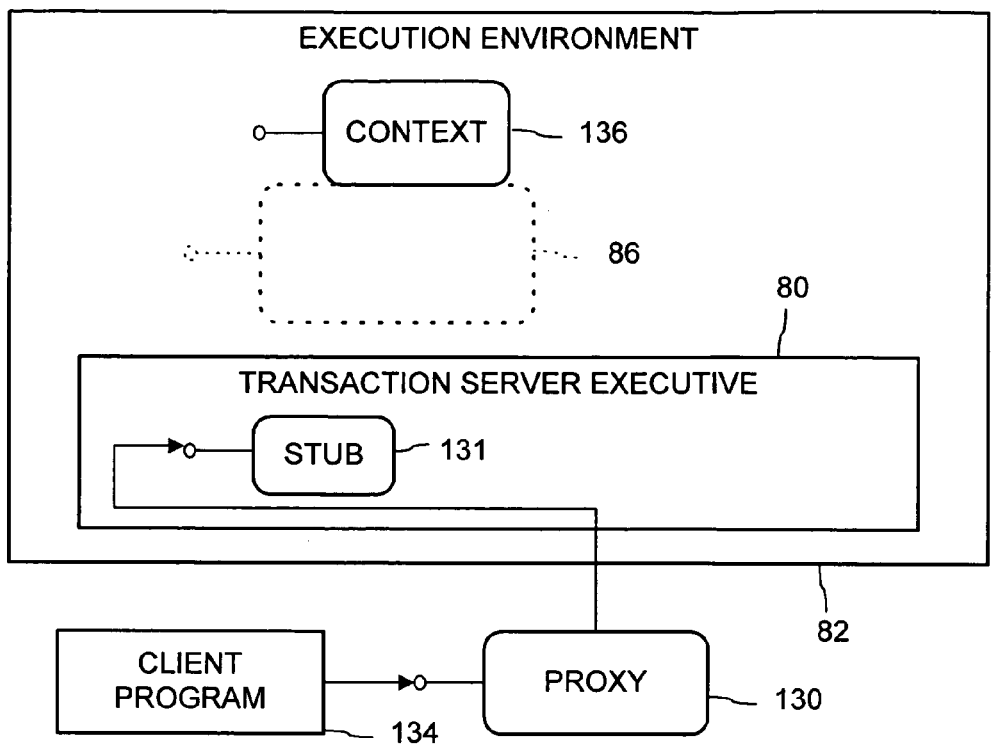
FIG. 11 is a block diagram illustrating the server application component in a deactivated condition in the execution environment of FIG. 3, such as upon destruction of the component's state under the component's control.

With reference now to FIG. 11, the illustrated execution environment 80 maintains the server application component in a deactivated condition until actively used by the client program 134. While deactivated, the client program 134 retains its reference to the server application component 86 indirectly through the transaction server executive 80 (i.e., the safe reference described above). However, the deactivated server application component 86 is not kept instantiated in the memory 22 (FIG. 1) of the server computer 84. More specifically, the instance data structure 102 of the deactivated server application component (which contains the state of the component's interaction with the client program) is not in memory. Further, the server component 86 is first created in the deactivated condition, and not actually instantiated until first used by the client program 134.

Figure 12:
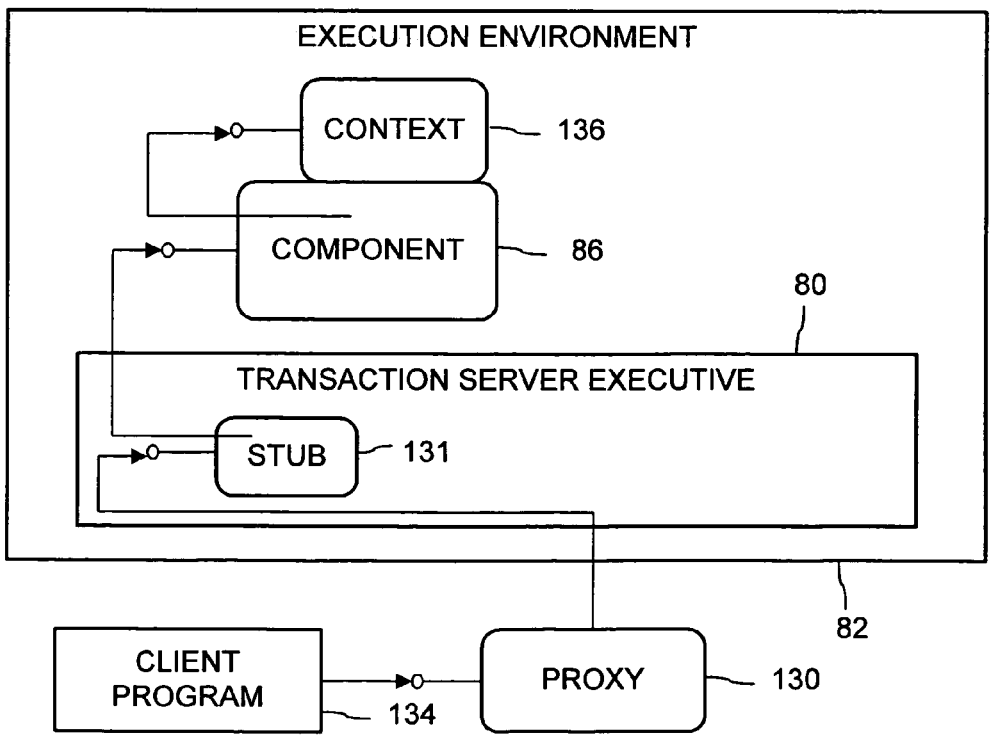
FIG. 12 is a block diagram illustrating the server application component in an activated condition in the execution environment of FIG. 3.

With reference to FIG. 12, any calls made by the client program 134 to the server application component 86 using the safe reference pass through the transaction server executive 80. If the server application component 86 is deactivated at the time that the client program 134 calls a member function of the server application component (other than the standard IUnknown functions, QueryInterface (where the interface is known to the transaction server executive), AddRef, and Release), the transaction server executive 80 instantiates the server application component 86 by calling the IClassFactory::CreateInstance function on the class factory 122 (FIG. 4) of the component's DLL file 120. This results in allocating memory for and constructing the instance data structure 102 of the server application component 86. The server application component is placed in this initial, post-construction state whenever activated, and not just upon its first activation. Then, the transaction server executive 80 passes the client program's call to the appropriate member function of the now instantiated server application component. The transaction server executive 80 thus activates the server application component upon use by the client program 134. This is referred to herein as "just-in-time" activation.

As-Soon-As-Possible Component Deactivation

With reference still to FIGS. 11 and 12, the transaction server executive 80 again deactivates the server application component 86 at the completion of the component's work, the completion of a transaction, or when the client program 134 releases its reference to the component. More specifically, the transaction server executive deactivates the server application component on the occurrence of any of the following events: the component requests deactivation, the component's transaction is committed or aborted, or all client programs release their reference to the component.

In the illustrated execution environment, the server application component requests deactivation by calling the IObjectContext::SetComplete or IObjectContext::SetAbort functions. The call to either of these functions indicates the component's work in a transaction is done, and the component does not need to maintain its state after returning from the call. This causes the transaction server executive to deactivate the component. The server application component also is immediately deactivated without action of the client program 134 at the end of a transaction in which it participates, such as upon the root component of the transaction calling the SetComplete or SetAbort functions (which initiates an attempt to commit or abort the transaction) or upon events where it is known that the transaction must be aborted (e.g., a resource such as the database 146 participating in the transaction initiates aborting the transaction, a resource manager involved in the transaction fails, the ASP 90 fails, etc.).

Finally, the server application component is permanently deactivated when the last client having a reference to the component releases that reference, such as by calling the IUnknown::Release function of the component. In response, the component is deactivated and the component's component context object also is released. The server application component therefore will not again be just-in-time activated.

When deactivated, the transaction server executive 80 releases its reference to the server application component 86 (which causes the component's reference count to be decremented to zero). In accordance with COM, this causes the server application component (as a COM object) to destroy its instance data structure 102 and release all resources held by the component (such as, by releasing any references to other server application components, COM objects, and database connections and other resources managed by the resource dispenser 144 or resource manager 140 that were used by the component during activation). This results in the state accumulated by the server application component in its instance data structure or other resources held by the component being destroyed.

The deactivation of the server application component on the component's request or on committing or aborting a transaction in which the component is enlisted is herein called "as-soon-as-possible deactivation." This as-soon-as-possible deactivating provides several advantages to server applications implemented using server application components, including increasing the scalability and robustness of the server application. The as-soon-as-possible deactivation provides scalability since the client program can hold references to server application components for long periods of time with only limited consumption of resources at the server computer 84. For example, where the client program 134 spends 99% of its time between transactions, the server application component will be activated less than 1% of the time. While deactivated, the only server resources consumed are those for the component context object 136 (FIG. 11). In an alternative embodiment of the invention, the component context object 136 also is released on deactivation of the component and later reconstructed on a next request from the client program 134 to use the component. This alternative embodiment effects a further increase in scalability by eliminating all consumption of server resources while the component is deactivated.

The scalability of a server application also can be enhanced outside of a transaction by the server application component requesting deactivation using the SetComplete or SetAbort function calls. For example, a stateless component (one which does not retain state between calls from a client program) can call the SetComplete or SetAbort functions before returning from each client call to the component. This causes the transaction server executive to deactivate the component immediately upon return from the client's call. The stateless component thus remains deactivated between client calls. Further, the component is not left activated and consuming resources on return from the client's call, while awaiting its final release by the client program. This becomes increasingly effective at reducing server resource consumption as the time to communicate between the client and server computer is increased (e.g., in distributed networks with low bandwidth or high latency connections between client and server computers).

The as-soon-as-possible deactivation of the server application component 86 also enforces a style of transaction-based programming that results in more robust server applications. By deactivating the server application component at the completion of its participation in a transaction, the state of the server application component which is accumulated during its work in the transaction is destroyed. When again activated for work in a separate transaction, the server application component is again placed in its initial, post-construction state. This ensures that the component's state, such as its data property settings, is not carried over into any subsequent transactions. Thus, deactivation and activation according to the invention effectively ensures transaction isolation and database consistency.

With just-in-time activation and as-soon-as-possible deactivation according to the invention, the server application component effectively becomes a sequence or stream of instances, referred to herein as an instance stream. The client program can hold a reference to the server application component through multiple activation and deactivation cycles. From the client program's perspective, the execution environment 80 behaves as if only a single instance of the server application component exists from the time the client program requests the component's creation to the time the client program finally releases its reference to the component. In actuality, the execution environment 80 provides an instance of the server application component at each activation, resulting in the instance stream.

Instance Pooling and Recycling

Figure 13:
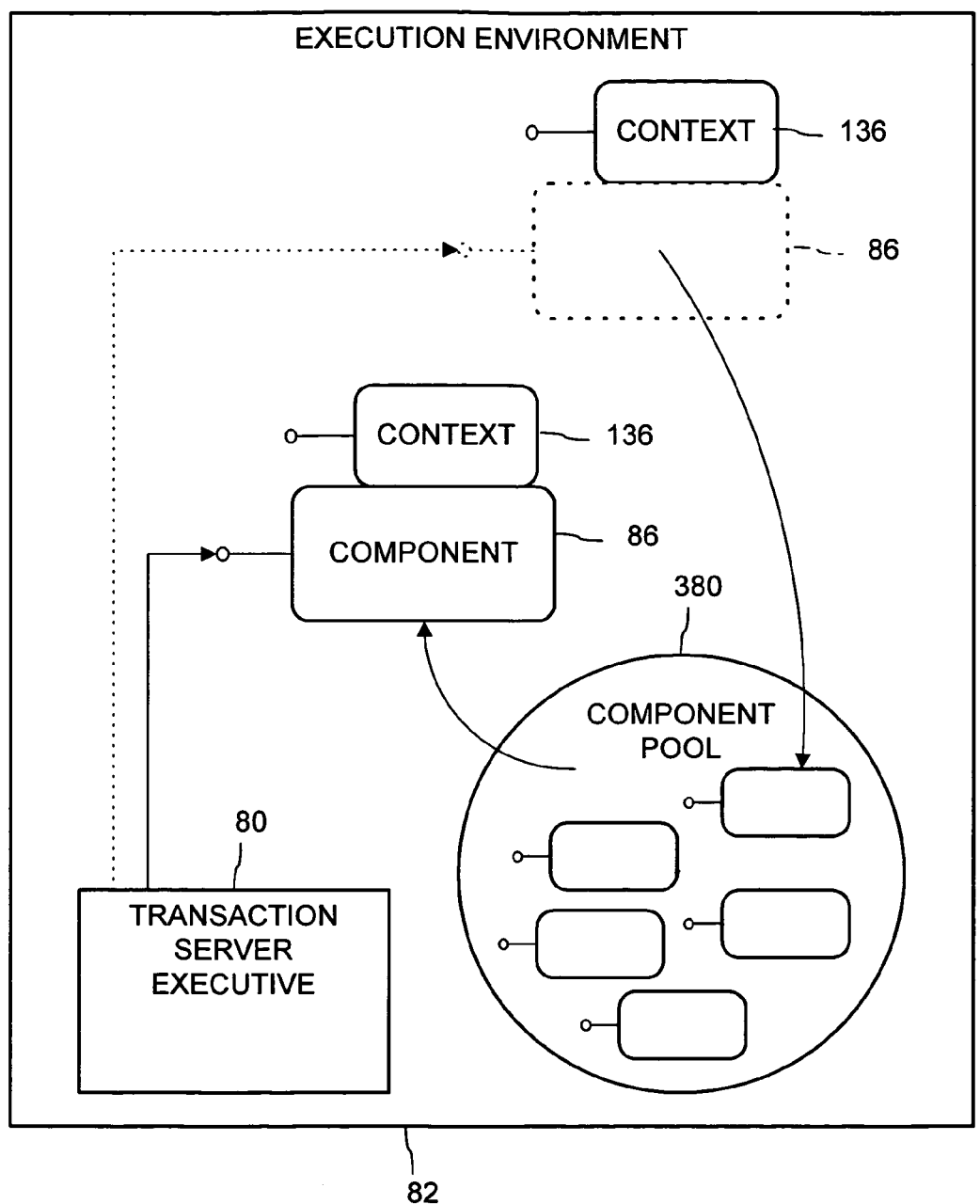
FIG. 13 is a block diagram of a component pool for pooling and recycling server application components by the server executive in the execution environment of FIG. 3, such as upon destruction of the component's state under the component's control.

With reference now to FIG. 13, the illustrated execution environment 80 further enhances server application scalability through pooling and recycling of server application component instances. Instead of releasing the instance of the server application component on deactivation (which causes its destruction), the illustrated transaction server executive may instead place the instance in a component pool 380, such as by adding the transaction server executive's reference to the server application component instance to a list of instances held in the pool. When activating the server application component, the transaction server executive 80 first checks in the component pool 380 for a pooled instance of the component. If an instance of the component is held in the component pool 380, the transaction server executive 80 activates the server application component by recycling the pooled instance rather than creating a new instance of the component using its class factory 122. Since recycling the instance consumes only the time to retrieve a reference to the instance from the pool and creating a new instance of the component requires at least allocating memory for and constructing the instance data structure 102, this pooling and recycling of component instances can save significant time.

Instances in the component pool 380 can be recycled for use in the same instance stream (e.g., for activation of the server application component on a subsequent call to the component using the same reference still held by the client program). The instances also can be recycled by the transaction server executive for use in a different instance streams, including for use by other client programs, than the instance stream in which the instance was used prior to pooling. On recycling the instance during component activation, the instance is returned to its initial, post-construction state which ensures that any state accumulated by the component instance during its use prior to pooling is not carried over.

Instance pooling and recycling in the illustrated embodiment is implemented by the transaction server executive, and additionally by a component interface, IObjectControl, which is implemented by the server application component to support instance pooling and recycling. The IObjectControl interface (described below) has a CanBePooled, an Activate, and a Deactivate member functions. When activating the server application component, the transaction server executive calls QueryInterface to determine that the server application component provides the IObjectControl interface and obtain an interface pointer to the component's IObjectControl interface. The transaction server executive retains the IObjectControl interface pointer for later use, such as at deactivation. At deactivation, the transaction server executive calls the IObjectControl::CanBePooled function. If the component implementation of the function returns true (indicating the component supports instance pooling and recycling), the transaction server executive pools the instance of the server application component. Otherwise, if the component does not provide the IObjectControl interface or its CanBePooled function returns false, the transaction server executive 80 releases the instance (resulting in its destruction) to deactivate the component.

The transaction server executive calls the server application component's Deactivate function on deactivating the component and its Activate function on activation. The component's implementation of these functions include code which ensures that the recycled component instance returns to its initial, post-construction state upon activation. For example, the Deactivate function preferably includes code to release resources then held by the server application component, such as references to other server application components that were created by the instance and resources obtained from the resource manager 140 and resource dispenser 144 (FIG. 3). In this way, the server application component instance does not continue consuming these resources while deactivated and held in the component pool 380. The Activate function, on the other hand, preferably resets the data properties in the instance data structure 102 of the component, and acquires any resources that the component obtains upon creation so as to place the component in its initial, post-construction state.

Component Activation and Deactivation Process

With reference now to FIGS. 14A–14D, the illustrated execution environment 80 (FIG. 3) performs a process 400 for just-in-time activation and as-soon-as-possible deactivation of the server application component 86 (FIGS. 11 and 12) according to the invention.

The illustrated process 400 begins at step 404 with a request to create the server application component 86. As described above, the request may be made by the client program 134 in a call to the CoCreateInstance API function. Alternatively, the request may be made by another server application component (hereafter also referred to as the client program) in a call to the IObjectContext::CreateInstance function of its component context object.

In response to any of these requests, the transaction server executive 80 at step 405 creates the component context object 136 which it implicitly associates with the server application component 86. At step 406, the transaction server executive 80 returns to the client program a safe reference (described above) to the server application component 86. The server application component 86 at this point is deactivated. The server application component 86, in fact, is not yet instantiated.

At some later time (step 407), the client program 134 calls a member function of the server application component 86 using the safe reference obtained from the transaction server executive 80. As indicated at step 408, the transaction server executive determines whether the call is to the QueryInterface, AddRef, or Release functions (hereafter the IUnknown functions) of the server application component. If the client's call is to one of these functions, the transaction server executive 80 can process the call at step 409 without activating the server application component 86.

The transaction server executive processes calls to the AddRef and Release functions at step 409 by incrementing or decrementing, respectively, a count of the number of programs holding the safe reference to the server application component 86. As previously discussed, the client program 134 holds only indirect or safe references through the transaction server executive to the server application component. The transaction server executive 80 maintains a reference count for each safe reference based on the client calls to the AddRef and Release functions. Each AddRef call made using a safe reference causes the transaction server executive 80 to increment the reference count of the safe reference by one. Each call to Release causes the transaction server executive to decrement the reference count by one. The transaction server executive 80 itself holds the direct references to the server application component 86, including the reference returned when an instance of the component is created at activation plus any references to other interfaces on the component that are obtained as a result of a QueryInterface request. When the reference count for a safe reference to a server application component interface is brought to zero as a result of a Release call, the transaction server executive 80 releases its corresponding direct reference to the server application component interface. Otherwise, the transaction server executive's direct references to server application component interfaces are all released when a server application component instance is destroyed upon deactivation.

The transaction server executive processes calls to the QueryInterface function by returning to the client program a safe reference to the interface requested in the QueryInterface call. If the interface already is known to be supported on the server application component (such as from configuration information for the server application component or from a prior direct QueryInterface of the transaction server executive to the server application component), the transaction server executive 80 merely creates a safe reference for the interface and returns the created safe reference to the client program 134 without activating the server application component. (The server application component is not activated until a subsequent call from the client program 134 using the safe reference.) If support by the server application component for the interface is not known, the transaction server executive 80 activates the server application component (as shown in steps 420–425 of FIG. 14B) for the purpose of issuing the QueryInterface to the server application component so as to determine the server application component's support for the interface. If supported, the transaction server executive 80 retains the direct reference to the interface obtained from the server application component. The transaction server executive 80 then creates and returns a safe reference to the requested component interface back to the client program 134. If the requested interface is not supported, the transaction server executive 80 returns a failure to the client program 134 per usual COM semantics.

Otherwise, if the call is to a member function of the server application component 86 other than the IUnknown functions, the transaction server executive 80 checks whether the server application component has been activated at step 410. If so, the transaction server executive 80 passes the call to the server application component 86, such as by initiating processing of the call by the called function as indicated at step 411.

Figure 14A:
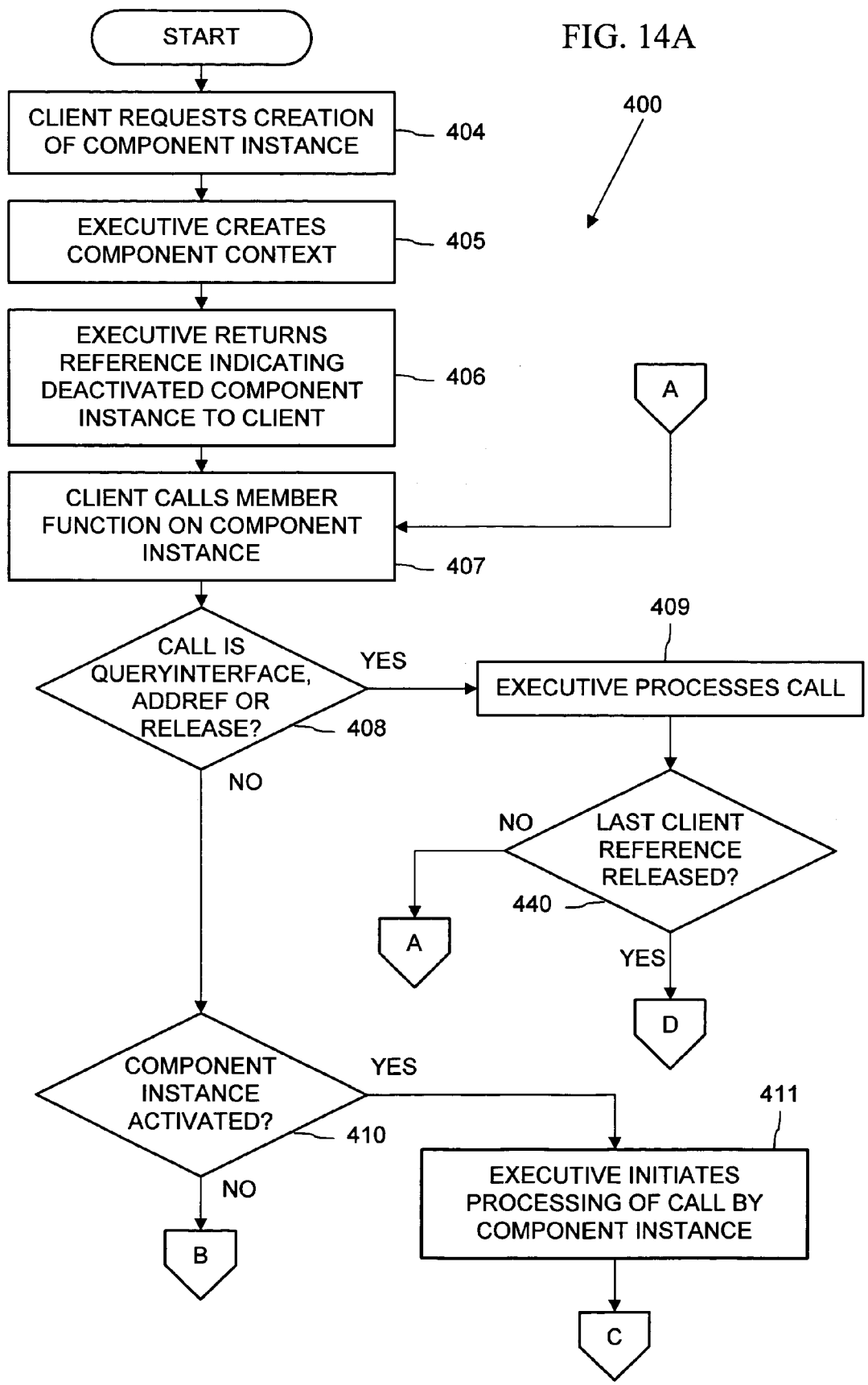
FIGS. 14A–14D are a flow chart of a component deactivation and just-in-time activation method performed by the server executive in the execution environment of FIG. 3 in which the server application component can control duration of the component's state.
Figure 14B:
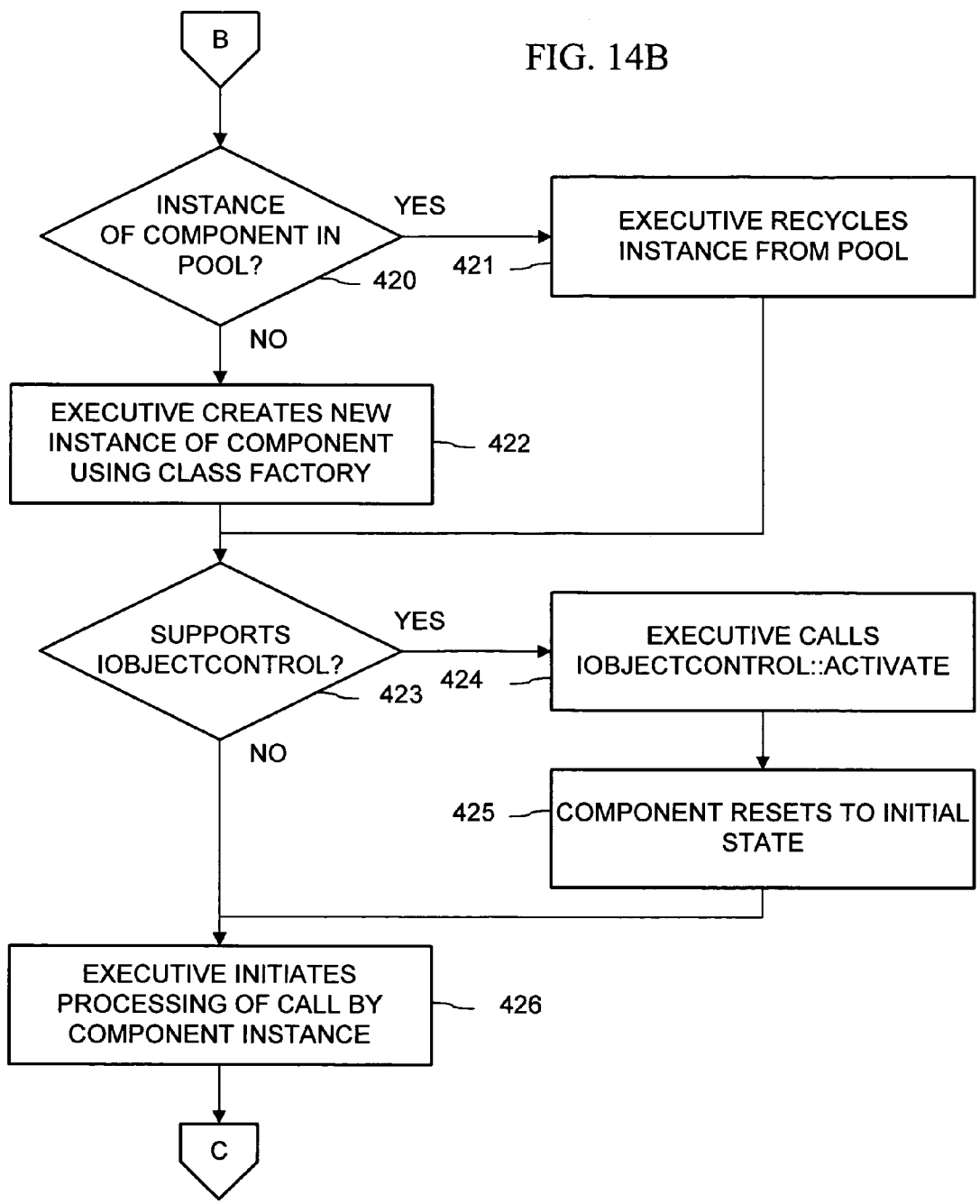

If the call is to other than the IUnknown functions and the component is deactivated (or in the case of a QueryInterface call where the server application component's support for the requested interface is not known), the transaction server executive 80 proceeds to activate the server application component 86 in steps 420–424 of FIG. 14B. As indicated at step 420, the transaction server executive 80 first checks whether there is an instance of the server application component in the component pool 380 (FIG. 13). If so, the transaction server executive 80 activates the server application component by recycling the instance of the component from the component pool 380, such as by taking the reference to the instance from a list of instances held in the component pool 380.

Otherwise, if the transaction server executive 80 does not find an instance of the server application component 86 in the component pool 380, the transaction server executive 80 creates a new instance of the server application component at step 422, such as by loading the server application component's DLL 120 (FIG. 4) into the memory 22 of the server computer 84 (if not already loaded) and calling the IClassFactory::CreateInstance function on the component's class factory 122 (FIG. 4). The resulting new instance of the server application component 86 is in its initial, post-construction state.

After creating or recycling an instance of the server application component, the transaction server executive 80 further checks at step 423 whether the server application component supports the IObjectControl interface, such as by issuing a QueryInterface designating the IObjectControl interface to the server application component. If the IObjectControl interface is supported, the transaction server executive 422 calls the IObjectControl::Activate function of the instance at step 424. This causes the instance to reset itself to its initial, post-construction state at step 425. This instance then becomes the activated server application component 86.

At step 426, the transaction server executive 80 then passes the client program's call to the just activated server application component 86 (i.e., initiates processing the call by the appropriate function of the server application component).

Figure 14C:
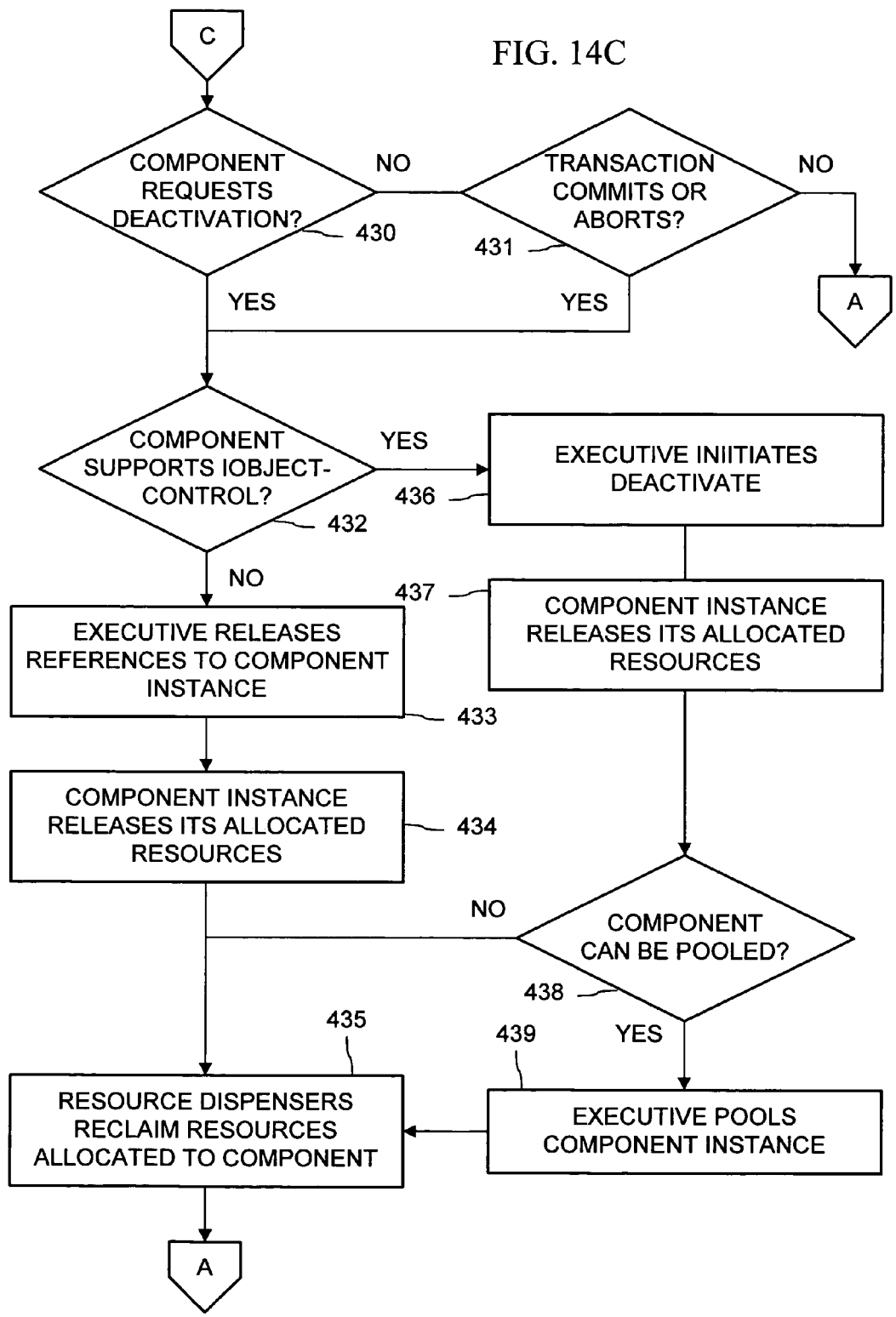

After the client program's call is processed at steps 411 or 425, the process 400 proceeds at steps 430–431 of FIG. 14C. Steps 430–431 indicate steps that may occur before a next call from the client program 134 at step 407, and cause deactivation of the server application component 86. At step 430, the server application component 86 may request deactivation before returning from processing the client program's call. Preferably, the server application component 86 requests deactivation when its state is no longer retained, such as when its work in a transaction is complete or when the server application component is stateless. As described above, the server application component 86 requests deactivation by calling the SetComplete or SetAbort functions. Alternatively, at step 431, after the client program's call to the server application component 86 returns, the client program 134 may commit or abort a transaction in which the server application component is enlisted.

On the occurrence of either of the events in steps 430–431, the transaction server executive 80 proceeds to deactivate the server application component in steps 432–439. At step 432, the transaction server executive 80 checks whether the server application component 86 supports the IObjectControl interface. When the IObjectControl interface is not supported, the transaction server executive cannot pool and recycle the instance of the server application component 86. Accordingly, the transaction server executive 80 deactivates the server application component 86 by releasing its reference to the component's instance at step 433, such as by calling the component's IUnknown::Release function. This causes the instance of the server application component 86 to release its resources and destroy its instance data structure 102 (FIG. 4). Resources released by the instance that were allocated from the resource dispenser 144 are reclaimed at step 435.

If the server application component 86 supports the IObjectControl interface, the transaction server executive 80 instead initiates the IObjectControl::Deactivate function of the component at step 436. The component's implementation of the Deactivate function preferably releases any resources that the instance has acquired at step 437.

At step 438, the transaction server executive 80 calls the IObjectControl::CanBePooled function on the server application component 86 to determine whether the component support pooling and recycling. If the CanBePooled function returns true, the transaction server executive 80 pools the instance of the server application component in the component pool 380. In either case, any resources released by the instance that were allocated from the resource dispenser 144 are reclaimed at step 435.

If neither event in steps 430–431 occurs, the process 400 continues at step 407 (FIG. 14A) with the next call from the client program 134 to the server application component 86.

Figure 14D:
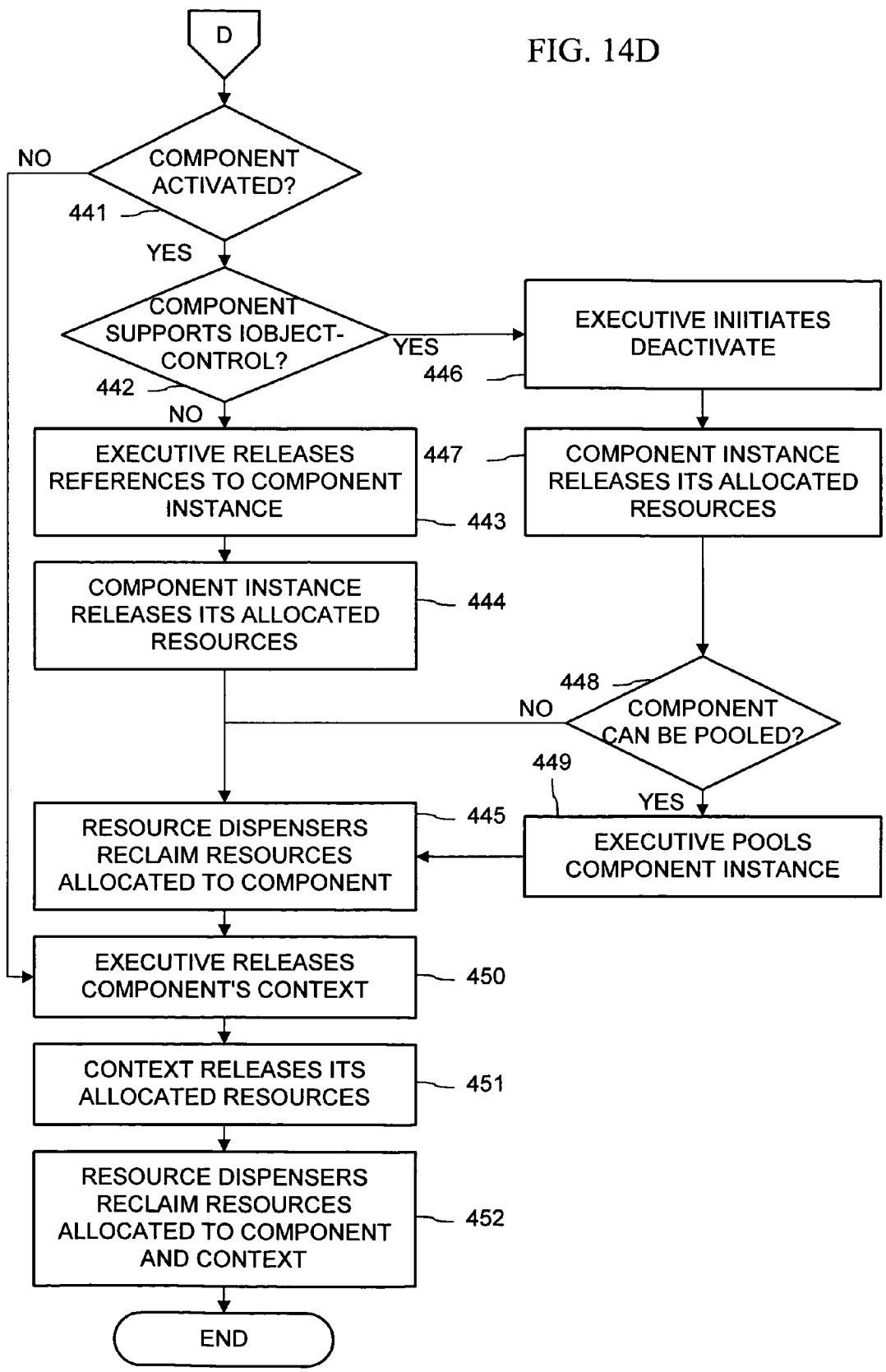

As indicated at step 440 (FIG. 14A), when the client program's call to the IUnknown::Release function releases the last client reference to the server application component 86, the transaction server executive 80 finally destroys the server application component 86 at steps 441–446 (FIG. 14D). As indicated at step 441, if the component is still activated, the transaction server executive 80 first deactivates the current instance of the component in steps 442–449 (which are similar to steps 432–439 of FIG. 14C discussed above). As shown at step 449, this still may result in pooling the instance of the server application component, which may later by recycled for use in activating the server application component in a new context. The transaction server executive 80 then completes destruction of the server application component 86 by releasing the component context object 136 which the executive implicitly associates with the server application component at step 450. This causes the component context object 136 to release its resources at step 451. If the component context object contains a transaction property object 150 (indicating the component is participating in a transaction), the release of the component context object 136 also causes an attempt to commit the transaction. Resources released by the server application component 86 and component context object are reclaimed at step 452. This ends the instance stream of the server application component created by the client program's request at step 404 (FIG. 14A).

Role-Based Security

In accordance with the invention, security for the server application component 86 in the illustrated execution environment of FIG. 3 is declaratively and programmatically defined at the time of server application development using roles. A role is a symbolic name that represents a logical class of users for a package of components. With the abstraction of roles, the server application's developer can fully configure security authorization to the server application at multiple levels, independent of the security configuration on the server computer 20 (FIG. 1) on which the server application is eventually deployed. Where the server application is to be deployed on a server computer running the Microsoft Windows NT Server operating system for example (as in the illustrated embodiment), the server application's developer can fully configure the server application's security without knowledge of the specific user ids and groups configured on the server computer.

Role Properties

Roles in the illustrated execution environment 86 (FIG. 3) have three properties, a name, a description and a role id. The name of a role is a text string that identifies the logical class of users. For example, roles in an on-line banking server application may be assigned the names, "customer," "junior teller," "senior teller," "branch manager," "vice president," and "president," to identify the corresponding logical classes of users represented by the roles. The description property is a text field that describes the logical class of users or purpose of the role to aid in administration and management of the roles, such as where roles having identical names are used in different packages deployed on a same server computer. The role id is a GUID unique to the role, and thus serves to differentiate roles even where the same name is used in different packages.

Declarative Access Control

With reference to FIGS. 15–26, the developer of the server application for the illustrated execution environment 82 (FIG. 3) declares roles and access privileges of the roles at development time using the Transaction Server Explorer administration utility. The illustrated Transaction Server Explorer is an application program that runs on a Windows NT Server-equipped computer. The Transaction Server Explorer provides a graphical user interface 500 having an application window 502 with a title bar 503, a menu bar 504 and a button bar 506, that are conventional of Windows applications. The application window 502 hosts two panes 508–509 for displaying and navigating the structure of the server application. In a left pane 508, the Transaction Server Explorer displays a hierarchical tree graph of the server application structure. The right pane 509 displays contents on a particular server application construct (e.g., package, component, role, etc.) selected in the left pane 508. For example, as shown in FIG. 15, a "components" folder 512 representing the components grouped into a package named "Sample Bank" is selected in the left pane 508, causing the right pane 509 to display icons 514 representing the components.

Figure 16:
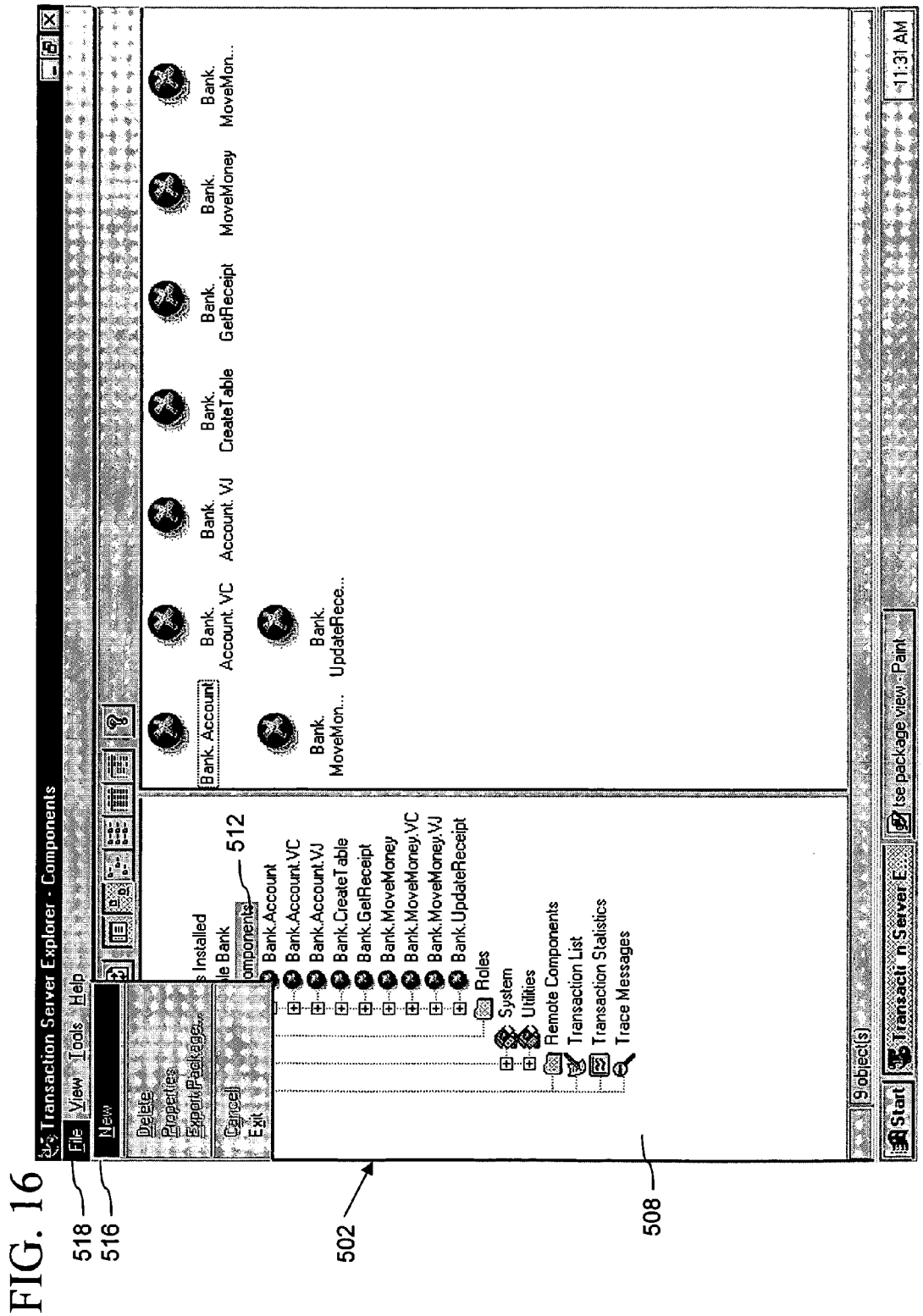
FIGS. 16 and 17 are views of a feature of the Transaction Server Explorer's graphical user interface for grouping server application components into packages.
Figure 17:
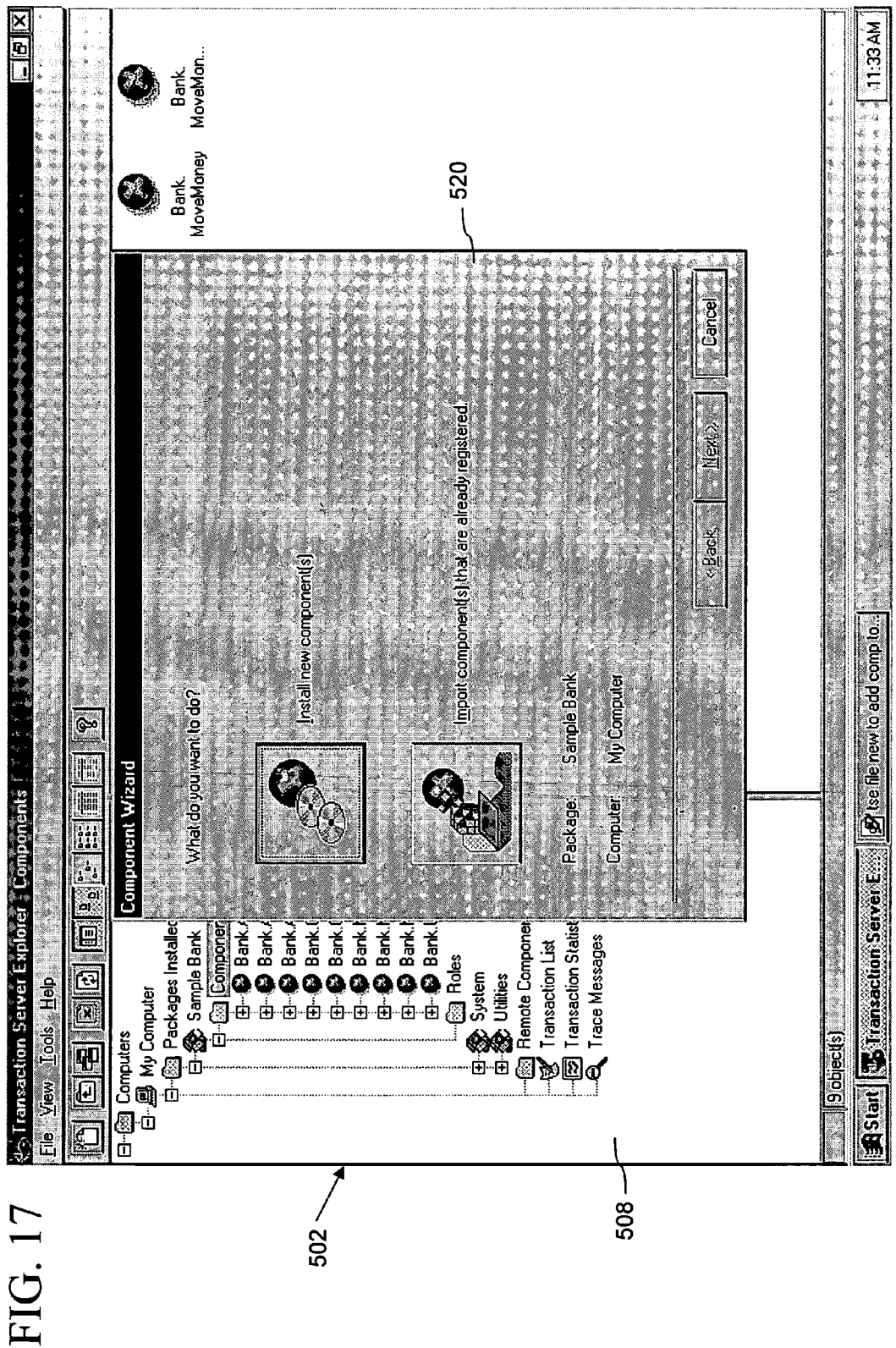
Figure 24:
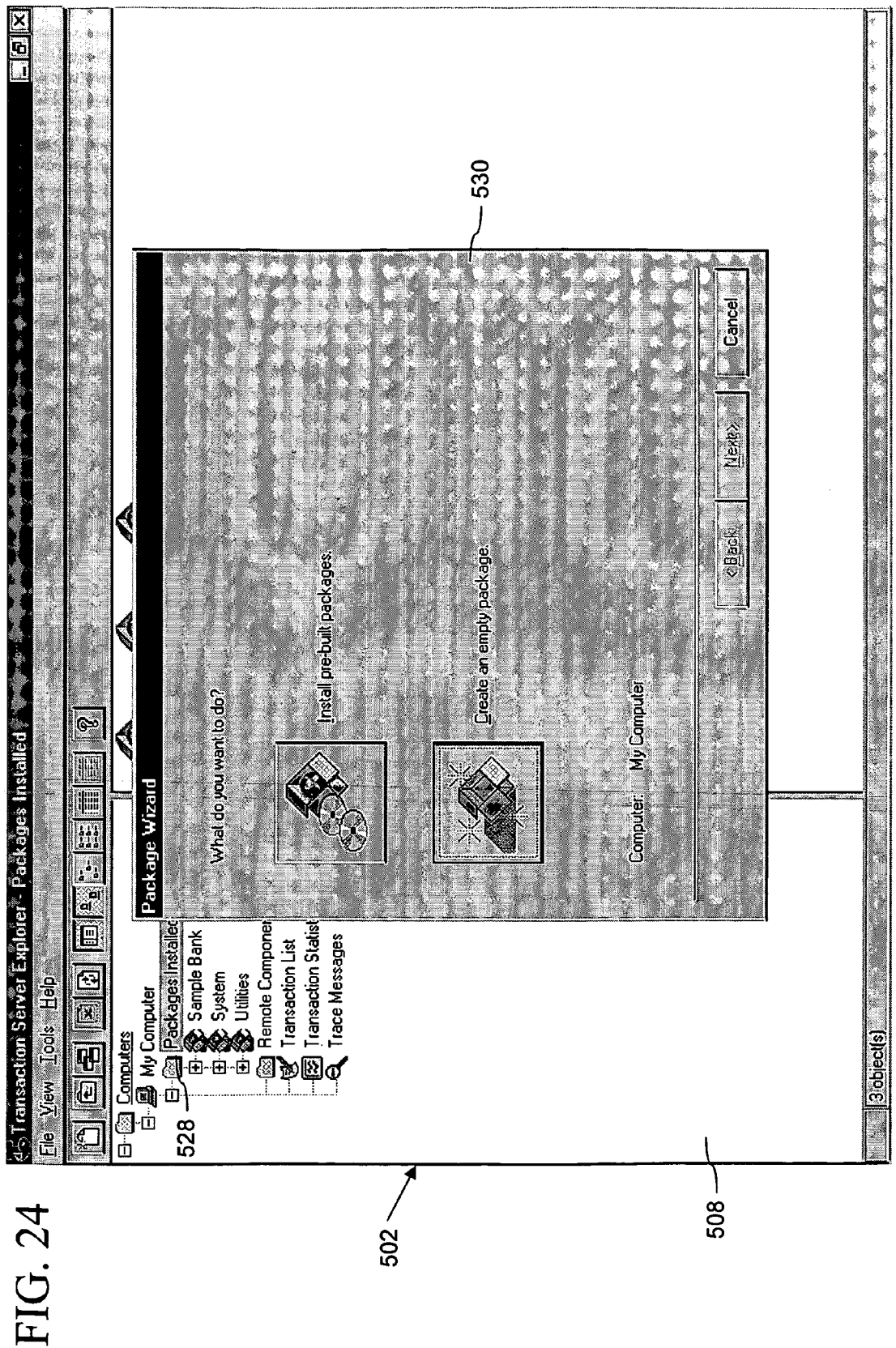
FIG. 24 is a view of a feature of the Transaction Server Explorer's graphical user interface for deploying a package having pre-defined role-based access privileges.

Using the Transaction Server Explorer, the developer groups a collection of related components of the server application into the package. As shown in FIGS. 16 and 17, the developer can add server application components that the developer has built with a suitable programming tool, such as Microsoft Visual Basic, Microsoft Visual C++, Java or other programming system capable of building COM Objects, into the package. With the components folder 512 of the desired package selected in the left pane 508 of the Transaction Server Explorer, the developer activates the new command 516 on the file menu 518. This launches an interactive dialog called the "component wizard" dialog 520 which prompts the developer to input information specifying the component to be added, and registration properties needed to run the component in the execution environment 82 (FIG. 3). As shown in FIG. 24, the developer begins a new package in a like manner, by activating the file:new menu command 516 (FIG. 16) with the "packages installed" folder 528 selected in the left pane 508, then responding to the prompts in an interactive "package wizard" dialog 530.

Figure 18:
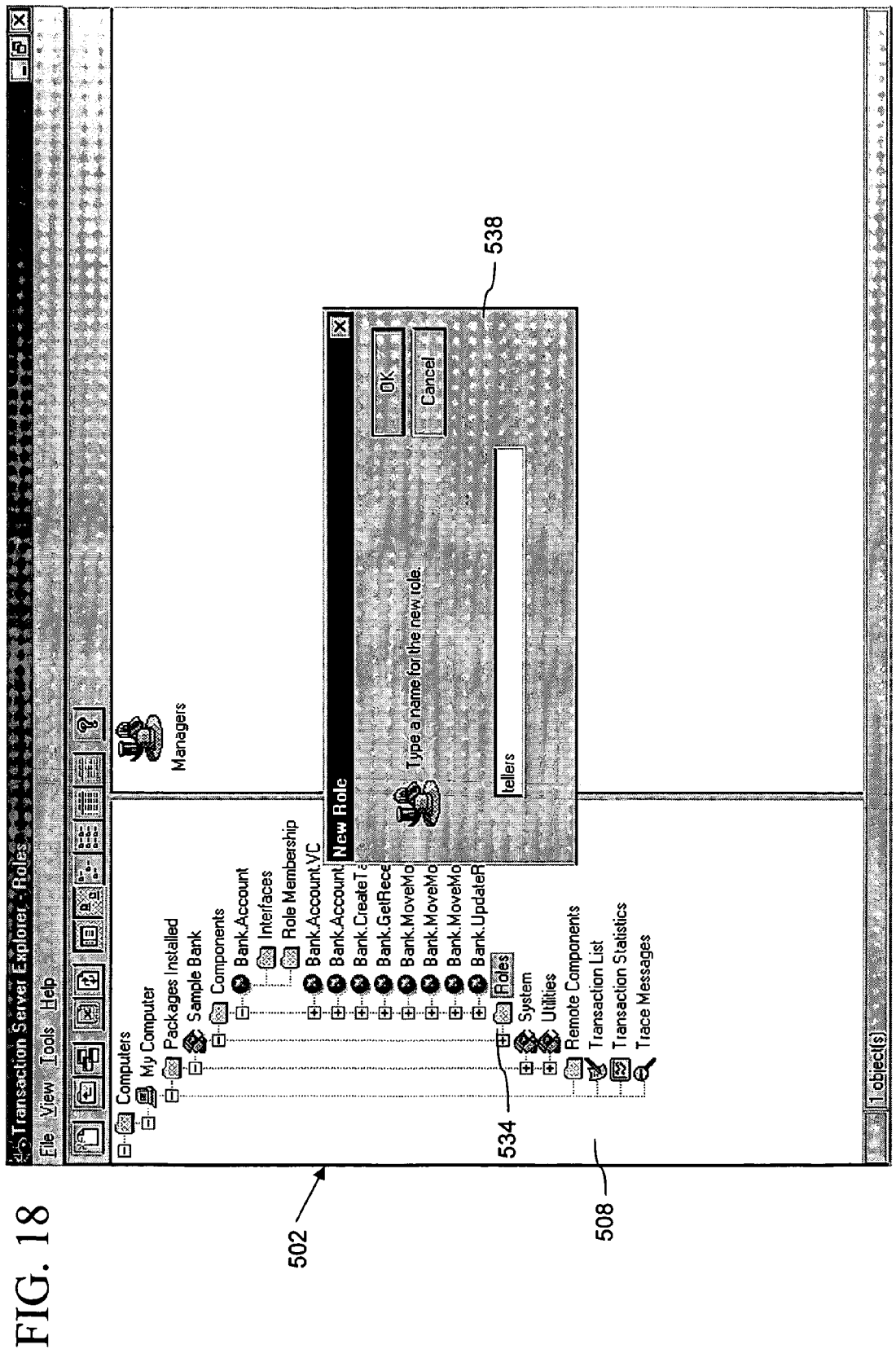
FIGS. 18 and 19 are view of a feature of the Transaction Server Explorer's graphical user interface for defining roles and assigning package level access privileges of the roles.

With a collection of server application components grouped into a package (such as, the "bank account" and other components in the "sample bank" package shown in FIG. 15), the developer can declare roles applicable to the package and assign access privileges to the package, its components and the components' interfaces for the roles. In the Transaction Server Explorer application window 502 as shown in FIG. 18, the developer selects the "roles" folder 534 of the desired package (e.g., the "sample bank" package) in the left pane 508 and activates the file:new menu command 516 (FIG. 16) to bring up a "new role" dialog 538. The developer then designates a name for the new role in the "new role" dialog. After entering a name and clicking "ok" in the new role dialog, the Transaction Server Explorer generates a GUID to use as the role id and adds the new role to the roles folder for the package.

Figure 19:
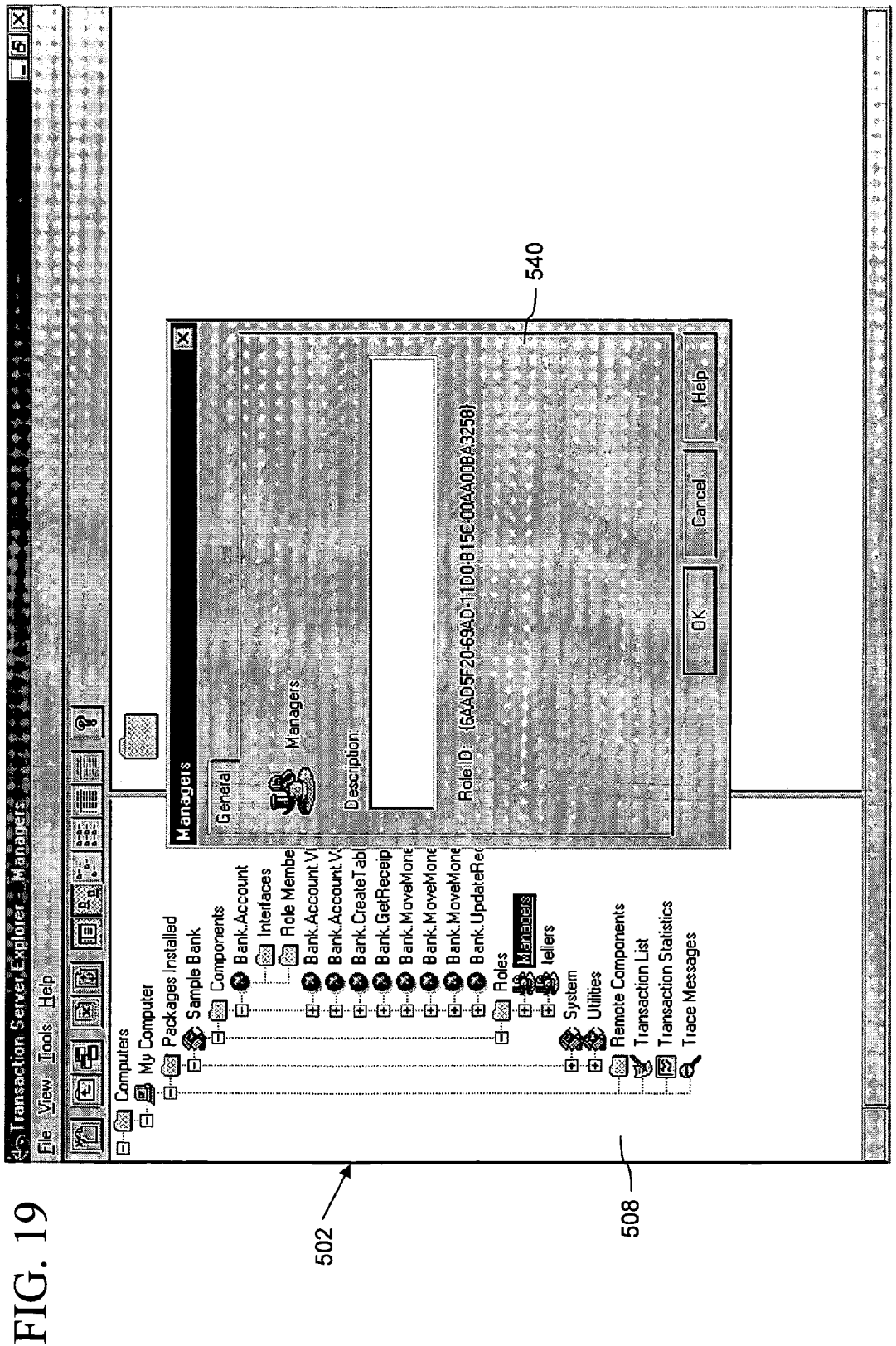

As shown in FIG. 19, the developer can view the properties of a role and input text of a role's description property in a role property sheet 540. Per Windows NT Server operating system conventions, the property sheet 540 is accessed by "right-clicking" the name and icon of the desired role in the left pane 508 (FIG. 20) or right pane 509 (FIG. 19) and activating a "properties" menu command.

With reference again to FIG. 18, the developer assigns access privileges of a role to the package by adding the role to the roles folder of the package as just discussed. As described in the Authorization Checking section below, this allows user threads operating under the role to have access to the package. The developer can additionally assign access privileges of certain subsets of the roles having access privileges to the package to particular components and component interfaces using the Transaction Server Explorer. This allows the developer to declaratively configure different logical classes (i.e., roles) to have different levels of access to particular processing services of the server application.

In the sample bank package for example, the developer can use declarative access control with roles to allow only certain users (e.g., in an abstract class of "loan officers") to access certain processing services (e.g., relating to loans) of the server application by granting component-level and interface-level access privileges. The developer adds a loan component which encapsulates loan related processing services to the package with the Transaction Server Explorer with the procedure discussed above and shown in FIGS. 16 and 17, and adds roles for "loan officers" and "tellers" with the procedure discussed above and shown in FIG. 18. The developer then limits access to the loan processing services to the loan officers role by granting access privileges to the "loan officers" role, but omitting the roles (e.g., tellers) from the loan component's role membership folder that are to be excluded from access to the loan processing services implemented by the loan component.

Figure 20:
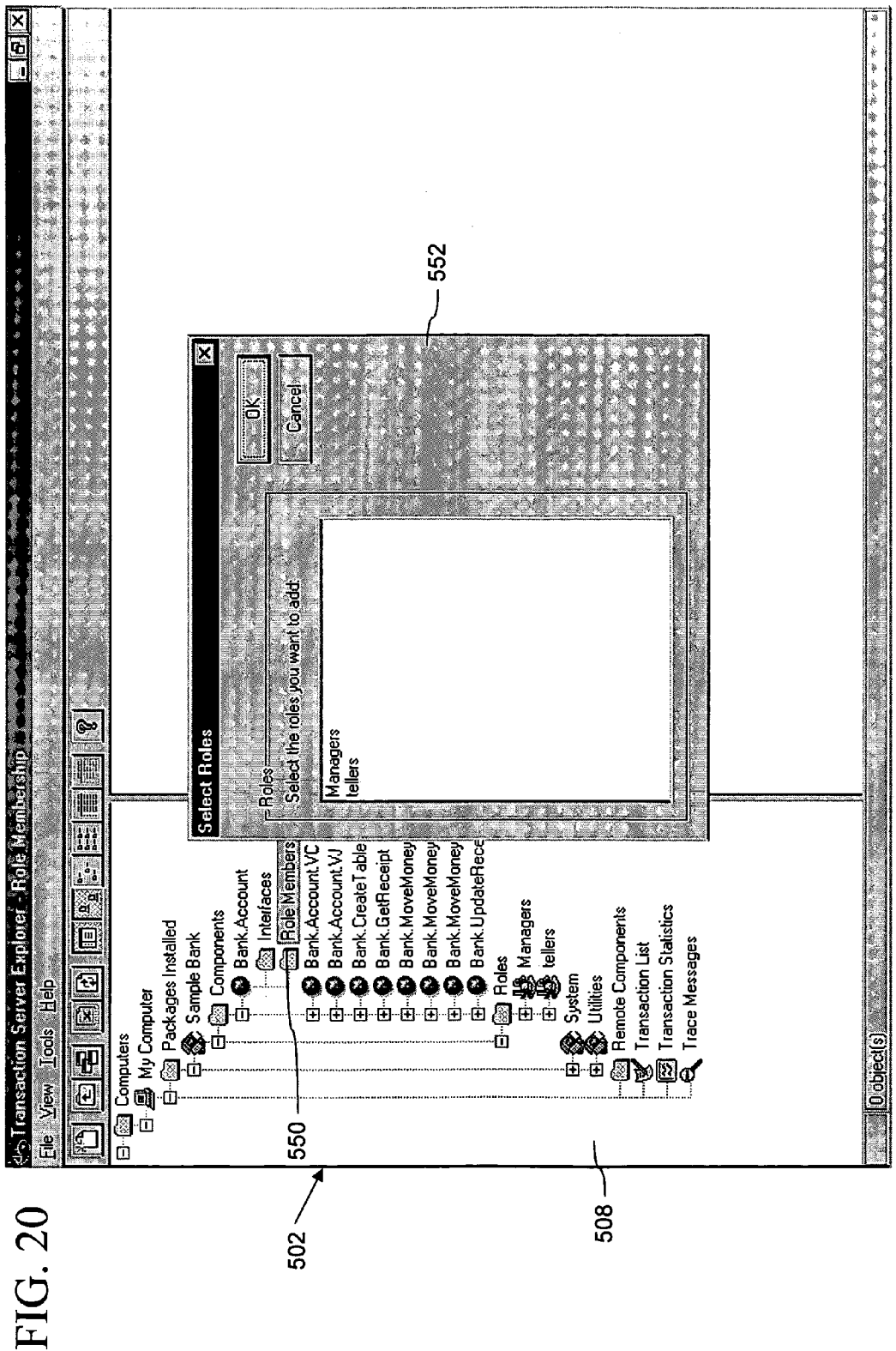
FIG. 20 is a view of a feature of the Transaction Server Explorer's graphical user interface for assigning component level access privileges of the roles.

With reference to FIG. 20, the developer assigns access privileges on the component level in the Transaction Server Explorer by selecting a "role membership" folder 550 under the desired server application component of the package. The developer then activates the file:new menu command 116 (FIG. 16) to bring up a "select roles" dialog 552. In the select roles dialog 552, the Transaction Server Explorer displays a list of the roles in the package. The developer selects a role from the list to be added to the role membership folder 550, which assigns the selected role to have access privileges to the component.

As a further example, the developer also can declaratively assign interface-level access privileges to configure selective access to certain processing services of the sample bank package. The developer builds the loan component to provide separate interfaces to the loan processing services it encapsulates, such as a get loan interface for reading loan information and a set loan interface for setting up a loan. The developer then assigns both tellers and loan officers roles to have access privileges to the get loan interface, but only assigns the loan officers role to have access privileges to the set loan interface.

Figure 21:
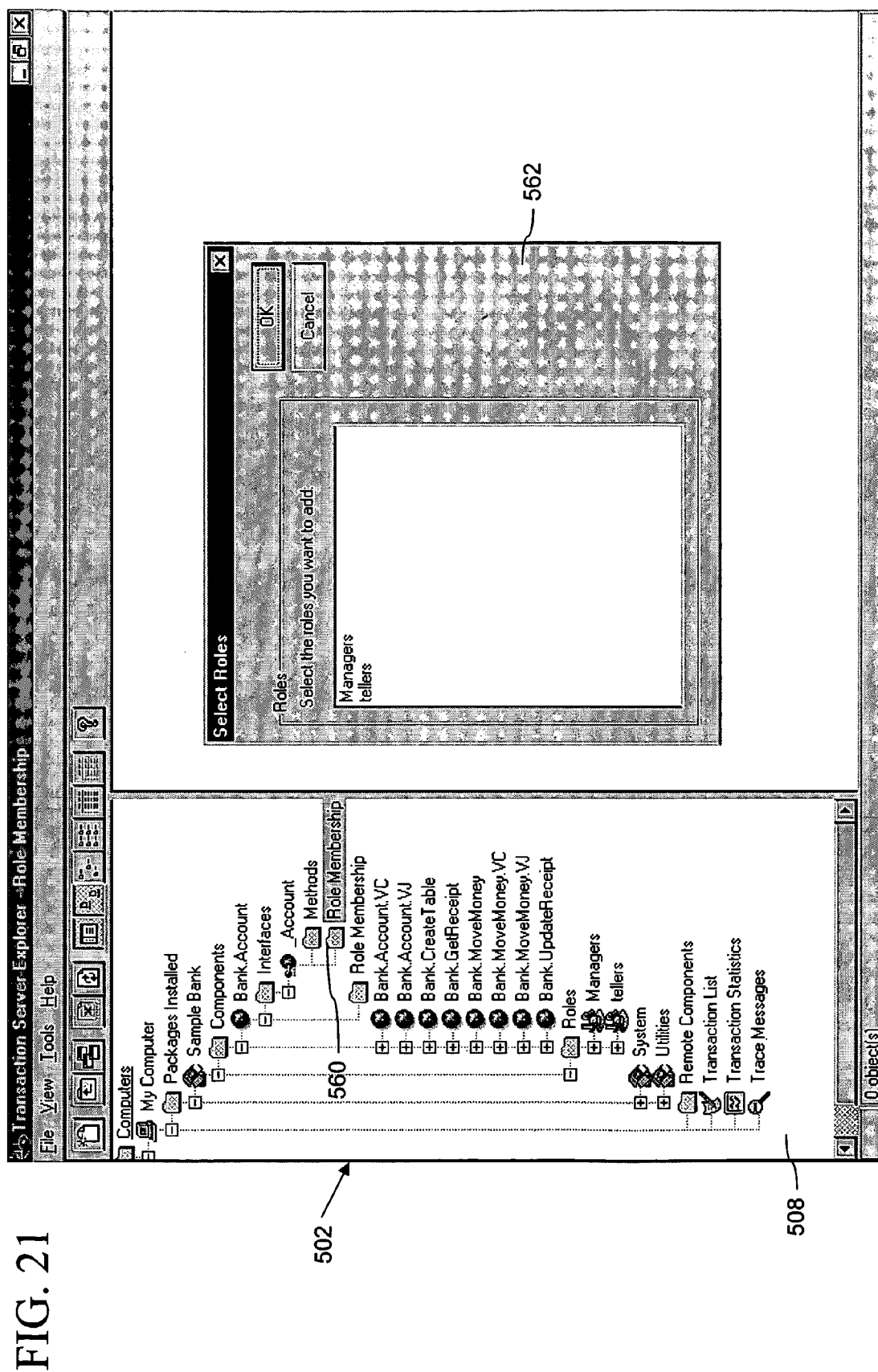
FIG. 21 is a view of a feature of the Transaction Server Explorer's graphical user interface for assigning interface level access privileges of the roles.

With reference to FIG. 21, the developer assigns access privileges on the interface level in the Transaction Server Explorer by selecting a "role membership" folder 560 under the desired interface of the server application component of the package. The developer then activates the file:new menu command 116 (FIG. 16) to bring up a "select roles" dialog 562. In the select roles dialog 562, the Transaction Server Explorer displays a list of the roles in the package. The developer selects a role from the list to be added to the role members folder 560, which assigns the selected role to have access privileges to the interface.

Figure 22:
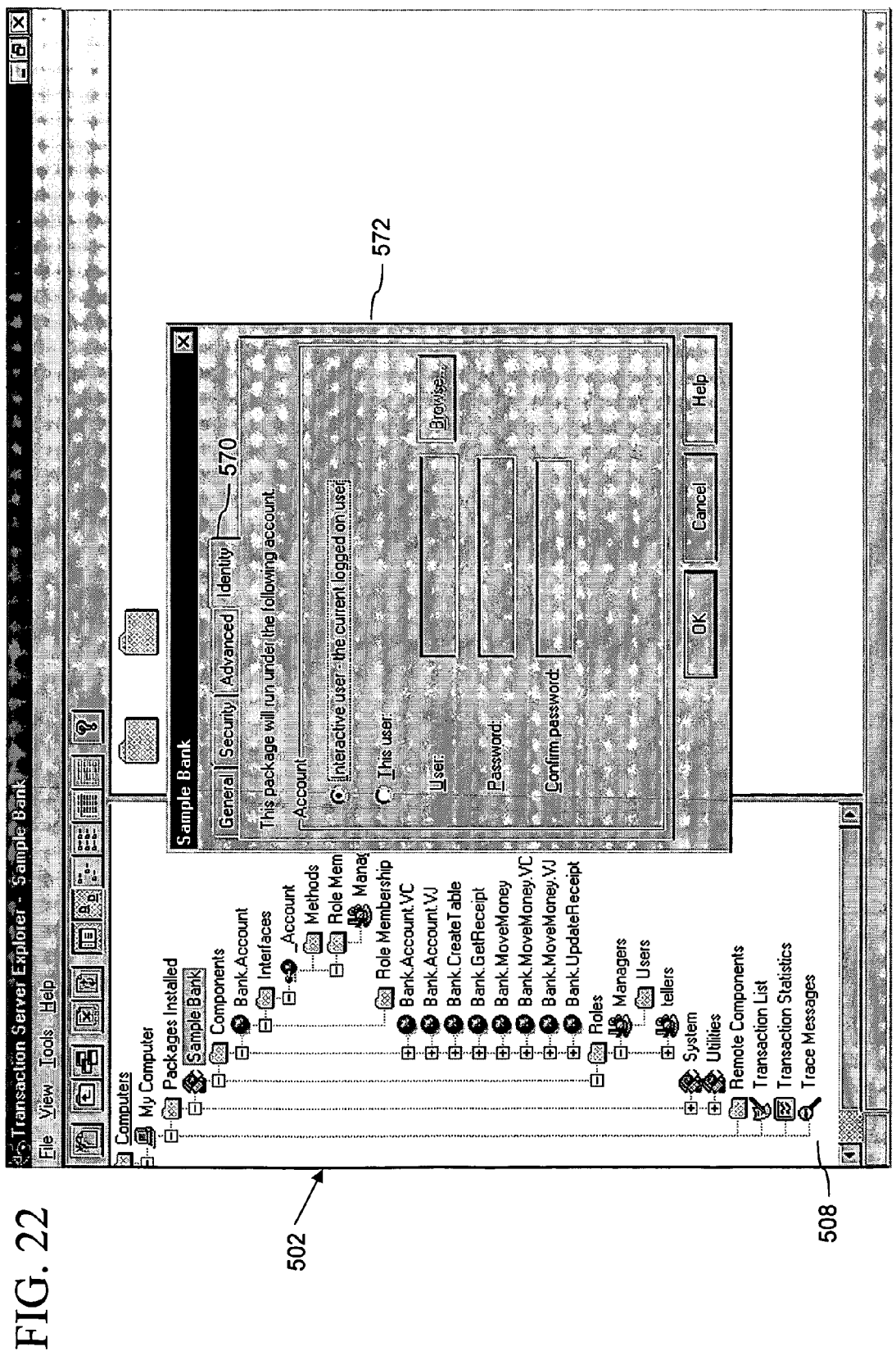
FIG. 22 is a view of a feature of the Transaction Server Explorer's graphical user interface for establishing a process identity at development under which a package is run in the execution environment of FIG. 3.

With reference to FIG. 22, the developer also establishes a package identity at development that defines the identity of the ASP 90 in which the package is run at execution. The ASP 90 can be run either as "interactive user" or as a specified Windows NT user id. When run as interactive user, the ASP 90 assumes the identity of the user currently logged on to the server computer. Accordingly, when the package identity is declared as interactive user, a user must be logged on to the server computer for the package to be run. On the other hand, when run as a specified Windows NT user id, the Windows NT operating system runs the process as a separate "windows station," meaning that no dialog boxes will be displayed at the server computer. The developer assigns the package identity as part of the interactive package wizard dialog 530 (FIG. 24), or on a "identity" tab 570 of a package property sheet 572 (FIG. 22). The package property sheet 572 is accessed by activating a file:properties menu command.

Mapping Roles to Security Configuration at Deployment

Figure 23:
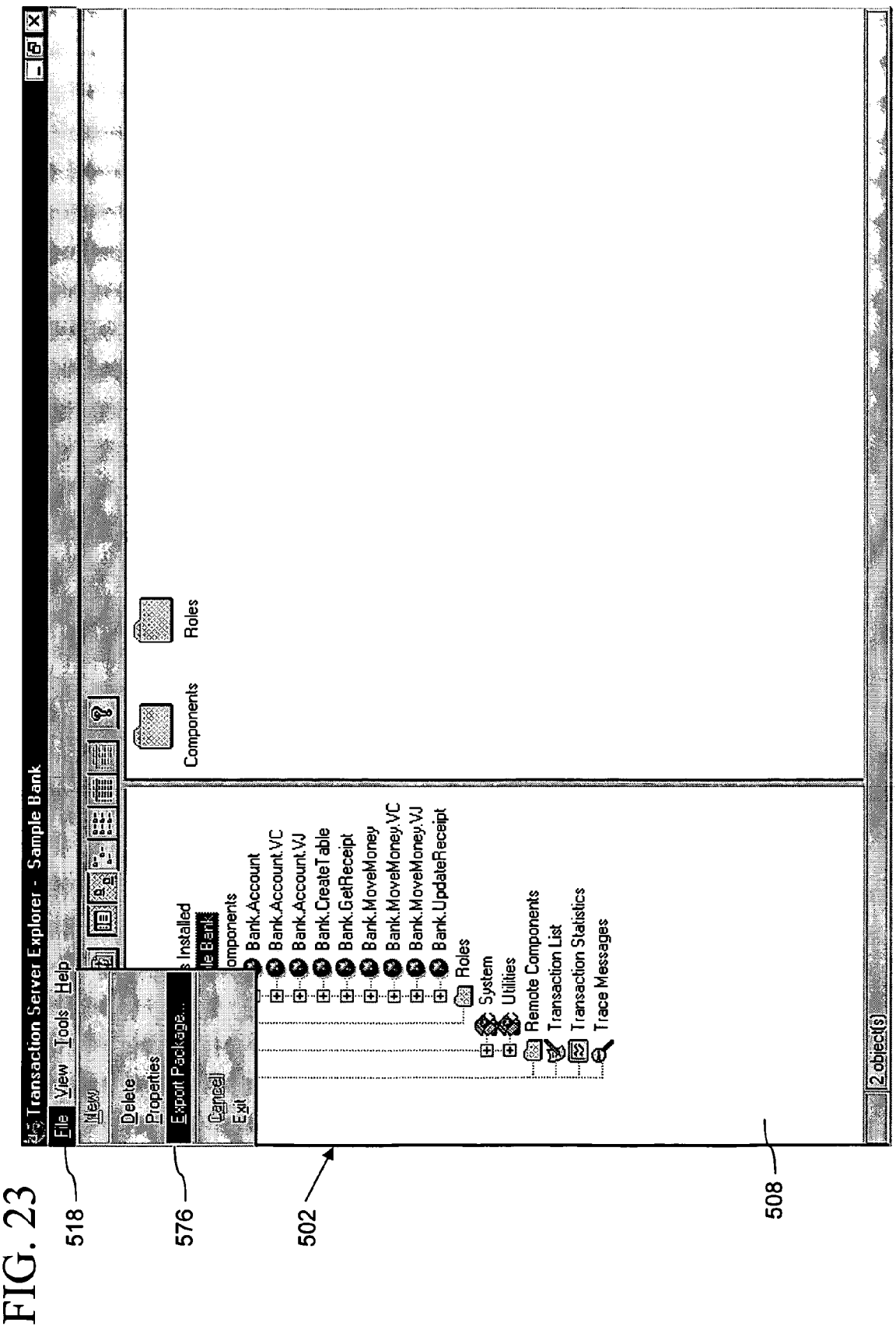
FIG. 23 is a view of a feature of the Transaction Server Explorer's graphical user interface for packaging server application components with role-based access privileges defined at development.
Figure 27:
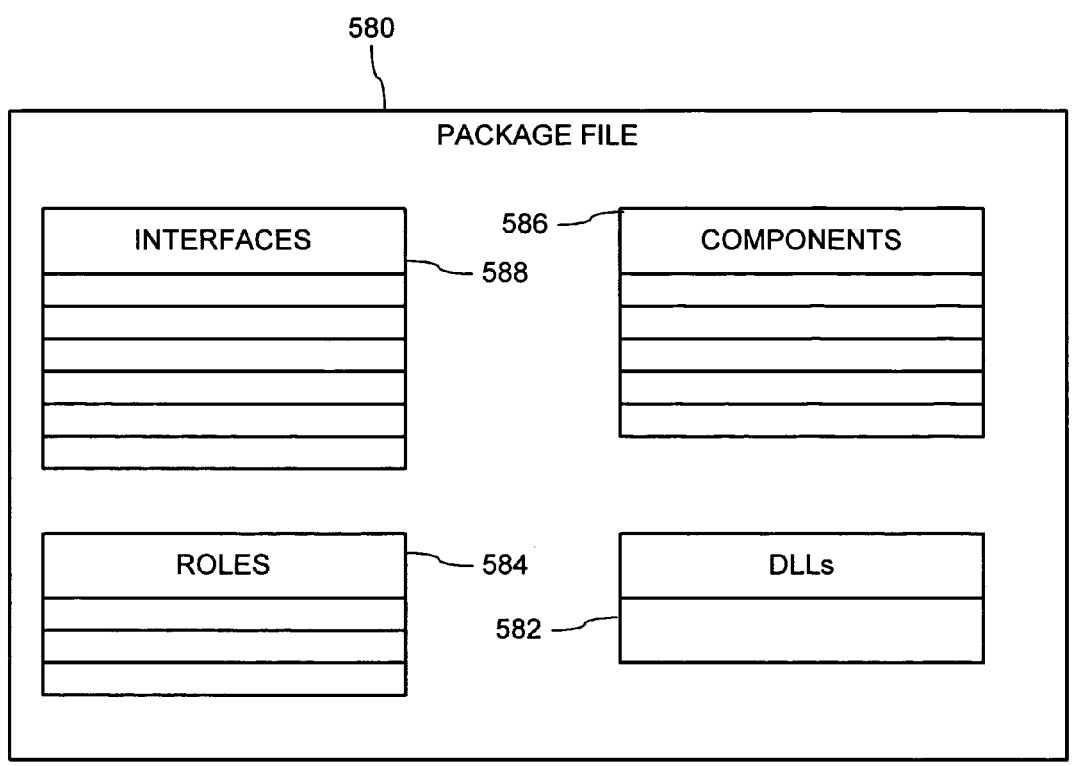
FIG. 27 is a block diagram of a file structure of a package of server application components with role-based access privileges defined at development.

With reference to FIGS. 23 and 27, the package serves as the unit of deployment of a server application in the illustrated execution environment 82 (FIG. 2). After defining role-based security for the server application as discussed in the Declarative Access Control section above, the developer exports the package from the Transaction Server Explorer as shown in FIG. 23 by selecting the desired package in the left pane 508 and activating an export package command 576 from the file menu 518. This causes the Transaction Server Explorer to produce a package file 580 (FIG. 27). The developer distributes this package file 580 for deployment on the computer systems on which the server application is to be run.

In the package file 580, the Transaction Server Explorer bundles together DLL files 582 which implement the server application components that are grouped in the exported package, together with data structures containing the declared role-based security configuration of the package. These data structures include a roles data structure 584, a components data structure 586, and an interfaces data structure 588. The roles data structure stores the properties (i.e., name, description and role id) of the roles that were defined by the developer for the package as discussed above and shown in FIGS. 18 and 19. The components data structure 586 stores the roles' component-level access privileges that were declared by the developer as discussed above and shown in FIG. 20, whereas the interfaces data structure 588 stores the roles' interface-level access privileges declared by the developer as discussed above and shown in FIG. 21.

With reference now to FIG. 24, the package containing the server application is deployed on the server computer 20 (FIG. 1), such as by a systems administrator, again using the Transaction Server Explorer. In the Transaction Server Explorer, the administrator selects the packages installed folder 528 in the left pane 508 and activates the file:new menu command 516 (FIG. 16). This causes the Transaction Server Explorer to display an interactive "package wizard" dialog 530 in which the administrator initiates installation of the pre-built package.

With reference to FIG. 28, the Transaction Server Explorer 600 installs the package by storing the server application component's DLL files 582 (FIG. 27) on the hard drive 27 (FIG. 1) of the server computer 20, and also causing the component to self register (using conventional COM Object self registration techniques) in the Windows NT system registry 602. In addition, the Transaction Server Explorer 600 registers information for executing the component in the illustrated execution environment 82 (FIG. 3), including the transaction server execution attribute described above. The Transaction Server Explorer also transfers the role-base security configuration for the package into the system registry 602, or alternatively another configuration file on the server computer 20 (FIG. 1).

Figure 25:
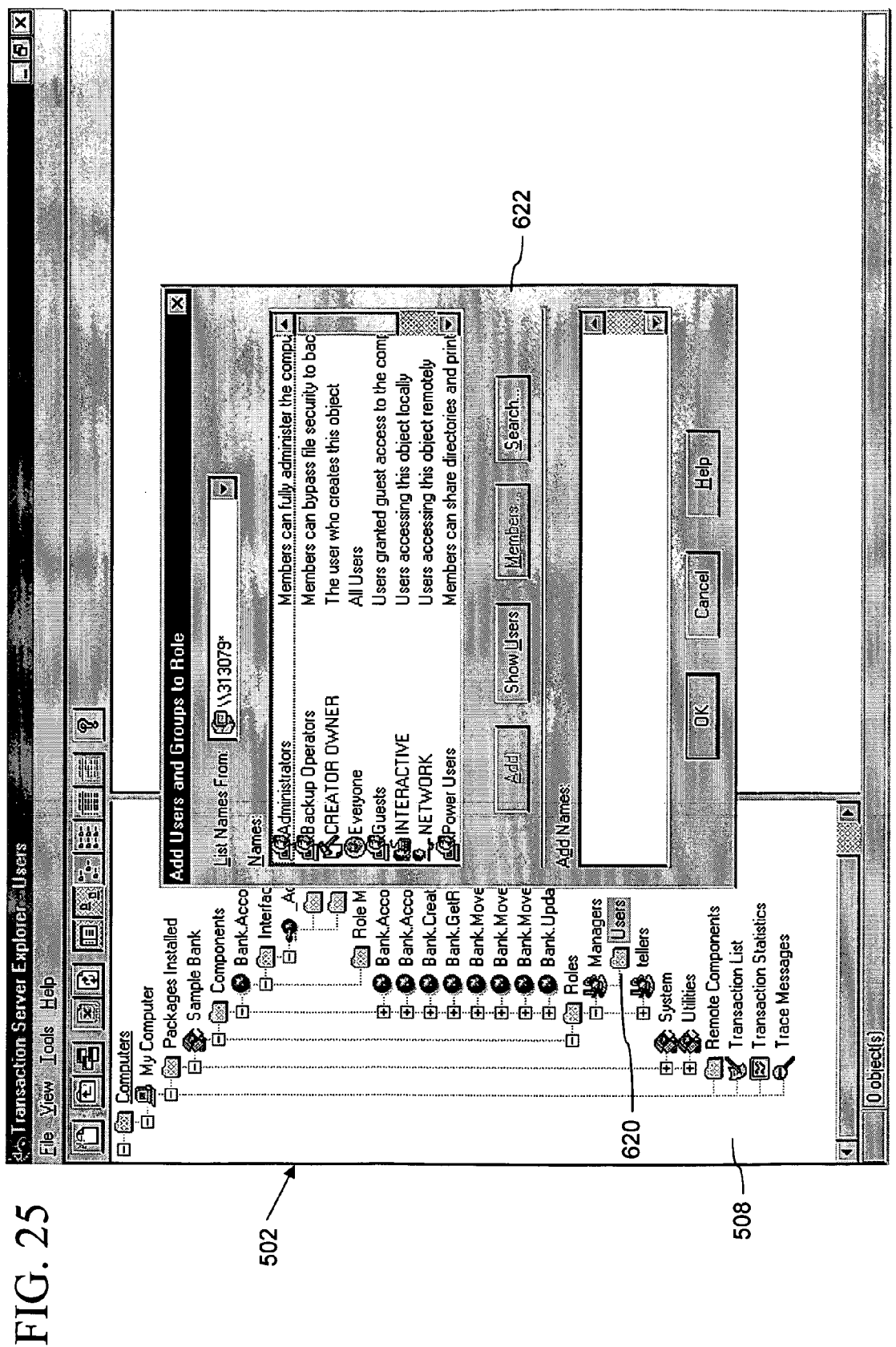
FIG. 25 is a view of a feature of the Transaction Server Explorer's graphical user interface for mapping users to roles at deployment of a package having pre-defined role-based access privileges.

With reference now to FIG. 25, the administrator next maps the developer-defined roles security configuration to the security configuration of the server computer 20, such as by mapping (also referred to as "binding") each developer-defined role to specific user ids or groups that are configured on the server computer 20. The administrator can define new user groups to maintain one-to-one correspondence of user groups to the developer-defined roles. In the Transaction Server Explorer, the administrator maps a role to particular user ids and/or groups by selecting a "users" folder 622 under the desired role in the left pane 508 and activating the file:new menu command 516 (FIG. 16). This causes the Transaction Server Explorer to display an "add users and groups to role" dialog 622, which shows a list of the user ids and groups configured on the server computer 20. The administrator selects user ids and/or groups from the list to add to the role's users folder 620, which creates a mapping between the role and the designated user ids and/or groups.

The illustrated execution environment 82 (FIG. 3) also requires the administrator to configure Windows NT Server impersonation level and authentication level settings on client and server computers 84, 92 (FIG. 3). The administrator sets the impersonation level of both client and server computers to impersonate. If Impersonation isn't set to Impersonate, the role-based declarative security always fails. The administrator can set this property with the Distributed COM Configuration Properties (dcomcnfg.exe) utility.

Figure 26:
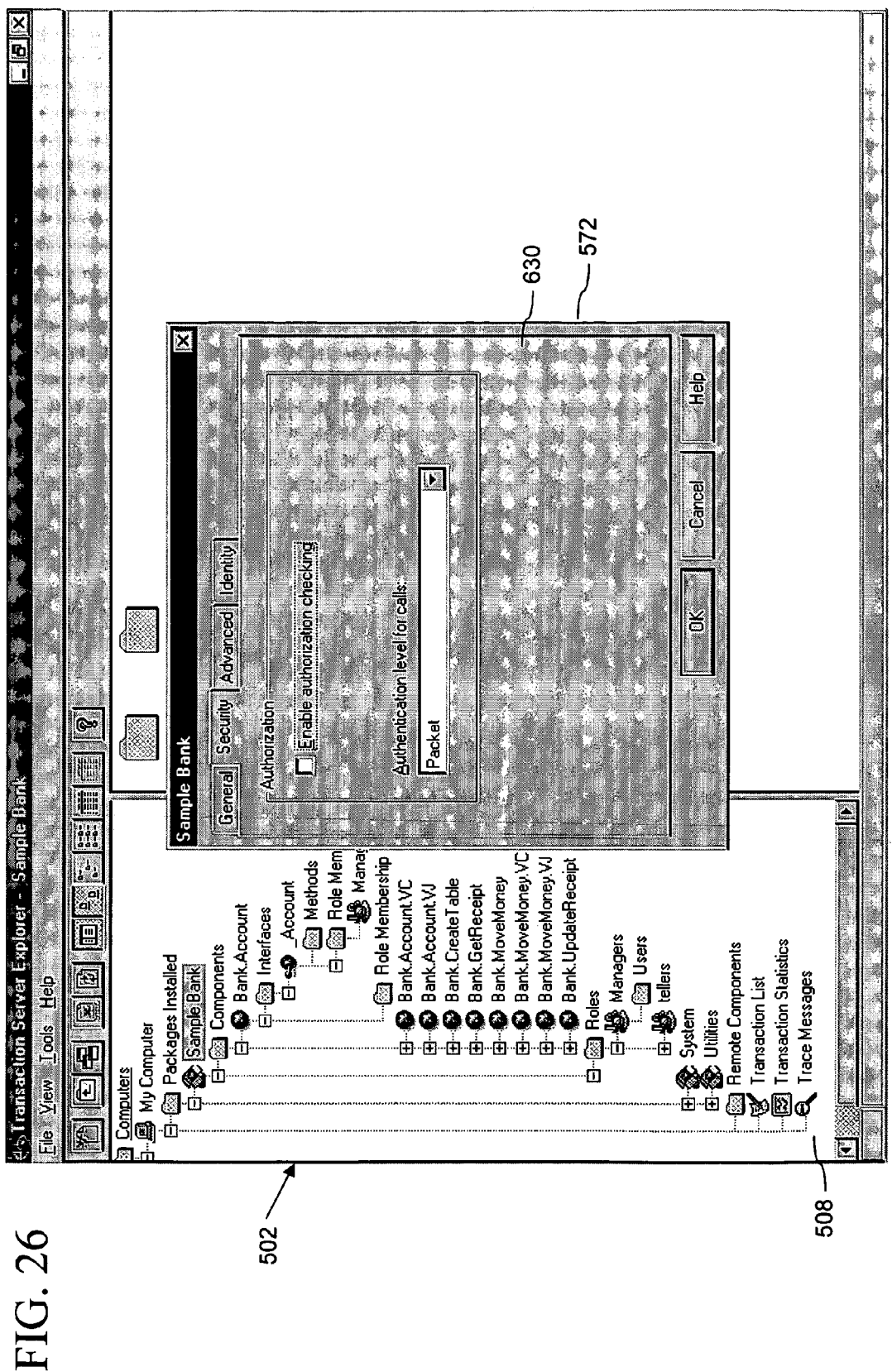
FIG. 26 is a view of a feature of the Transaction Server Explorer's graphical user interface for setting an authentication level and enabling authorization checking for the package.

The administrator also sets the authentication level of base client processes to be greater than or equal to the authentication level set in the package (the authentication level of server processes is configured at the package). The authentication level of the package is set in the Transaction Server Explorer (on a security tab 630 of the package's property sheet 572 as shown in FIG. 26) and defines the minimum authentication level required to call into the package. If the authentication level isn't properly configured, the server process can't service the client base process call. The authentication level can be set in one of two ways. First, the client application calls the DCOM API CoInitializeSecurity to set the process authentication level. Second, if CoInitializeSecurity isn't called by the client base process, the default authentication level is used. The administrator can set the appropriate default authentication level by using dcomcnfg.exe. Declarative access control thus can be enabled or disabled by appropriately setting the authentication level of the package higher than the client processes. The administrator also can set an option to disable authentication checking on the security tab 630 of the package's property sheet 572 (FIG. 26).

If the server application has a component that makes callbacks into the client, the administrator also must configure Access Security such that the server is allowed to call back into the client. There are three ways to set access security. First, the client can call CoInitializeSecurity and directly set the Access Security for the process. Second, if the client process represents a DCOM application, the administrator can set the corresponding Application Access Security setting by using dcomcnfg.exe. Third, the administrator can set the Default Security, Default Access Permissions property by using dcomcnfg.exe. This setting applies to all DCOM calls coming into the client computer 92 (FIG. 3).

After deployment, the administrator can modify the roles and assigned access privileges that were defined by the developer. The roles and assigned package, component and interface-level access privileges are modified in the Transaction Server Explorer in the same ways described above that they are originally defined at development.

Authentication Checks

Figure 29:
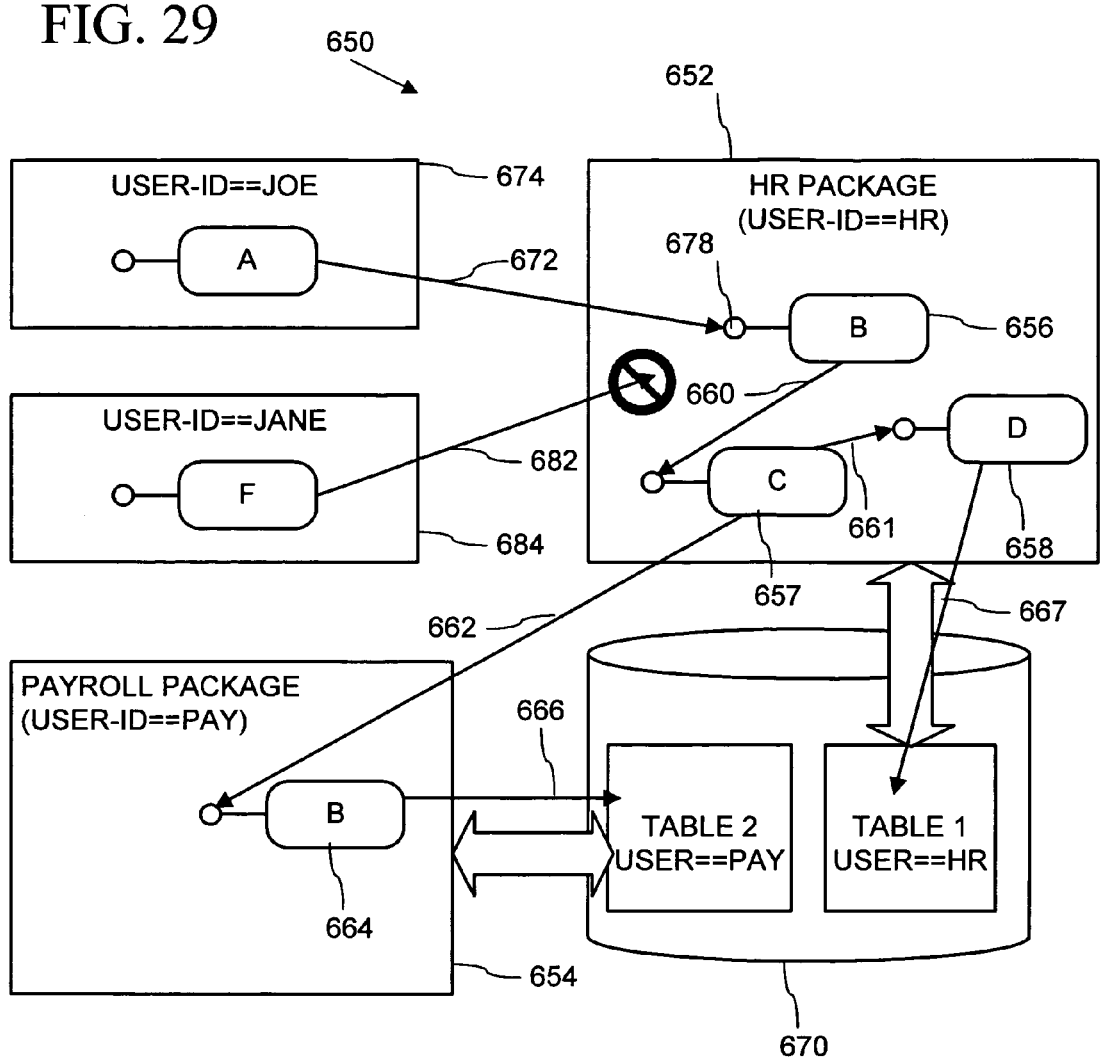
FIG. 29 is a block diagram illustrating authorization checks based on roles.

With reference to FIG. 29, authentication checks are performed in the illustrated execution environment 82 of FIG. 3 at run-time of the server application components based on the development declared roles (as mapped to the computer system's security configuration at deployment). These authorization checks localize security authorization to the component and interface levels.

The illustrated execution environment 82 performs security authorization checks on calls that cross the package boundary (e.g., from a client process into the server application), rather than spread throughout the server application. Once the initial authorization check to pass the package boundary succeeds, any calls between components or access to other resources are made under the identity of the ASP 90 (FIG. 3), i.e., the identity established by setting the package identity which can be done at development as described above. This has several benefits, including a single point for security authorization management, and higher availability and multiplexing of resources, such as database connections from server application processes. However, the security model requires the developer to carefully design server component interaction and declaration of roles and access privileges.

Accordingly, in an example running server application 650 shown in FIG. 29 having a human resources ("HR") package 652 and a payroll package 654 (which the execution environment 82 runs in separate ASPs), calls 660–661 between server application components 656–658 in the human resources package 652 are made without authorization checks. Calls made by the server application components in the packages 652, 654 that cross processes boundaries are made under the package identity, such as a call 662 from the server application component 657 in the HR package 652 to a server application component 664 in the payroll package 654 or calls 666–667 from server application components 658, 664 to a database 670. The database 670 used by the server application therefore will be configured to allow access from the security application components in the packages without further client authorization checks.

On the other hand, the initial calls from client processes into the packages are subject to authorization checks. For example, a call 672 from a client application process 674 to an interface 678 of the server application component 656 in the HR package 652 is subject to an authorization check under the client process' identity (i.e., "joe") against role access privileges at each of the HR package 652, the server application component 656, and the interface 678 levels. Likewise, a call 682 from another client application process 684 is subject to the same authorization checks under that process' identity (i.e., "jane"). If the user id ("joe") of the client application process 674 is mapped to the roles that have access privileges at each of these levels then the call 672 succeeds. On the other hand, if the user id of the process 684 lacks the role-based access privileges at any of the package, component or interface levels, then the call 682 fails.

In the illustrated execution environment 82 (FIG. 3), the transaction server executive 80 performs the authorization checks for a call that crosses a process (package) boundary. The transaction server executive 80 is able to perform authorization checks because all calls to components in the ASP 90 are made using a safe reference, and therefore pass through the transaction server executive. If security is disabled on the package or the corresponding component, declarative authorization isn't checked. The transaction server executive 80 performs the authorization checks for a call that crosses the ASP/package boundary by applying the following methodology (represented in pseudo-code statements):

If roles are configured on the component interface Then
  If caller is in the set of roles on the component interface
    Return call authorization succeeds
  End if
End if
If roles are configured on the component Then
  If caller is in the set of roles on the component
    Return call authorization succeeds
  End if
End if
Return call authorization fails With the illustrated method, the more privileged users are configured at the component level, and less privileged users specified at the component interface level. As an example, the server application component 656 in the HR package 652 might define the following interfaces:

```
coclass HRData
{
    IReadInformation
    IWriteInformation
}
```

A simple security configuration would be to configure two package roles, Clerk and Manager. The Clerk role has the right to read data, but not write data. The Manager has full rights to the object. In this scenario, the Clerk role would be applied to the IReadInformation component interface, and the Manager role would be applied to the HRData component.

Programmatic Access Control

The server application developer also can programmatically control access to processing services in the server application based on declared roles. The illustrated execution environment 80 (FIG. 3) provides a set of component integration interfaces with which the server application component 86 can access security information. Programmatic access control refers to the ability of the developer to programmatically define security for the server application by programming in the server application. The illustrated execution environment provides a basic and advanced interfaces for programmatic access control.

Basic Programmatic Security Interfaces

In the illustrated execution environment 82 (FIG. 3), the IObjectContext interface 139 provides two member functions for basic programmatic security, the IsCallerInRole and the IsSecurityEnabled functions. The IsCallerInRole function determines if the identity of the server application component's caller (e.g., base client process or another ASP, as when the HR package 652 calls the payroll package 654 in the example 650 of FIG. 29) is assigned to a specified role. The caller identity for the IsCallerInRole function is that of the process that called into the package (e.g., "joe" or "jane" for the calls 672, 682, respectively, of FIG. 29), regardless of whether further calls within the package have been made (e.g., calls 660–661 in FIG. 29). The IsSecurityEnable function verifies whether authorization checks are currently enabled for the package.

The developer can use the IsCallerInRole function to place further programmatic restrictions on security. For example, in an on-line banking server application having an account component that provides processing services for deposits and withdrawals, the developer can declaratively define access privileges to the component to allow users in both a tellers and a managers role to access the component so as to process deposits and withdrawals. The developer also can programmatically have the account component verify that a user is in the managers role when processing a deposit of over $50,000 through use of the IsCallerInRole function.

Advanced Programmatic Security Interfaces

The illustrated execution environment 82 (FIG. 3) further provides an interface, ISecurityProperty, supported on the component context object 136 that server application components can use to obtain security-related information from the component context object, including the identity of the client that created the object, as well as the identity of the current calling client. Server applications can use this information to implement custom access control (for example, using the Win32 security interfaces). Member functions of the ISecurityProperty interface allow the server application component to obtain more exact information on the caller, and the developer to programmatically define security based on that information. The functions use a Windows NT security identifier (SID), which is a unique value that identifies a user or group. Thus, with the ISecurityProperty interface, the server application component determines an exact identity of a user, but lacks the flexibility of development/deployment separation provided by roles.

Figure 30:
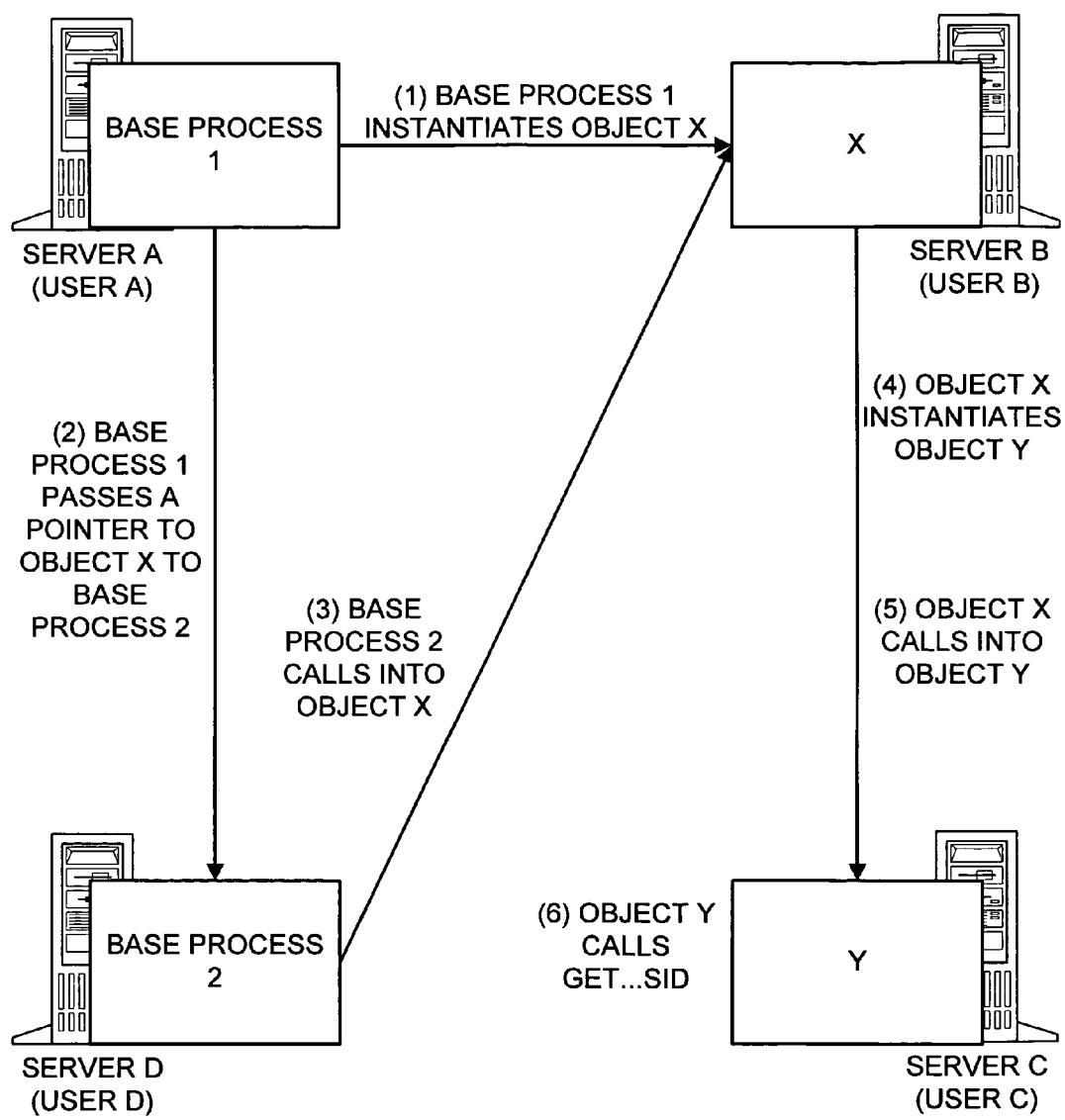
FIG. 30 is a block diagram illustrating a sequence of calls in an example server application to show operation of an advanced programmatic-security interface.

FIG. 30 shows the SIDs that are returned by the various member functions of the ISecurityProperty interface after a certain sequence of calls. Calls to the following ISecurityProperty member functions made after the illustrated call sequence returns SIDs as follows. GetDirectCallerSID returns the SID associated with User B. GetDirectCreatorSID returns the SID associated with User B. GetOriginalCallerSID returns the SID associated with User D. GetOriginalCreatorSID returns the SID associated with User A.

Interfaces And API Functions

With reference again to FIG. 3, the IObjectContext interface 139 is an interface of the system provided component context object 136. The IObjectContext interface 139 is used by the server application component 86 to create additional server application components, to participate in the determination of transaction outcomes, and for programmatic access control. The illustrated IObjectContext interface 139 has the following form (in the C programming language):

```
DECLARE_INTERFACE_(IObjectContext, IUnknown)
{
    // IUnknown functions
    HRESULT QueryInterface(THIS_REFIID riid, LPVOID FAR*
        ppvObj);
    ULONG AddRef(THIS);
    ULONG Release(THIS);
    // IObjectContext functions
    HRESULT CreateInstance(THIS_REFCLSID rclsid, REFIID riid,
        LPVOID FAR* ppvObj);
    HRESULT SetComplete(THIS);
    HRESULT SetAbort(THIS);
    HRESULT EnableCommit(THIS);
    HRESULT DisableCommit(THIS);
    BOOL IsInTransaction(THIS);
    HRESULT IsCallerInRole (BSTR bstrRole, BOOL* pfIsInRole);
    BOOL IsSecurityEnabled ( );
}
```

The Create Instance function is called by the server application component to create a new server application component with a context (i.e., client, activity and transaction) that is derived or inherited from the calling server application component. In its call, the server application component passes the parameters, "rclsid," "riid," and "ppvObj." The "rclsid" is a class identifier that specifies the new server application component to be created. The "riid" parameter is an interface identifier that specifies which interface of the new server application component is to be used by the calling server application component to communicate with the new server application component. The "ppvObj" is a memory location in the calling server application component where a pointer to the specified interface is to be returned.

As discussed above, the transaction server executive 80 creates a new component context object to store the context of the new server application component. The properties of the new component context object are inherited from the calling server application component. The transaction server executive 80 sets the client id and activity id to be the same as the calling server application component. If the calling server application component has a transaction, the transaction server executive also sets the transaction in the new component context object to be the same as that of the calling server application component unless the transaction attribute of the new server application component is registered in the catalog as not supported or requires new. If the calling server application component does not have a transaction and the new server application component's transaction attribute is required, the transaction server executive initiates an automatic transaction for the new server application component. The transaction server executive also initiates an automatic transaction if the transaction attribute is requires new.

TABLE 1

IObjectContext::CreateInstance Return Values

| Value | Description |
| --- | --- |
| S_OK | A safe reference to the object was successfully returned. |
| REGDB_E_CLASSNOTREG | The specified component is not registered as a com object. |
| E_FAIL | A server failure occurred. |
| E_UNEXPECTED | An unexpected error occurred. |
| E_OUTOFMEMORY | There is not enough memory to instantiate the object |
| E_INVALIDARG | The argument passed in ppvObj is invalid. |

The SetComplete function is called by the server application component 86 on return from a client call to indicate that the component has completed processing the work requested by the client, and its state is not to be retained when returning from the method call that first entered the context (i.e., the method call from the client program). No action is taken until the component returns from the client's method call. On return from the client's method call, the transaction server executive 80 deactivates the component, causing its state to be destroyed. Any resources held by the component are released for other uses. By default, where the component has not called either SetComplete or SetAbort before return from the client's method call, the component's state is retained through a subsequent method call to the component. When the component is executing in the scope of a transaction, the server application component's call to SetComplete also indicates that the component agrees that its transactional updates can be committed. The SetComplete function returns a value to the caller (i.e., the component) as shown in the following table:

TABLE 2

IObjectContext::SetComplete Return Values

| Value | Description |
| --- | --- |
| S_OK | The component will be deactivated and its state destroyed upon its return from the client's method call. |
| S_FALSE | The server application component is not executing within a transaction. The server application component is still deactivated and its state destroyed upon return from the client's method call, but its work is not protected within a transaction. |
| E_SERVERFAIL | A server failure occurred. |
| E_UNEXPECTED | An unexpected error occurred. This can occur if one object passes its IObjectContext pointer to another object and the other object calls SetComplete using this pointer. An IObjectContext pointer is not valid outside the context of the object that originally obtained it. |

The SetAbort Function is called by the server application component 86 to indicate that the component has completed processing its work for the client, and its state is not to be retained when returning from the method call that first entered the context (i.e., the method call from the client program). As with the SetComplete function, no action is taken until the component returns from the client's method call. On return from the client's method call, the transaction server executive 80 deactivates the component, causing its state to be destroyed. Any resources held by the component are released for other uses. By default, where the component has not called either SetComplete or SetAbort before return from the client's method call, the component's state is retained through a subsequent method call to the component. When the component is executing in the scope of a transaction, the server application component's call to SetAbort also indicates that the component's transactional updates must be aborted. The SetAbort function returns a value to the caller (i.e., the component) as shown in the following table:

TABLE 3

IObjectContext::SetAbort Return Values

| Value | Description |
| --- | --- |
| S_OK | The component will be deactivated and its state destroyed upon its return from the client's method call. |
| E_FAIL | A server failure occurred. |
| E_UNEXPECTED | An unexpected error occurred. This can occur if one object passes its IObjectContext pointer to another object and the other object calls SetAbort using this pointer. An IObjectContext pointer is not valid outside the context of the object that originally obtained it. |

The EnableCommit function is called by the server application component 86 on return from a client call to indicate that the component allows its transactional updates to be committed in their present form. This is referred to as the enable commit state of the component, and is kept recorded in the component context object 136. The enable commit state is the initial default state of the server application, which remains in the enable commit state until the server application component indicates otherwise by calling DisableCommit, SetComplete, or SetAbort. The EnableCommit function returns a value to the caller as shown in the following table.

TABLE 4

EnableCommit return values.

| Value | Description |
| --- | --- |
| S_OK | Transaction enabled for commit. |
| E_FAIL | A server failure occurred. |
| E_UNEXPECTED | An unexpected error occurred. |

The DisableCommit function is called by the server application component 86 as shown in FIG. 5 to indicate that the component will not allow its transactional updates to be committed in their present form. Any attempt to commit the transaction before the server application component 86 indicates otherwise (using either EnableCommit or SetComplete) will cause the transaction to abort. The DisableCommit function returns a value as shown in the following table.

TABLE 5

DisableCommit return values.

| Value | Description |
|---|---|
| S_OK | Transaction disabled for commit. |
| E_FAIL | A server failure occurred. |
| E_UNEXPECTED | An unexpected error occurred. |
| E_NOCONTEXT | Not executing in a server application component under control of the transaction server executive 80. |

The server application component 86 calls the IsCallerInRole function to determine whether the component's direct caller is in a specified role (either individually or as part of a group). The server application component specifies the role of interest by name in the bstrRole parameter. The pfIsInRole parameter is an out parameter that returns TRUE if the caller is in the specified role, and otherwise returns FALSE. The IsCallerInRole function also sets the pfIsInRole parameter to TRUE if security is not enabled. Because the IsCallerInRole function returns TRUE when the server application component that invokes it is executing in a client's process, the server application component preferably calls IsSecurityEnabled before calling IsCallerInRole. If security isn't enabled, the IsCallerInRole function won't return an accurate result. The IsCallerInRole function returns a value as shown in the following table.

TABLE 6

IObjectContext::IsCallerInRole Return Values

| Value | Description |
|---|---|
| S_OK | The role specified in the bstrRole parameter is a recognized role, and the Boolean result returned in the pfIsInRole parameter indicates whether or not the caller is in that role. |
| CONTEXT_E_ | The role specified in the bstrRole parameter does not exist. |
| E_INVALIDARG | One or more of the arguments passed in is invalid. |
| E_UNEXPECTED | An unexpected error occurred. This can happen if one object passes its IObjectContext pointer to another object and the other object calls IsCallerInRole using this pointer. An IObjectContext pointer is not valid outside the context of the object that originally obtained it. |

The server application component 86 calls the IsSecurityEnabled function to determine whether or not security is enabled. The IsSecurityEnabled function returns TRUE if security is enabled for the server application component that invokes the function, and FALSE if not.

The transaction server executive 80 provides the SafeRef API function for use by the server application component to obtain a safer reference to itself that can be passed to another program. The SafeRef API function of the illustrated transaction server executive 80 has the following form (in the C programming language):

void* SafeRef (REFIID riid, UNKNOWN* punk);

When the server application component is to pass a self-reference to the client program 134 or another server application component, the server application component 86 calls the SafeRef function first and passes the safe reference returned from the function. This is to ensure that all calls to the server application component are made through the transaction server executive. Otherwise, if the server application component passes a direct self reference, the reference would become invalid when the server application component is subsequently deactivated. The server application component specifies the interface that is to be passed to another program by its interface ID with the riid parameter. The pUnk parameter is a reference to an interface on the current instance of the server application component. The SafeRef API function returns a value as shown in the following table.

TABLE 7

SafeRef Return Values

| Value | Description |
|---|---|
| Non-Null | A safe reference to the interface specified in the riid parameter. |
| NULL | The server application component requested a safe reference on an object other than itself, or the interface specified by the riid parameter is not implemented by the server application component. |

The transaction server executive 80 also provides a GetObjectContext API function that the server application component 86 can use to obtain a reference to the IObjectContext interface on its component context object 136, which the server application component can then use to create another server application component that inherits its context (including the transaction property object). The GetObjectContext API function of the illustrated transaction server executive has the following form (in the C programming language).

HRESULT GetObjectContext (IObjectContext** ppInstanceContext);

The ppInstanceContext parameter is a storage location of the server application component where the GetObjectContext API function is to return the IObjectContext interface pointer. The GetObjectContext API function returns a value as shown in the following table.

TABLE 8

GetObjectContext Return Values

| Value | Description |
|---|---|
| S_OK | A reference to the IObjectContext interface of the server application component's component context object is returned in the ppInstanceContext parameter. |
| E_INVALIDARG | The argument passed in the ppInstanceContext parameter is invalid. |
| E_UNEXPECTED | An unexpected error occurred. |
| CONTEXT_E_NOCONTEXT | The server application component doesn't have a component context object, such as because the component was not created under the transaction server executive's control. |

The ISecurityProperty interface also is an interface of the system-provided component context object 136. The ISecurityProperty interface is used to ascertain the security ID of the current object's caller or creator. The server application component obtains an interface pointer to the ISecurityProperty interface by calling QueryInterface on the component's component context object (e.g., with the statement, "m_pIObjectContext->QueryInterface (IID_ISecurityProperty, (void**)&m_pISecurityProperty));").

The ISecurityProperty interface provides the member functions shown in the following table.

TABLE 9

ISecurityProperty member functions

| Function | Description |
|---|---|
| GetDirectCallerSID | Retrieves the security ID of the external process that called the currently executing method. |
| GetDirectCallerSID | Retrieves the security ID of the external process that called the currently executing method. |
| GetDirectCreatorSID | Retrieves the security ID of the external process that directly created the current object. |
| GetOriginalCallerSID | Retrieves the security ID of the base process that initiated the call sequence from which the current method was called. |
| GetOriginalCreatorSID | Retrieves the security ID of the base process that initiated the activity in which the current object is executing. |
| ReleaseSID | Releases the security ID returned by one of the other ISecurityProperty methods. |

The ISecurityProperty member functions have the following form (shown in the C programming language):

```
HRESULT ISecurityProperty::GetDirectCallerSID (
        PSID* ppSid
);
HRESULT ISecurityProperty::GetDirectCreatorSID (
        PSID* ppSid
);
HRESULT ISecurityProperty::GetOriginalCallerSID (
        PSID* ppSid
);
HRESULT ISecurityProperty::GetOriginalCreatorSID (
        PSID* ppSid
);
HRESULT ISecurityProperty::ReleaseSID (
        PSID pSid
);
```

With reference still to FIG. 3, the IObjectControl interface can be implemented on the server application component 86 to indicate support for instance pooling and recycling and to provide context-specific initialization and clean-up for the component upon activation and deactivation, respectively. The IObjectControl interface in the illustrated execution environment has the member functions summarized in the following table:

TABLE 10

IObjectControl member functions.

| Function | Description |
|---|---|
| Activate | Allows an object to perform context-specific initialization whenever it's activated. This method is called by the Transaction Server run-time environment before any other methods are called on the object. |
| CanBePooled | Allows an object to notify the Transaction Server run-time environment of whether it can be pooled for reuse. Return TRUE if you want instances of this component to be pooled, or FALSE if not. |

TABLE 10-continued

IObjectControl member functions.

| Function | Description |
|---|---|
| Deactivate | Allows an object to perform whatever cleanup is necessary before it's recycled or destroyed. This method is called by the Transaction Server run-time environment whenever an object is deactivated. |

The IObjectControl member functions have the following form (shown in the C programming language):
  HRESULT IObjectControl::Activate( );
  void IObjectControl::Deactivate ( );
  BOOL IObjectControl::CanBePooled( )

The ITransactionContext interface is an interface of the transaction context object (not shown). The server application component 86 also can create a transaction context object and use its ITransactionContext interface to initiate and control an independent transaction (i.e., independent from any transaction in which the server application component 86 participates), as well as create components to participate in the independent transaction. The illustrated ITransactionContext interface has the following form (in the C programming language):

```
DECLARE_INTERFACE_(ITransactionContext, IUnknown)
{
    // IUnknown functions
    HRESULT QueryInterface(THIS_REFIID riid, LPVOID
        FAR* ppvObj);
    ULONG AddRef(THIS);
    ULONG Release(THIS);
    // ITransactionContext functions
    HRESULT CreateInstance(THIS REFCLSID rclsid, REFIID riid,
        LPVOID FAR* ppvUnk);
    HRESULT Commit(THIS);
    HRESULT Abort(THIS);
};
```

The Create Instance function is called by the client program 134 to create a new server application component that participates in a transaction initiated and controlled by the client program 134. The new server application component inherits its context (i.e., client, activity and transaction) from the transaction context object. In its call, the client program 134 passes the parameters, "rclsid," "riid," and "ppvObj." The "rclsid" is a class identifier that specifies the new server application component to be created. The "rclsid" parameter is an interface identifier that specifies which interface of the new server application component is to be used by the client program to communicate with the new server application component. The "ppvObj" is a memory location in the client program where a pointer to the specified interface is to be returned.

As discussed above, the transaction server executive 80 creates a new component context object 138 to store the context of the new server application component. The transaction server executive 80 sets the client id and activity id of the new server application component to be the same as in the transaction context object. The transaction server executive 80 sets the transaction in the new server application component's context to be that of the transaction context object unless the new server application component's transaction attribute is registered as not supported or requires new in the catalog 136. If the new server application component's transaction attribute is requires new, then the transaction server executive 80 initiates an automatic transaction for the new server application component.

TABLE 11

ITransactionContext::CreateInstance Return Values

| Value | Description |
|---|---|
| S_OK | A safe reference to the object was successfully returned. |
| REGDB_E_CLASSNOTREG | The specified component is not registered as a com object. |
| E_FAIL | A server failure occurred. |
| E_UNEXPECTED | An unexpected error occurred. |

The client program 134 calls the Commit member function of the ITransactionContext interface to attempt to commit the transaction. In response, the transaction manager 148 commits the transaction if all participants (e.g., server application components and resource managers) in the transaction agree to committal. For example, the transaction will still abort if any server application component 86 participating in the transaction previously called the IObjectContext::SetAbort function, or on a failure (e.g., hardware failures such as a power outage, and software errors or exceptions) affecting any participant in the transaction.

TABLE 12

ITransactionContext::Commit Return Values

| Value | Description |
|---|---|
| S_OK | The transaction was committed. |
| E_ABORTED | The transaction was aborted. |
| E_FAIL | A server failure occurred. |
| E_UNEXPECTED | An unexpected error occurred. |

The client program 134 calls the Abort member function of the ITransactionContext interface to cause the transaction to abort. In response, the transaction manager 148 aborts the transaction by rolling back work (e.g., database updates) by all participants in the transaction (i.e., returning to the pre-transaction state).

TABLE 13

ITransactionContext::Abort Return Values

| Value | Description |
|---|---|
| S_OK | The transaction was aborted. |
| E_FAIL | A server failure occurred. |
| E_UNEXPECTED | An unexpected error occurred. |

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer having object-execution system code, a method of managing execution of software components in an object execution environment, wherein a software component instance is one of a set of ancestor/descendent-related software components, each of which being created in turn at request of its respective immediate ancestor software component of the set commencing with an original ancestor software component originally created at request of a base client, and wherein the set of properties comprises a client identifier indicative of the base client, and wherein each software component of the set of ancestor/descendent-related software components has a respective component context object whose properties are inherited based on those of a third component context object implicitly associated to the original ancestor software component, and wherein the set of properties of the third component context object comprises a transaction reference indicative of a transaction encompassing data processing work of the set of ancestor/descendent-related software components, the method comprising:

supporting an object execution environment from a system-provided run-time executive;

responsive to a request from an immediate client to the run-time executive to create the software component instance in the object execution environment, creating a component context object having stored therein a set of properties intrinsic to the requested software component instance and relating to managing execution of the requested software component instance within the object execution environment by system-provided code, supplying to the immediate client a reference to the requested software component instance, and maintaining by the run-time executive an implicit association of the component context object to the requested software component instance;

setting the properties in the component context object of the requested software component instance based on those of a second component context object associated with the immediate ancestor software component for the requested software component instance;

exposing an interface of the third component context object to the original ancestor software component, the component context object interface having a set complete indication method member and a set abort indication method member for invocation by the original ancestor software component, where the invocation of the set complete indication method member by the original ancestor software component is indicative of the set's data processing work being in a complete condition in which the transaction can be committed, and where the invocation of the set abort method member by the original ancestor software component is indicative of the set's data processing work being in a complete condition in which the transaction cannot properly be committed;

invoking by the requested software component instance specific an appropriate one of the set complete indication or set abort indication method member of the third component context object interface prior to return from data processing work in the transaction that indicates the data processing work's condition;

where the set complete indication method member is invoked by the original ancestor software component prior to return from the data processing work, automatically attempting committal of the transaction without explicit programming instruction of the immediate client; and where the set abort indication method member is invoked by the original ancestor software component prior to return from the data processing work, automatically aborting the transaction without explicit programming instruction of the immediate client;

wherein the method is computer implemented.

2. The method of claim 1 further comprising, responsive to the invocation of the appropriate one method member by the original ancestor software component prior to return from the data processing work, deactivating the original ancestor software component.

3. In a computer having object-execution system code, a method of managing execution of software components in an object execution environment, the method comprising:

supporting an object execution environment from a system-provided run-time executive; and responsive to a request from an immediate client to the run-time executive to create a software component instance in the object execution environment, creating a component context object having stored therein a set of properties intrinsic to the requested software component instance and relating to managing execution of the requested software component instance within the object execution environment by system-provided code wherein the set of properties comprises a transaction reference indicative of a transaction encompassing data processing work of the requested software component instance, supplying to the immediate client a reference to the requested software component instance, and maintaining by the run-time executive an implicit association of the component context object to the requested software component instance;

exposing an interface of the component context object to the requested software component instance, the component context object interface having a plurality of method members for invocation by the requested software component instance to indicate a condition of the data processing work by the requested software component instance in the transaction; and invoking by the requested software component instance specific of the method members of the component context object interface prior to return from data processing work in the transaction to indicate the data processing work's condition;

wherein the method is computer implemented.

4. The method of claim 3 wherein the method members of the component context object comprise a set complete indication method member, the invocation of which by the requested software component instance is indicative of the requested software component instance's data processing work being in a complete condition in which the transaction can be committed.

5. The method of claim 4 further comprising, responsive to invocation of the set complete indication method member by the requested software component instance prior to return from the data processing work, deactivating the requested software component instance.

6. The method of claim 4 further comprising, responsive to invocation of the set complete indication method member by the requested software component instance prior to return from the data processing work, automatically attempting committal of the transaction without explicit programming instruction of the immediate client.

7. The method of claim 3 wherein the method members of the component context object comprise a set abort indication method member, the invocation of which by the requested software component instance is indicative of the requested software component instance's data processing work being in a complete condition in which the transaction cannot properly be committed.

8. The method of claim 7 further comprising, responsive to invocation of the set abort indication method member by the requested software component instance prior to return from the data processing work, deactivating the requested software component instance.

9. The method of claim 7 further comprising, responsive to invocation of the set abort indication method member by the requested software component instance prior to return from the data processing work, automatically aborting the transaction without explicit programming instruction of the immediate client.

10. The method of claim 3 wherein the method members of the component context object comprise a commit enabling indication method member, the invocation of which by the requested software component instance is indicative of the requested software component instance's data processing work being in a possibly incomplete condition in which the transaction can still properly be committed.

11. The method of claim 10 further comprising, upon an attempt to commit the transaction at a time after the requested software component instance invokes the commit enabling indication method member, allowing the transaction to commit unless a condition of processing work by other than the requested software component instance causes an abort of the transaction.

12. The method of claim 3 wherein the method members of the component context object comprise a commit disabling indication method member, the invocation of which by the requested software component instance is indicative of the requested software component instance's data processing work being in a possibly incomplete condition in which the transaction cannot properly be committed.

13. The method of claim 12 further comprising, upon an attempt to commit the transaction at a time after the requested software component instance invokes the commit disabling indication method member, causing the transaction to abort.

14. In a computer having object-execution system code, a method of managing execution of software components in an object execution environment, the method comprising:

supporting an object execution environment from a system-provided run-time executive; and responsive to a request from an immediate client to the run-time executive to create a software component instance in the object execution environment, creating a component context object having stored therein a set of properties intrinsic to the requested software component instance and relating to managing execution of the requested software component instance within the object execution environment by system-provided code, supplying to the immediate client a reference to the requested software component instance, and maintaining by the run-time executive an implicit association of the component context object to the requested software component instance;

setting the properties in the component context object of the requested software component instance based on those in a second component context object wherein the second component context object is associated with the immediate client executing in the object execution environment; and issuing by the immediate client a method invocation to a create instance method member of an interface supported on the second component context object to thereby request creation of the requested software component instance;

wherein the method is computer implemented.

15. In a computer having object-execution system code, a method of managing execution of software components in an object execution environment wherein the computer further has a security facility requiring a user to log-on under one of a plurality of user identities configured on the respective computer system, at least some of the software components in the object execution environment form at least part of a component-based application program having defined therein a set of abstract user classes and access privileges of the abstract user classes, the computer having an administrative configuration associating the user identities to the abstract user classes and having an access control for enforcing access limitation of a user whose user identity is associated in any of the abstract user classes to the access privileges of the associated abstract user class, the method comprising:

supporting an object execution environment from a system-provided run-time executive; and responsive to a request from an immediate client to the run-time executive to create a software component instance in the object execution environment, creating a component context object having stored therein a set of properties intrinsic to the requested software component instance and relating to managing execution of the requested software component instance within the object execution environment by system-provided code, supplying to the immediate client a reference to the requested software component instance, and maintaining by the run-time executive an implicit association of the component context object to the requested software component instance;

exposing an interface of the component context object to the requested software component instance, the component context object interface having a method member for programmatically querying whether a caller is executing on behalf of a user associated in a specified abstract user class; and in response to invocation of the method member by the requested software component instance which invocation specifies a particular abstract user class, returning an indication of whether a caller of the requested software component instance executes on behalf of a user associated in the particular abstract user class;

wherein the method is computer implemented.

16. The method of claim 15 wherein the access control can be selectively enabled to enforce the access limitation with respect to any software component of the object execution environment, the exposed interface of the component context object also having a further method member for querying whether the access control is enabled with respect to the requested software component instance, the method further comprising:

in response to invocation of the further method member by the requested software component instance, returning an indication of whether the access control is enabled with respect to the requested software component instance.

17. In a computer, a software component execution runtime executive for providing services to support execution of software components in an object execution environment, the runtime executive comprising:

program code supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment;

program code operating responsive to a request of an immediate client for creation of an instance of a request-specified software component to cause creation of a component context object to accompany the requested software component instance and to return a requested software component instance reference back to the immediate client;

program code for maintaining an implicit association of the created component context object with the requested software component instance throughout a lifetime of the requested software component instance; and program code implementing an interface of the component context object exposed to the requested software component instance, the interface having a transaction completion indication method member for invocation by the requested software component instance prior to return from data processing work for the immediate client to provide an indication to the software component execution runtime executive that the data processing work has been successfully completed;

wherein program code is computer executed.

18. The software component execution runtime executive of claim 17 further comprising:

program code operating responsive to the invocation of the transaction completion indication method member by the requested software component instance to deactivate the requested software component instance upon the requested software component instance's return from the data processing work.

19. The software component execution runtime executive of claim 17 further comprising:

program code operating responsive to the invocation of the transaction completion indication method member by the requested software component instance to initiate a commit phase of transactional processing involving the data processing work of the requested software component instance.

20. In a computer, a software component execution runtime executive for providing services to support execution of software components in an object execution environment, the runtime executive comprising:

program code supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment;

program code operating responsive to a request of an immediate client for creation of an instance of a request-specified software component to cause creation of a component context object to accompany the requested software component instance and to return a requested software component instance reference back to the immediate client;

program code for maintaining an implicit association of the created component context object with the requested software component instance throughout a lifetime of the requested software component instance; and program code implementing an interface of the component context object exposed to the requested software component instance, the interface having a transaction abort indication method member for invocation by the requested software component instance prior to return from data processing work for the immediate client to provide an indication to the software component execution runtime executive that the data processing work has been unsuccessfully completed;

wherein program code is computer executed.

21. The software component execution runtime executive of claim 20 further comprising:

program code operating responsive to the invocation of the transaction abort indication method member by the requested software component instance to deactivate the requested software component instance upon the requested software component instance's return from the data processing work.

22. The software component execution runtime executive of claim 20 further comprising:

program code operating responsive to the invocation of the transaction abort indication method member by the requested software component instance to initiate an abort phase of transactional processing involving the data processing work of the requested software component instance.

23. In a computer, a software component execution runtime executive for providing services to support execution of software components in an object execution environment, the runtime executive comprising:

program code supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment;

program code operating responsive to a request of an immediate client for creation of an instance of a request-specified software component to cause creation of a component context object to accompany the requested software component instance and to return a requested software component instance reference back to the immediate client;

program code for maintaining an implicit association of the created component context object with the requested software component instance throughout a lifetime of the requested software component instance; and program code implementing an interface of the component context object exposed to the requested software component instance, the interface having a transaction disable indication method member for invocation by the requested software component instance prior to return from data processing work for the immediate client to provide an indication to the software component execution runtime executive that the data processing work should not be committed pending further processing;

wherein program code is computer executed.

24. The software component execution runtime executive of claim 23 further comprising:

program code operating responsive to the invocation of the transaction disable indication method member by the requested software component instance to disable transactional processing involving the data processing work of the requested software component instance from committal.

25. The software component execution runtime executive of claim 23 wherein the interface further has a transaction enable indication method member for invocation by the requested software component instance prior to return from data processing work for the immediate client to provide an indication to the software component execution runtime executive that the data processing work can be committed, the software component execution runtime executive further comprising:

program code operating responsive to the invocation of the transaction enable indication method member by the requested software component instance to again enable transactional processing involving the data processing work of the requested software component instance to commit.

26. In a computer, a software component execution runtime executive for providing services to support execution of software components in an object execution environment, the runtime executive comprising:

program code supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment;

program code operating responsive to a request of an immediate client for creation of an instance of a request-specified software component to cause creation of a component context object to accompany the requested software component instance and to return a requested software component instance reference back to the immediate client;

program code for maintaining an implicit association of the created component context object with the requested software component instance throughout a lifetime of the requested software component instance;

program code implementing an interface of the component context object exposed to the requested software component instance, the interface having a query transaction participation method member for invocation by the requested software component instance; and program code operating responsive to the invocation of the query transaction participation method member by the requested software component instance to provide information back to the requested software component instance whether data processing work of the requested software component instance forms part of a transaction;

wherein program code is computer executed.

27. In a computer, a software component execution runtime executive for providing services to support execution of software components in an object execution environment, the runtime executive comprising:

program code supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment;

program code operating responsive to a request of an immediate client for creation of an instance of a request-specified software component to cause creation of a component context object to accompany the requested software component instance and to return a requested software component instance reference back to the immediate client;

program code for maintaining an implicit association of the created component context object with the requested software component instance throughout a lifetime of the requested software component instance;

program code implementing an interface of the component context object exposed to the requested software component instance, the interface having a query role membership method member for invocation by the requested software component instance to programmatically control access; and program code operating responsive to the invocation of the query role membership method member by the requested software component instance to provide information back to the requested software component instance indicative of whether a user on whose behalf the requested software component instance is executing is associated in a specified role, wherein the role is an abstract class of users defined for a component-based application program and associated to user identities employed in a security facility of the computer;

wherein program code is computer executed.

28. In a computer system having object-execution system code managing execution of software components in an object execution environment, the computer system comprising:

means for supporting an object execution environment from a system-provided run-time executive; and responsive to a request from an immediate client to the run-time executive to create a software component instance in the object execution environment, means for creating a component context object having stored therein a set of properties intrinsic to the requested software component instance and relating to managing execution of the requested software component instance within the object execution environment by system-provided code, means for supplying to the immediate client a reference to the requested software component instance, and means for maintaining by the run-time executive an implicit association of the component context object to the requested software component instance wherein the software component instance is one of a set of ancestor/descendent-related software components, each of which being created in turn at request of its respective immediate ancestor software component of the set commencing with an original ancestor software component originally created at request of a base client, and wherein the set of properties comprises a client identifier indicative of the base client;

means for setting the properties in the component context object of the requested software component instance based on those in the second component context object wherein a second component context object is associated with the immediate ancestor software component for the requested software component instance, and wherein each software component of the set of ancestor/descendent-related software components has a respective component context object whose properties are inherited based on those of a third component context object implicitly associated to the original ancestor software component, and wherein the set of properties of the third component context object comprises a transaction reference indicative of a transaction encompassing data processing work of the set of ancestor/descendent-related software components;

means for exposing an interface of the third component context object to the original ancestor software component, the component context object interface having a set complete indication method member and a set abort indication method member for invocation by the original ancestor software component, where the invocation of the set complete indication method member by the original ancestor software component is indicative of the set's data processing work being in a complete condition in which the transaction can be committed, and where the invocation of the set abort method member by the original ancestor software component is indicative of the set's data processing work being in a complete condition in which the transaction cannot properly be committed;

means for invoking by the requested software component instance specific an appropriate one of the set complete indication or set abort indication method member of the third component context object interface prior to return from data processing work in the transaction that indicates the data processing work's condition;

where the set complete indication method member is invoked by the original ancestor software component prior to return from the data processing work, automatically attempting committal of the transaction without explicit programming instruction of the immediate client; and where the set abort indication method member is invoked by the original ancestor software component prior to return from the data processing work, automatically aborting the transaction without explicit programming instruction of the immediate client;

wherein said means are computer implemented.

29. The computer system of claim 28 further comprising, responsive to the invocation of the appropriate one method member by the original ancestor software component prior to return from the data processing work, means for deactivating the original ancestor software component.

30. In a computer system having object-execution system code managing execution of software components in an object execution environment, the computer system comprising:
- means for supporting an object execution environment from a system-provided run-time executive; and
- responsive to a request from an immediate client to the run-time executive to create a software component instance in the object execution environment,
    - means for creating a component context object having stored therein a set of properties intrinsic to the requested software component instance and relating to managing execution of the requested software component instance within the object execution environment by system-provided code,
    - means for supplying to the immediate client a reference to the requested software component instance, and
    - means for maintaining by the run-time executive an implicit association of the component context object to the requested software component instance;
- means for exposing an interface of the component context object to the requested software component instance, the component context object interface having a plurality of method members for invocation by the requested software component instance to indicate a condition of the data processing work by the requested software component instance in a transaction; and
- means for invoking by the requested software component instance specific of the method members of the component context object interface prior to return from data processing work in the transaction to indicate the data processing work's condition wherein the set of properties comprises a transaction reference indicative of the transaction encompassing data processing work of the requested software component instance;
- wherein said means are computer implemented.

31. The computer system of claim 30 wherein the method members of the component context object comprise a set complete indication method member, the invocation of which by the requested software component instance is indicative of the requested software component instance's data processing work being in a complete condition in which the transaction can be committed.

32. The computer system of claim 31 further comprising, responsive to invocation of the set complete indication method member by the requested software component instance prior to return from the data processing work, means for deactivating the requested software component instance.

33. The computer system of claim 31 further comprising, responsive to invocation of the set complete indication method member by the requested software component instance prior to return from the data processing work, means for automatically attempting committal of the transaction without explicit programming instruction of the immediate client.

34. The computer system of claim 30 wherein the method members of the component context object comprise a set abort indication method member, the invocation of which by the requested software component instance is indicative of the requested software component instance's data processing work being in a complete condition in which the transaction cannot properly be committed.

35. The computer system of claim 34 further comprising, responsive to invocation of the set abort indication method member by the requested software component instance prior to return from the data processing work, means for deactivating the requested software component instance.

36. The computer system of claim 34 further comprising, responsive to invocation of the set abort indication method member by the requested software component instance prior to return from the data processing work, means for automatically aborting the transaction without explicit programming instruction of the immediate client.

37. The computer system of claim 30 wherein the method members of the component context object comprise a commit enabling indication method member, the invocation of which by the requested software component instance is indicative of the requested software component instance's data processing work being in a possibly incomplete condition in which the transaction can still properly be committed.

38. The computer system of claim 37 further comprising, upon an attempt to commit the transaction at a time after the requested software component instance invokes the commit enabling indication method member, means for allowing the transaction to commit unless a condition of processing work by other than the requested software component instance causes an abort of the transaction.

39. The computer system of claim 30 wherein the method members of the component context object comprise a commit disabling indication method member, the invocation of which by the requested software component instance is indicative of the requested software component instance's data processing work being in a possibly incomplete condition in which the transaction cannot properly be committed.

40. The computer system of claim 39 further comprising, upon an attempt to commit the transaction at a time after the requested software component instance invokes the commit disabling indication method member, causing the transaction to abort.

41. In a computer system having object-execution system code managing execution of software components in an object execution environment, the computer system comprising:
- means for supporting an object execution environment from a system-provided run-time executive; and
- responsive to a request from an immediate client to the run-time executive to create a software component instance in the object execution environment,
    - means for creating a component context object having stored therein a set of properties intrinsic to the requested software component instance and relating to managing execution of the requested software component instance within the object execution environment by system-provided code,
    - means for supplying to the immediate client a reference to the requested software component instance, and
    - means for maintaining by the run-time executive an implicit association of the component context object to the requested software component instance;
- means for setting the properties in the component context object of the requested software component instance based on those in the second component context object; and
- means for issuing by the immediate client a method invocation to a create instance method member of an interface supported on a second component context object to thereby request creation of the requested software component instance wherein the second component context object is associated with the immediate client executing in the object execution environment;
- wherein said means are computer implemented.

42. In a computer system having object-execution system code managing execution of software components in an object execution environment, a security facility requiring a user to log-on under one of a plurality of user identities configured on the respective computer system, at least some of the software components in the object execution environment form at least part of a component-based application program having defined therein a set of abstract user classes and access privileges of the abstract user classes, the computer having an administrative configuration associating the user identities to the abstract user classes and having an access control for enforcing access limitation of a user whose user identity is associated in any of the abstract user classes to the access privileges of the associated abstract user class, the computer system comprising:

means for supporting an object execution environment from a system-provided run-time executive; and responsive to a request from an immediate client to the run-time executive to create a software component instance in the object execution environment, means for creating a component context object having stored therein a set of properties intrinsic to the requested software component instance and relating to managing execution of the requested software component instance within the object execution environment by system-provided code, means for supplying to the immediate client a reference to the requested software component instance, and means for maintaining by the run-time executive an implicit association of the component context object to the requested software component instance;

means for exposing an interface of the component context object to the requested software component instance, the component context object interface having a method member for programmatically querying whether a caller is executing on behalf of a user associated in a specified abstract user class; and in response to invocation of the method member by the requested software component instance which invocation specifies a particular abstract user class, means for returning an indication of whether a caller of the requested software component instance executes on behalf of a user associated in the particular abstract user class;

wherein said means are computer implemented.

43. The computer system of claim 42 wherein the access control can be selectively enabled to enforce the access limitation with respect to any software component of the object execution environment, the exposed interface of the component context object also having a further method member for querying whether the access control is enabled with respect to the requested software component instance, the computer system further comprising:

in response to invocation of the further method member by the requested software component instance, means for returning an indication of whether the access control is enabled with respect to the requested software component instance.

44. In a computer system comprising:

a digital processor;

volatile and non-volatile memory coupled to the digital processor; and the memory having program code for executing on the digital processor, the program code comprising, software components, a software component execution runtime executive for providing services to support execution of software components in an object execution environment, the runtime executive performing a method comprising, supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment, operating responsive to a request of an immediate client for creation of an instance of a request-specified software component to cause creation of a component context object to accompany the requested software component instance and to return a requested software component instance reference back to the immediate client, maintaining an implicit association of the created component context object with the requested software component instance throughout a lifetime of the requested software component instance, and implementing an interface of the component context object exposed to the requested software component instance, the interface having a transaction completion indication method member for invocation by the requested software component instance prior to return from data processing work for the immediate client to provide an indication to the software component execution runtime executive that the data processing work has been successfully completed.

45. The computer system of claim 44, wherein the method performed by the runtime executive further comprises operating responsive to the invocation of the transaction completion indication method member by the requested software component instance to deactivate the requested software component instance upon the requested software component instance's return from the data processing work.

46. The computer system of claim 44, wherein the method performed by the runtime executive further comprises operating responsive to the invocation of the transaction completion indication method member by the requested software component instance to initiate a commit phase of transactional processing involving the data processing work of the requested software component instance.

47. In a computer system comprising:

a digital processor;

volatile and non-volatile memory coupled to the digital processor; and the memory having program code for executing on the digital processor, the program code comprising, software components, a software component execution runtime executive for providing services to support execution of software components in an object execution environment, the runtime executive performing a method comprising, supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment, operating responsive to a request of an immediate client for creation of an instance of a request-specified software component to cause creation of a component context object to accompany the requested software component instance and to return a requested software component instance reference back to the immediate client, maintaining an implicit association of the created component context object with the requested software component instance throughout a lifetime of the requested software component instance, and implementing an interface of the component context object exposed to the requested software component instance, the interface having a transaction abort indication method member for invocation by the requested software component instance prior to return from data processing work for the immediate client to provide an indication to the software component execution runtime executive that the data processing work has been unsuccessfully completed.

48. The computer system of claim 47, wherein the method performed by the runtime executive further comprises operating responsive to the invocation of the transaction abort indication method member by the requested software component instance to deactivate the requested software component instance upon the requested software component instance's return from the data processing work.

49. The computer system of claim 47, wherein the method performed by the runtime executive further comprises operating responsive to the invocation of the transaction abort indication method member by the requested software component instance to initiate an abort phase of transactional processing involving the data processing work of the requested software component instance.

50. In a computer system comprising:

a digital processor;

volatile and non-volatile memory coupled to the digital processor; and the memory having program code for executing on the digital processor, the program code comprising, software components, a software component execution runtime executive for providing services to support execution of software components in an object execution environment, the runtime executive performing a method comprising, supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment, operating responsive to a request of an immediate client for creation of an instance of a request-specified software component to cause creation of a component context object to accompany the requested software component instance and to return a requested software component instance reference back to the immediate client, maintaining an implicit association of the created component context object with the requested software component instance throughout a lifetime of the requested software component instance, and implementing an interface of the component context object exposed to the requested software component instance, the interface having a transaction disable indication method member for invocation by the requested software component instance prior to return from data processing work for the immediate client to provide an indication to the software component execution runtime executive that the data processing work should not be committed pending further processing.

51. The computer system of claim 50, wherein the method performed by the runtime executive further comprises operating responsive to the invocation of the transaction disable indication method member by the requested software component instance to disable transactional processing involving the data processing work of the requested software component instance from committal.

52. The computer system of claim 50, wherein the interface further has a transaction enable indication method member for invocation by the requested software component instance prior to return from data processing work for the immediate client to provide an indication to the software component execution runtime executive that the data processing work can be committed, the method performed by the runtime executive further comprising operating responsive to the invocation of the transaction enable indication method member by the requested software component instance to again enable transactional processing involving the data processing work of the requested software component instance to commit.

53. In a computer system comprising:

a digital processor;

volatile and non-volatile memory coupled to the digital processor; and the memory having program code for executing on the digital processor, the program code comprising, software components, a software component execution runtime executive for providing services to support execution of software components in an object execution environment, the runtime executive performing a method comprising, supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment, operating responsive to a request of an immediate client for creation of an instance of a request-specified software component to cause creation of a component context object to accompany the requested software component instance and to return a requested software component instance reference back to the immediate client, and maintaining an implicit association of the created component context object with the requested software component instance throughout a lifetime of the requested software component instance, implementing an interface of the component context object exposed to the requested software component instance, the interface having a query transaction participation method member for invocation by the requested software component instance, and operating responsive to the invocation of the query transaction participation method member by the requested software component instance to provide information back to the requested software component instance whether data processing work of the requested software component instance forms part of a transaction.

54. In a computer system comprising:

a digital processor;

volatile and non-volatile memory coupled to the digital processor; and the memory having program code for executing on the digital processor, the program code comprising, software components, a software component execution runtime executive for providing services to support execution of software components in an object execution environment, the runtime executive performing a method comprising, supplying an implementation of component context objects for accompanying individual instances of the software components executing in the object execution environment, the component context objects having stored therein a set of context properties intrinsic to their respective accompanied individual software component instance and relating to managing execution of the accompanied individual software component instance within the object execution environment, operating responsive to a request of an immediate client for creation of an instance of a request-specified software component to cause creation of a component context object to accompany the requested software component instance and to return a requested software component instance reference back to the immediate client, and maintaining an implicit association of the created component context object with the requested software component instance throughout a lifetime of the requested software component instance, implementing an interface of the component context object exposed to the requested software component instance, the interface having a query role membership method member for invocation by the requested software component instance to programmatically control access, and operating responsive to the invocation of the query role membership method member by the requested software component instance to provide information back to the requested software component instance indicative of whether a user on whose behalf the requested software component instance is executing is associated in a specified role, wherein the role is an abstract class of users defined for a component-based application program and associated to user identities employed in a security facility of the computer.

* * * * *